(12) United States Patent
Feng

(10) Patent No.: US 10,320,490 B2
(45) Date of Patent: Jun. 11, 2019

(54) DATA SENDING/RECEIVING METHOD AND DATA TRANSMISSION SYSTEM OVER SOUND WAVES

(71) Applicant: Alibaba Group Holding Limited, Grand Cayman (KY)

(72) Inventor: Jianhua Feng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 58 days.

(21) Appl. No.: 15/654,645

(22) Filed: Jul. 19, 2017

(65) Prior Publication Data

US 2018/0026728 A1 Jan. 25, 2018

(30) Foreign Application Priority Data

Jul. 20, 2016 (CN) .......................... 2016 1 0577005

(51) Int. Cl.
*G10L 19/008* (2013.01)
*H04B 11/00* (2006.01)
*G08C 23/02* (2006.01)
*H04L 9/06* (2006.01)

(52) U.S. Cl.
CPC ............. *H04B 11/00* (2013.01); *G08C 23/02* (2013.01); *G10L 19/008* (2013.01); *H04L 9/0631* (2013.01)

(58) Field of Classification Search
CPC .............................. H04B 11/00; G10L 19/008
USPC ....................................................... 704/500
See application file for complete search history.

(56) References Cited

U.S. PATENT DOCUMENTS

| | | |
|---|---|---|
| 2003/0212549 A1 | 11/2003 | Steentra |
| 2005/0254344 A1 | 11/2005 | Barras |
| 2008/0243491 A1 | 10/2008 | Matsuoka |
| 2010/0182876 A1 | 7/2010 | Matsuoka et al. |
| 2012/0134238 A1 | 5/2012 | Surprenant |
| 2013/0091359 A1 | 4/2013 | Guo et al. |
| 2014/0050321 A1 | 2/2014 | Albert et al. |
| 2016/0142157 A1 | 5/2016 | Jeong et al. |
| 2016/0197682 A1 | 7/2016 | Getreuer et al. |
| 2016/0249305 A1 | 8/2016 | Hosokawa |
| 2017/0288805 A1 | 10/2017 | Yim |

OTHER PUBLICATIONS

The Search Report and Written Opinion dated Oct. 2, 2017 for PCT Applicaiton No. PCT/US17/42935, 11 pages.

*Primary Examiner* — Susan I McFadden
(74) *Attorney, Agent, or Firm* — Lee & Hayes, P.C.

(57) ABSTRACT

A sound wave-based data sending method, apparatus, and electronic device, a sound wave-based data receiving method, apparatus, and electronic device, and a sound wave-based data transmission system. The sound wave-based data sending method includes: obtaining to-be-sent data; obtaining a sound wave frequency sequence corresponding to the to-be-sent data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the to-be-sent data according to the filtered sound wave signal sequence. The method, apparatus, and electronic device of the present application provide an improved communication distance and identification accuracy.

18 Claims, 49 Drawing Sheets

DATA SENDING/RECEIVING METHOD AND DATA TRANSMISSION SYSTEM OVER SOUND WAVES

CROSS REFERENCE TO RELATED PATENT APPLICATIONS

This application claims priority to Chinese Patent Application No. 201610577005.X, filed on Jul. 20, 2016, entitled "Data Sending/Receiving Method and Data Transmission System over Sound Waves," which is hereby incorporated by reference in its entirety.

TECHNICAL FIELD

The present application relates to the field of data transmission technologies, and in particular, to methods for sending data over sound waves, apparatuses, and electronic devices. The present application also relates to methods for receiving data over sound waves, apparatus, and electronic device, and a data transmission system for transmitting data over sound waves.

BACKGROUND

With the continuous development of intelligent terminals, information transfer and interaction methods are becoming increasingly diversified. Compared with Bluetooth, infrared data transmission, wireless network, or other near field communication methods, sound waves, as a near field communication method, have advantages, such as, strong real-time performance, no external network connections required, no high configuration required, no particular requirements, simple, and convenient. Therefore, data transmission over sound waves methods are widely applied.

The patent application with Publication No. CN102291205B discloses a high-reliability data transmission method and apparatus based on multi-frequency sound waves. The method carries out data transmission by using a loudspeaker and a microphone of an existing terminal. At a sending end, a check value of transmitted data is calculated by employing a Cyclic Redundancy Check (CRC) method, and complete data is mapped to a band of 16 KHz to 22 KHz according to a frequency mapping rule. Then, PCM coding is carried out to send multi-frequency sound wave information in the form of sine waves, till the transmission is completed or time is out. At a receiving end, if a multi-frequency sound wave signal meets a length requirement, based on a corresponding decoding rule, complete audio information is divided into a corresponding number of time segments according to a single frequency duration length, and amplitudes of frequencies in each time segment are calculated and sorted. A frequency with maximum amplitude is a preferred frequency of the time segment, and others are alternative frequencies. Next, values corresponding to preferred frequencies in respective time segments are used to form a group of complete data, and a? check is carried out. If the check is successful, the data transmission is completed; if the check fails, a maximum alternative frequency is used, and another check is performed, until the check succeeds. Otherwise, an information start bit is shifted backwards by one time length (which is 1/n of a single frequency duration length) for storage, and check is performed again.

It can be learned through analysis that, the existing data transmission methods over sound waves have the following disadvantages:

1) The communication distance is short. Since a waveform sent by the sending end is a sine signal, spectrum leakage occurs easily in such a baseband signal. During transmission, since energy is not centralized enough, a sound wave transmission distance is severely limited. In addition, in frequency switching, a difference between frequencies easily causes noise.

2) The identification accuracy is low. At the receiving end, as energy of a sent sound wave signal is not centralized, the amplitude of sound waves would be very small especially at a long distance. Meanwhile, noise interference would be severe, and a relatively large error occurs easily in frequency discrimination, and the identification accuracy is also decreased significantly.

In conclusion, the existing data transmission methods over sound waves have problems of a short communication distance and low identification accuracy.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present application provides a sound wave-based data sending method, apparatus, and electronic device, to solve the problems of a short communication distance and low identification accuracy in the prior art. The present application further provides a sound wave-based data receiving method, apparatus, and electronic device, and a sound wave-based data transmission system.

The present application provides a sound wave-based data sending method, including:

obtaining to-be-sent data;

obtaining a sound wave frequency sequence corresponding to the to-be-sent data according to a preset sound wave frequency mapping table;

generating a filtered sound wave signal sequence according to the sound wave frequency sequence and a preset sending duration, the sending duration being sending duration of a sound wave signal corresponding to a single character; and sending a sound wave signal corresponding to the to-be-sent data according to the filtered sound wave signal sequence.

Optionally, the generating a filtered sound wave signal sequence includes:

generating a sound wave analog signal sequence in a baseband signal form according to the sound wave frequency sequence and the sending duration;

filtering sound wave analog signals in the baseband signal form by using a preset filter, to obtain a filtered sound wave analog signal sequence; and performing waveform coding on the filtered sound wave analog signals by using a preset waveform coding mode, to obtain a sound wave digital signal sequence corresponding to the filtered sound wave analog signal sequence as the filtered sound wave signal sequence.

Optionally, the preset filter includes: a finite impulse response filter or an infinite impulse response filter.

Optionally, after the obtaining a sound wave frequency sequence corresponding to the to-be-sent data, the method further includes:

adding a preset starting tone frequency in front of the sound wave frequency sequence, to form a sound wave frequency sequence including the starting tone frequency.

Optionally, the starting tone frequency includes at least two starting tone frequencies.

Optionally, the obtaining a sound wave frequency sequence corresponding to the to-be-sent data includes:

obtaining respective sound wave frequencies corresponding to characters in the to-be-sent data according to the preset sound wave frequency mapping table; and forming, based on a sequential order of the characters in the to-be-sent data, the sound wave frequency sequence according to the respective sound wave frequencies corresponding to the characters.

Optionally, the obtaining a sound wave frequency sequence corresponding to the to-be-sent data includes:

obtaining to-be-sent data in a target character form according to a preset character mapping table;

performing character segmentation on the to-be-sent data in the target character form according to a character bit length corresponding to a preset sound wave frequency;

obtaining respective sound wave frequencies corresponding to segmented characters according to the preset sound wave frequency mapping table; and forming, based on a sequential order of the segmented characters in the to-be-sent data in the target character form, the sound wave frequency sequence according to the respective sound wave frequencies corresponding to the segmented characters.

Optionally, the sound wave frequency includes a low sound wave frequency, a medium sound wave frequency, or an ultrasonic frequency.

Optionally, after the obtaining to-be-sent data, the method further includes:

generating a check code of the to-be-sent data by using a preset check code generation algorithm;

generating, according to the to-be-sent data and the check code, to-be-sent data carrying the check code; and correspondingly, the obtaining a sound wave frequency sequence corresponding to the to-be-sent data is performed by:

obtaining a sound wave frequency sequence corresponding to the to-be-sent data carrying the check code.

Optionally, after the obtaining to-be-sent data, the method further includes:

encrypting the to-be-sent data by using a preset encryption algorithm; and correspondingly, the obtaining a sound wave frequency sequence corresponding to the to-be-sent data is performed by:

obtaining a sound wave frequency sequence corresponding to the encrypted to-be-sent data.

Optionally, after the obtaining to-be-sent data, the method further includes:

determining whether a character length of the to-be-sent data is greater than a preset maximum character length threshold; if yes, proceeding to the next step; and if no, ending the method.

Correspondingly, the present application further provides a sound wave-based data sending apparatus, including:

a data acquisition unit configured to obtain to-be-sent data;

a frequency mapping unit configured to obtain a sound wave frequency sequence corresponding to the to-be-sent data according to a preset sound wave frequency mapping table;

a signal generation unit configured to generate a filtered sound wave signal sequence according to the sound wave frequency sequence and a preset sending duration, the sending duration being sending duration of a sound wave signal corresponding to a single character; and a signal sending unit configured to send a sound wave signal corresponding to the to-be-sent data according to the filtered sound wave signal sequence.

Optionally, the signal generation unit includes:

a baseband signal generation sub-unit configured to generate a sound wave analog signal sequence in a baseband signal form according to the sound wave frequency sequence and the sending duration;

a signal filtering sub-unit configured to filter sound wave analog signals in the baseband signal form by using a preset filter, to obtain a filtered sound wave analog signal sequence; and a signal coding sub-unit configured to perform waveform coding on the filtered sound wave analog signals by using a preset waveform coding mode, to obtain a sound wave digital signal sequence corresponding to the filtered sound wave analog signal sequence as the filtered sound wave signal sequence.

Optionally, the apparatus further includes:

a starting tone adding unit configured to add a preset starting tone frequency in front of the sound wave frequency sequence, to form a sound wave frequency sequence including the starting tone frequency.

Correspondingly, the present application further provides an electronic device, including:

a sound generator;

a processor; and a memory configured to store a program for implementing a sound wave-based data sending method, wherein after being powered on and running the program of the sound wave-based data sending method through the processor, the device performs the following steps: obtaining to-be-sent data; obtaining a sound wave frequency sequence corresponding to the to-be-sent data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the to-be-sent data according to the filtered sound wave signal sequence.

Correspondingly, the present application further provides a sound wave-based data receiving method, including:

collecting a sound wave signal corresponding to to-be-received data;

intercepting filtered sound wave signal segments from the collected sound wave signal according to a preset sending duration, the sending duration being sending duration of a sound wave signal corresponding to a single character;

determining, for the filtered sound wave signal segments, sound wave frequencies corresponding to the filtered sound wave signal segments by using a preset discrete Fourier transform algorithm, and forming a sound wave frequency sequence corresponding to the to-be-received data by using the sound wave frequencies; and obtaining the to-be-received data corresponding to the sound wave frequency sequence according to a preset sound wave frequency mapping table.

Optionally, the collected sound wave signal includes a sound wave signal corresponding to a starting tone and the sound wave signal corresponding to the to-be-received data; and the intercepting filtered sound wave signal segments from the collected sound wave signal includes:

determining, according to a preset starting tone frequency, whether the collected sound wave signal includes the starting tone; and if the determined result is Yes, intercepting, from a sound wave signal after the starting tone, respective filtered sound wave signal segments corresponding to characters in the to-be-received data according to the sending duration.

Optionally, the determining whether the collected sound wave signal includes the starting tone includes:

intercepting, in a window sliding method, a sound wave signal segment from the collected sound wave signal according to the sending duration;

obtaining, by using a preset discrete Fourier transform algorithm, the number of maximum-amplitude points in the sound wave signal segment, and the number of maximum-amplitude points of a flat waveform portion in the sound wave signal segment; and using the sound wave signal segment as the starting tone if a ratio of the number of maximum-amplitude points in the sound wave signal segment to the number of maximum-amplitude points of the flat waveform portion in the sound wave signal segment is greater than a preset ratio threshold and a frequency corresponding to the sound wave signal segment is the preset starting tone frequency.

Optionally, the sound wave signal corresponding to the to-be-received data includes at least two starting tones.

Optionally, the determining sound wave frequencies corresponding to the filtered sound wave signal segments includes:

obtaining spectrum information corresponding to the filtered sound wave signal segments by using the preset discrete Fourier transform algorithm;

extracting, from the spectrum information by using a maximum peak detection algorithm, a preset number of frequency points that are greater than a preset amplitude threshold; and determining, according to the preset number of frequency points and amplitudes corresponding to the frequency points, sound wave frequencies corresponding to the filtered sound wave signal segments.

Optionally, after the collecting a sound wave signal corresponding to to-be-received data, the method further includes:

performing noise filtering processing on the sound wave signal by using a preset filter.

Optionally, after the collecting a sound wave signal corresponding to to-be-received data, the method further includes:

performing waveform decoding on the sound wave signal by using a preset waveform decoding mode, to obtain a quantized signal of the sound wave signal.

Optionally, the to-be-received data includes data in a target character form, and the method further includes:

extracting, from data in the target character form, a binary number corresponding to an original character according to a preset binary number bit length corresponding to the original character; and obtaining to-be-received data in an original character form according to a preset character mapping table.

Optionally, after the obtaining the to-be-received data corresponding to the sound wave frequency sequence, the method further includes:

generating a check code of the to-be-received data by using a preset check code generation algorithm; and using the to-be-received data as correct data if the check code of the to-be-received data is correct.

Correspondingly, the present application further provides a sound wave-based data receiving apparatus, including:

a signal collection unit configured to collect a sound wave signal corresponding to to-be-received data;

a signal interception unit configured to intercept filtered sound wave signal segments from the collected sound wave signal according to a preset sending duration, the sending duration being sending duration of a sound wave signal corresponding to a single character;

a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the to-be-received data by using the sound wave frequencies; and a data mapping unit configured to obtain the to-be-received data corresponding to the sound wave frequency sequence according to a preset sound wave frequency mapping table.

Optionally, the collected sound wave signal includes a sound wave signal corresponding to a starting tone and the sound wave signal corresponding to the to-be-received data; and the signal interception unit includes:

a starting tone determination sub-unit configured to determine, according to a preset starting tone frequency, whether the collected sound wave signal includes the starting tone; and a signal interception sub-unit configured to: if the determined result is Yes, intercept, from a sound wave signal after the starting tone, respective filtered sound wave signal segments corresponding to characters in the to-be-received data according to the sending duration.

Optionally, the starting tone determination sub-unit includes:

a starting tone signal interception sub-unit configured to intercept, in a window sliding method, a sound wave signal segment from the collected sound wave signal according to the sending duration;

a Fourier transform sub-unit configured to obtain, by using a preset discrete Fourier transform algorithm, the number of maximum-amplitude points in the sound wave signal segment, and the number of maximum-amplitude points of a flat waveform portion in the sound wave signal segment; and a starting tone determination sub-unit configured to use the sound wave signal segment as the starting tone if a ratio of the number of maximum-amplitude points in the sound wave signal segment to the number of maximum-amplitude points of the flat waveform portion in the sound wave signal segment is greater than a preset ratio threshold and a frequency corresponding to the sound wave signal segment is the preset starting tone frequency.

Correspondingly, the present application further provides an electronic device, including:

a listener;

a processor; and a memory configured to store a program for implementing a sound wave-based data receiving method, wherein after being powered on and running the program of the sound wave-based data receiving method through the processor, the device performs the following steps: collecting a sound wave signal corresponding to to-be-received data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the to-be-received data by using the sound wave frequencies; and obtaining the to-be-received data corresponding to the sound wave frequency sequence according to a preset sound wave frequency mapping table.

Correspondingly, the present application further provides a sound wave-based data transmission system, including: the sound wave-based data sending apparatus as any of the above described, and the sound wave-based data receiving apparatus as any of the above described.

Correspondingly, the present application further provides a data sending method, including:

obtaining to-be-sent payment related data;

obtaining a sound wave frequency sequence corresponding to the payment related data according to a preset sound wave frequency mapping table;

generating a filtered sound wave signal sequence according to the sound wave frequency sequence and a preset sending duration, the sending duration being sending duration of a sound wave signal corresponding to a single character; and sending a sound wave signal corresponding to the payment related data according to the filtered sound wave signal sequence.

Correspondingly, the present application further provides a data sending apparatus, including:

a data acquisition unit configured to obtain to-be-sent payment related data;

a frequency mapping unit configured to obtain a sound wave frequency sequence corresponding to the payment related data according to a preset sound wave frequency mapping table;

a signal generation unit configured to generate a filtered sound wave signal sequence according to the sound wave frequency sequence and a preset sending duration, the sending duration being sending duration of a sound wave signal corresponding to a single character; and a signal sending unit configured to send a sound wave signal corresponding to the payment related data according to the filtered sound wave signal sequence.

Correspondingly, the present application further provides an electronic device, including:

a sound generator;

a processor; and a memory configured to store a program for implementing a data sending method, wherein after being powered on and running the program of the data sending method through the processor, the device performs the following steps: obtaining to-be-sent payment related data; obtaining a sound wave frequency sequence corresponding to the payment related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the payment related data according to the filtered sound wave signal sequence.

Correspondingly, the present application further provides a data receiving method, including:

collecting a sound wave signal corresponding to to-be-received payment related data;

intercepting filtered sound wave signal segments from the collected sound wave signal according to a preset sending duration, the sending duration being sending duration of a sound wave signal corresponding to a single character;

determining, for the filtered sound wave signal segments, sound wave frequencies corresponding to the filtered sound wave signal segments by using a preset discrete Fourier transform algorithm, and forming a sound wave frequency sequence corresponding to the payment related data by using the sound wave frequencies; and obtaining the payment related data corresponding to the sound wave frequency sequence according to a preset sound wave frequency mapping table.

Correspondingly, the present application further provides a data receiving apparatus, including:

a signal collection unit configured to collect a sound wave signal corresponding to to-be-received payment related data;

a signal interception unit configured to intercept filtered sound wave signal segments from the collected sound wave signal according to a preset sending duration, the sending duration being sending duration of a sound wave signal corresponding to a single character;

a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the payment related data by using the sound wave frequencies; and a data mapping unit configured to obtain the payment related data corresponding to the sound wave frequency sequence according to a preset sound wave frequency mapping table.

Correspondingly, the present application further provides an electronic device, including:

a sound generator;

a processor; and a memory configured to store a program for implementing a data receiving method, wherein after being powered on and running the program of the data receiving method through the processor, the device performs the following steps: collecting a sound wave signal corresponding to to-be-received payment related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the payment related data by using the sound wave frequencies; and obtaining the payment related data corresponding to the sound wave frequency sequence according to a preset sound wave frequency mapping table.

Correspondingly, the present application further provides a data sending method, including:

obtaining to-be-sent sign-in related data;

obtaining a sound wave frequency sequence corresponding to the sign-in related data according to a preset sound wave frequency mapping table;

generating a filtered sound wave signal sequence according to the sound wave frequency sequence and a preset sending duration, the sending duration being sending duration of a sound wave signal corresponding to a single character; and sending a sound wave signal corresponding to the sign-in related data according to the filtered sound wave signal sequence.

Correspondingly, the present application further provides a data sending apparatus, including:

a data acquisition unit configured to obtain to-be-sent sign-in related data;

a frequency mapping unit configured to obtain a sound wave frequency sequence corresponding to the sign-in related data according to a preset sound wave frequency mapping table;

a signal generation unit configured to generate a filtered sound wave signal sequence according to the sound wave frequency sequence and a preset sending duration, the sending duration being sending duration of a sound wave signal corresponding to a single character; and a signal sending unit configured to send a sound wave signal corresponding to the sign-in related data according to the filtered sound wave signal sequence.

Correspondingly, the present application further provides an electronic device, including:

a sound generator;

a processor; and a memory configured to store a program for implementing a data sending method, wherein after being powered on and running the program of the data sending method through the processor, the device performs the following steps: obtaining to-be-sent sign-in related data; obtaining a sound wave frequency sequence corresponding to the sign-in related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the sign-in related data according to the filtered sound wave signal sequence.

Correspondingly, the present application further provides a data receiving method, including:

collecting a sound wave signal corresponding to to-be-received sign-in related data;

intercepting filtered sound wave signal segments from the collected sound wave signal according to a preset sending duration, the sending duration being sending duration of a sound wave signal corresponding to a single character;

determining, for the filtered sound wave signal segments, sound wave frequencies corresponding to the filtered sound wave signal segments by using a preset discrete Fourier transform algorithm, and forming a sound wave frequency sequence corresponding to the sign-in related data by using the sound wave frequencies; and obtaining the sign-in related data corresponding to the sound wave frequency sequence according to a preset sound wave frequency mapping table.

Correspondingly, the present application further provides a data receiving apparatus, including:

a signal collection unit configured to collect a sound wave signal corresponding to to-be-received sign-in related data;

a signal interception unit configured to intercept filtered sound wave signal segments from the collected sound wave signal according to a preset sending duration, the sending duration being sending duration of a sound wave signal corresponding to a single character;

a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the sign-in related data by using the sound wave frequencies; and a data mapping unit configured to obtain the sign-in related data corresponding to the sound wave frequency sequence according to a preset sound wave frequency mapping table.

Correspondingly, the present application further provides an electronic device, including:

a sound generator;

a processor; and a memory configured to store a program for implementing a data receiving method, wherein after being powered on and running the program of the data receiving method through the processor, the device performs the following steps: collecting a sound wave signal corresponding to to-be-received sign-in related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the sign-in related data by using the sound wave frequencies; and obtaining the sign-in related data corresponding to the sound wave frequency sequence according to a preset sound wave frequency mapping table.

Correspondingly, the present application further provides a data sending method for creating a chat group, including:

obtaining to-be-sent group creation related data;

obtaining a sound wave frequency sequence corresponding to the group creation related data according to a preset sound wave frequency mapping table;

generating a filtered sound wave signal sequence according to the sound wave frequency sequence and a preset sending duration, the sending duration being sending duration of a sound wave signal corresponding to a single character; and sending a sound wave signal corresponding to the group creation related data according to the filtered sound wave signal sequence.

Correspondingly, the present application further provides a data sending apparatus for creating a chat group, including:

a data acquisition unit configured to obtain to-be-sent group creation related data;

a frequency mapping unit configured to obtain a sound wave frequency sequence corresponding to the group creation related data according to a preset sound wave frequency mapping table;

a signal generation unit configured to generate a filtered sound wave signal sequence according to the sound wave frequency sequence and a preset sending duration, the sending duration being sending duration of a sound wave signal corresponding to a single character; and a signal sending unit configured to send a sound wave signal corresponding to the group creation related data according to the filtered sound wave signal sequence.

Correspondingly, the present application further provides an electronic device, including:
  a sound generator;
  a processor; and
  a memory configured to store a program for implementing a data sending method for creating a chat group, wherein after being powered on and running the program of the data sending method for creating a chat group through the processor, the device performs the following steps: obtaining to-be-sent group creation related data; obtaining a sound wave frequency sequence corresponding to the group creation related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the group creation related data according to the filtered sound wave signal sequence.

Correspondingly, the present application further provides a data receiving method for creating a chat group, including:
  collecting a sound wave signal corresponding to to-be-received group creation related data;
  intercepting filtered sound wave signal segments from the collected sound wave signal according to a preset sending duration, the sending duration being sending duration of a sound wave signal corresponding to a single character;
  determining, for the filtered sound wave signal segments, sound wave frequencies corresponding to the filtered sound wave signal segments by using a preset discrete Fourier transform algorithm, and forming a sound wave frequency sequence corresponding to the group creation related data by using the sound wave frequencies; and
  obtaining the group creation related data corresponding to the sound wave frequency sequence according to a preset sound wave frequency mapping table.

Correspondingly, the present application further provides a data receiving apparatus for creating a chat group, including:
  a signal collection unit configured to collect a sound wave signal corresponding to to-be-received group creation related data;
  a signal interception unit configured to intercept filtered sound wave signal segments from the collected sound wave signal according to a preset sending duration, the sending duration being sending duration of a sound wave signal corresponding to a single character;
  a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the group creation related data by using the sound wave frequencies; and
  a data mapping unit configured to obtain the group creation related data corresponding to the sound wave frequency sequence according to a preset sound wave frequency mapping table.

Correspondingly, the present application further provides an electronic device, including:
  a sound generator;
  a processor; and
  a memory configured to store a program for implementing a data receiving method for creating a chat group, wherein after being powered on and running the program of the data receiving method for creating a chat group through the processor, the device performs the following steps: collecting a sound wave signal corresponding to to-be-received group creation related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the group creation related data by using the sound wave frequencies; and obtaining the group creation related data corresponding to the sound wave frequency sequence according to a preset sound wave frequency mapping table.

Correspondingly, the present application further provides a data sending method for smart home control, including:
  obtaining to-be-sent control instruction related data;
  obtaining a sound wave frequency sequence corresponding to the control instruction related data according to a preset sound wave frequency mapping table;
  generating a filtered sound wave signal sequence according to the sound wave frequency sequence and a preset sending duration, the sending duration being sending duration of a sound wave signal corresponding to a single character; and
  sending a sound wave signal corresponding to the control instruction related data according to the filtered sound wave signal sequence.

Correspondingly, the present application further provides a data sending apparatus for smart home control, including:
  a data acquisition unit configured to obtain to-be-sent control instruction related data;
  a frequency mapping unit configured to obtain a sound wave frequency sequence corresponding to the control instruction related data according to a preset sound wave frequency mapping table;
  a signal generation unit configured to generate a filtered sound wave signal sequence according to the sound wave frequency sequence and a preset sending duration, the sending duration being sending duration of a sound wave signal corresponding to a single character; and
  a signal sending unit configured to send a sound wave signal corresponding to the control instruction related data according to the filtered sound wave signal sequence.

Correspondingly, the present application further provides an electronic device, including:
  a sound generator;
  a processor; and
  a memory configured to store a program for implementing a data sending method for smart home control, wherein after being powered on and running the program of the data sending method for smart home control through the processor, the device performs the following steps: obtaining to-be-sent control instruction related data; obtaining a sound wave frequency sequence corresponding to the control instruction related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the control instruction related data according to the filtered sound wave signal sequence.

Correspondingly, the present application further provides a data receiving method for smart home control, including:

collecting a sound wave signal corresponding to to-be-received control instruction related data;

intercepting filtered sound wave signal segments from the collected sound wave signal according to a preset sending duration, the sending duration being sending duration of a sound wave signal corresponding to a single character;

determining, for the filtered sound wave signal segments, sound wave frequencies corresponding to the filtered sound wave signal segments by using a preset discrete Fourier transform algorithm, and forming a sound wave frequency sequence corresponding to the control instruction related data by using the sound wave frequencies; and obtaining the control instruction related data corresponding to the sound wave frequency sequence according to a preset sound wave frequency mapping table.

Correspondingly, the present application further provides a data receiving apparatus for smart home control, including:

a signal collection unit configured to collect a sound wave signal corresponding to to-be-received control instruction related data;

a signal interception unit configured to intercept filtered sound wave signal segments from the collected sound wave signal according to a preset sending duration, the sending duration being sending duration of a sound wave signal corresponding to a single character;

a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the control instruction related data by using the sound wave frequencies; and a data mapping unit configured to obtain the control instruction related data corresponding to the sound wave frequency sequence according to a preset sound wave frequency mapping table.

Correspondingly, the present application further provides an electronic device, including:

a sound generator;

a processor; and a memory configured to store a program for implementing a data receiving method for smart home control, wherein after being powered on and running the program of the data receiving method for smart home control through the processor, the device performs the following steps: collecting a sound wave signal corresponding to to-be-received control instruction related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the control instruction related data by using the sound wave frequencies; and obtaining the control instruction related data corresponding to the sound wave frequency sequence according to a preset sound wave frequency mapping table.

Correspondingly, the present application further provides a data sending method for message pushing, including:

obtaining a to-be-sent message;

obtaining a sound wave frequency sequence corresponding to the message according to a preset sound wave frequency mapping table;

generating a filtered sound wave signal sequence according to the sound wave frequency sequence and a preset sending duration, the sending duration being sending duration of a sound wave signal corresponding to a single character; and sending a sound wave signal corresponding to the message according to the filtered sound wave signal sequence.

Correspondingly, the present application further provides a data sending apparatus for message pushing, including:

a data acquisition unit configured to obtain a to-be-sent message;

a frequency mapping unit configured to obtain a sound wave frequency sequence corresponding to the message according to a preset sound wave frequency mapping table;

a signal generation unit configured to generate a filtered sound wave signal sequence according to the sound wave frequency sequence and a preset sending duration, the sending duration being sending duration of a sound wave signal corresponding to a single character; and a signal sending unit configured to send a sound wave signal corresponding to the message according to the filtered sound wave signal sequence.

Correspondingly, the present application further provides an electronic device, including:

a sound generator;

a processor; and a memory configured to store a program for implementing a data sending method for message pushing, wherein after being powered on and running the program of the data sending method for message pushing through the processor, the device performs the following steps: obtaining a to-be-sent message; obtaining a sound wave frequency sequence corresponding to the message according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the message according to the filtered sound wave signal sequence.

Correspondingly, the present application further provides a data receiving method for message pushing, including:

collecting a sound wave signal corresponding to a to-be-received message;

intercepting filtered sound wave signal segments from the collected sound wave signal according to a preset sending duration, the sending duration being sending duration of a sound wave signal corresponding to a single character;

determining, for the filtered sound wave signal segments, sound wave frequencies corresponding to the filtered sound wave signal segments by using a preset discrete Fourier transform algorithm, and forming a sound wave frequency sequence corresponding to the message by using the sound wave frequencies; and obtaining the message corresponding to the sound wave frequency sequence according to a preset sound wave frequency mapping table.

Correspondingly, the present application further provides a data receiving apparatus for message pushing, including:

a signal collection unit configured to collect a sound wave signal corresponding to a to-be-received message;

a signal interception unit configured to intercept filtered sound wave signal segments from the collected sound wave signal according to a preset sending duration, the sending duration being sending duration of a sound wave signal corresponding to a single character;

a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the message by using the sound wave frequencies; and a data mapping unit configured to obtain the message corresponding to the sound wave frequency sequence according to a preset sound wave frequency mapping table.

Correspondingly, the present application further provides an electronic device, including:
  a sound generator;
  a processor; and
  a memory configured to store a program for implementing a method, wherein after being powered on and running the program of the method through the processor, the device performs the following steps: collecting a sound wave signal corresponding to a to-be-received message; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the message by using the sound wave frequencies; and obtaining the message corresponding to the sound wave frequency sequence according to a preset sound wave frequency mapping table.

Correspondingly, the present application further provides a data sending method for information pushing, including:
  obtaining to-be-sent information;
  obtaining a sound wave frequency sequence corresponding to the information according to a preset sound wave frequency mapping table;
  generating a filtered sound wave signal sequence according to the sound wave frequency sequence and a preset sending duration, the sending duration being sending duration of a sound wave signal corresponding to a single character; and
  sending a sound wave signal corresponding to the information according to the filtered sound wave signal sequence.

Correspondingly, the present application further provides a data sending apparatus for information pushing, including:
  a data acquisition unit configured to obtain to-be-sent information;
  a frequency mapping unit configured to obtain a sound wave frequency sequence corresponding to the information according to a preset sound wave frequency mapping table;
  a signal generation unit configured to generate a filtered sound wave signal sequence according to the sound wave frequency sequence and a preset sending duration, the sending duration being sending duration of a sound wave signal corresponding to a single character; and
  a signal sending unit configured to send a sound wave signal corresponding to the information according to the filtered sound wave signal sequence.

Correspondingly, the present application further provides an electronic device, including:
  a sound generator;
  a processor; and
  a memory configured to store a program for implementing a data sending method for information pushing, wherein after being powered on and running the program of the data sending method for information pushing through the processor, the device performs the following steps: obtaining to-be-sent information; obtaining a sound wave frequency sequence corresponding to the information according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the information according to the filtered sound wave signal sequence.

Correspondingly, the present application further provides a data receiving method for information pushing, including:
  collecting a sound wave signal corresponding to to-be-received information;
  intercepting filtered sound wave signal segments from the collected sound wave signal according to a preset sending duration, the sending duration being sending duration of a sound wave signal corresponding to a single character;
  determining, for the filtered sound wave signal segments, sound wave frequencies corresponding to the filtered sound wave signal segments by using a preset discrete Fourier transform algorithm, and forming a sound wave frequency sequence corresponding to the information by using the sound wave frequencies; and
  obtaining the information corresponding to the sound wave frequency sequence according to a preset sound wave frequency mapping table.

Correspondingly, the present application further provides a data receiving apparatus for information pushing, including:
  a signal collection unit configured to collect a sound wave signal corresponding to to-be-received information;
  a signal interception unit configured to intercept filtered sound wave signal segments from the collected sound wave signal according to a preset sending duration, the sending duration being sending duration of a sound wave signal corresponding to a single character;
  a frequency determination unit configured to determine, for the filtered sound wave signal segments, sound wave frequencies corresponding to the filtered sound wave signal segments by using a preset discrete Fourier transform algorithm, and form a sound wave frequency sequence corresponding to the information by using the sound wave frequencies; and
  a data mapping unit configured to obtain the information corresponding to the sound wave frequency sequence according to a preset sound wave frequency mapping table.

Correspondingly, the present application further provides an electronic device, including:
  a sound generator;
  a processor; and
  a memory configured to store a program for implementing a data receiving method for information pushing, wherein after being powered on and running the program of the data receiving method for information pushing through the processor, the device performs the following steps: collecting a sound wave signal corresponding to to-be-received information; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the information by using the sound wave frequencies; and obtaining the information corresponding to the sound wave frequency sequence according to a preset sound wave frequency mapping table.

Compared with conventional techniques, the sound wave-based data sending method provided in the present application generates a filtered sound wave signal sequence according to a sound wave frequency sequence of to-be-sent data and a preset sending duration of a sound wave signal corresponding to a single character; and sends a sound wave signal corresponding to the to-be-sent data according to the filtered sound wave signal sequence.

The sound wave-based data sending method provided in the present application is used to send out a filtered sound wave signal. With such a filtered sound wave signal, in a cycle corresponding to each frequency of a sound waveform to be sent, a rising edge and a falling edge of the waveform are gradually attenuated to zero, while an in-band waveform signal is very flat and has a high gain, and is close to a direct current signal. This processing method not only can avoid noise caused by a difference during frequency switching but also can centralize energy of a sound signal in a band, so that energy of rising-edge and falling-edge signals is reduced, thus desirably reducing leakage of the energy. Therefore, the method provided in the present application can effectively improve a communication distance and identification accuracy.

In addition, in the sound wave-based data sending method provided in the present application, a starting tone is added in front of a sound wave signal corresponding to to-be-sent data, and a sending end needs to send the sound wave signal corresponding to the to-be-sent data only once. This processing method significantly reduces the number of times the sending end sends the sound wave signal corresponding to the to-be-sent data, and enables a receiving end to quickly obtain the sound wave signal corresponding to the to-be-sent data after detecting the starting tone. Therefore, the method provided in the present application can effectively improve the data identification speed.

DETAILED DESCRIPTION

More details are illustrated in the following description to make it easy to fully understand the present application. However, the present application can be implemented in many other manners different from those described here. Those skilled in the art can make similar generalization without departing from the connotation of the present application. Therefore, the present application is not limited by the example implementations disclosed below.

The present application provides a sound wave-based data sending method, apparatus, and electronic device, a sound wave-based data receiving method, apparatus, and electronic device, and a sound wave-based data transmission system, which are described in detail one by one in the following example embodiments.

The sound wave-based data sending method provided in the present application includes: generating a filtered sound wave signal sequence according to a sound wave frequency sequence of to-be-sent data and a preset sending duration of a sound wave signal corresponding to a single character; and sending a sound wave signal corresponding to the to-be-sent data according to the filtered sound wave signal sequence. With such a filtered sound wave signal, in a cycle corresponding to each frequency of a sound waveform to be sent, a rising edge and a falling edge of the waveform are gradually attenuated to zero, while an in-band waveform signal is very flat and has a high gain, and is close to a direct current signal. This processing method not only can avoid noise caused by a difference during frequency switching but also can centralize energy of a sound signal in a band, achieving an effect of improving a communication distance.

Figure 1:
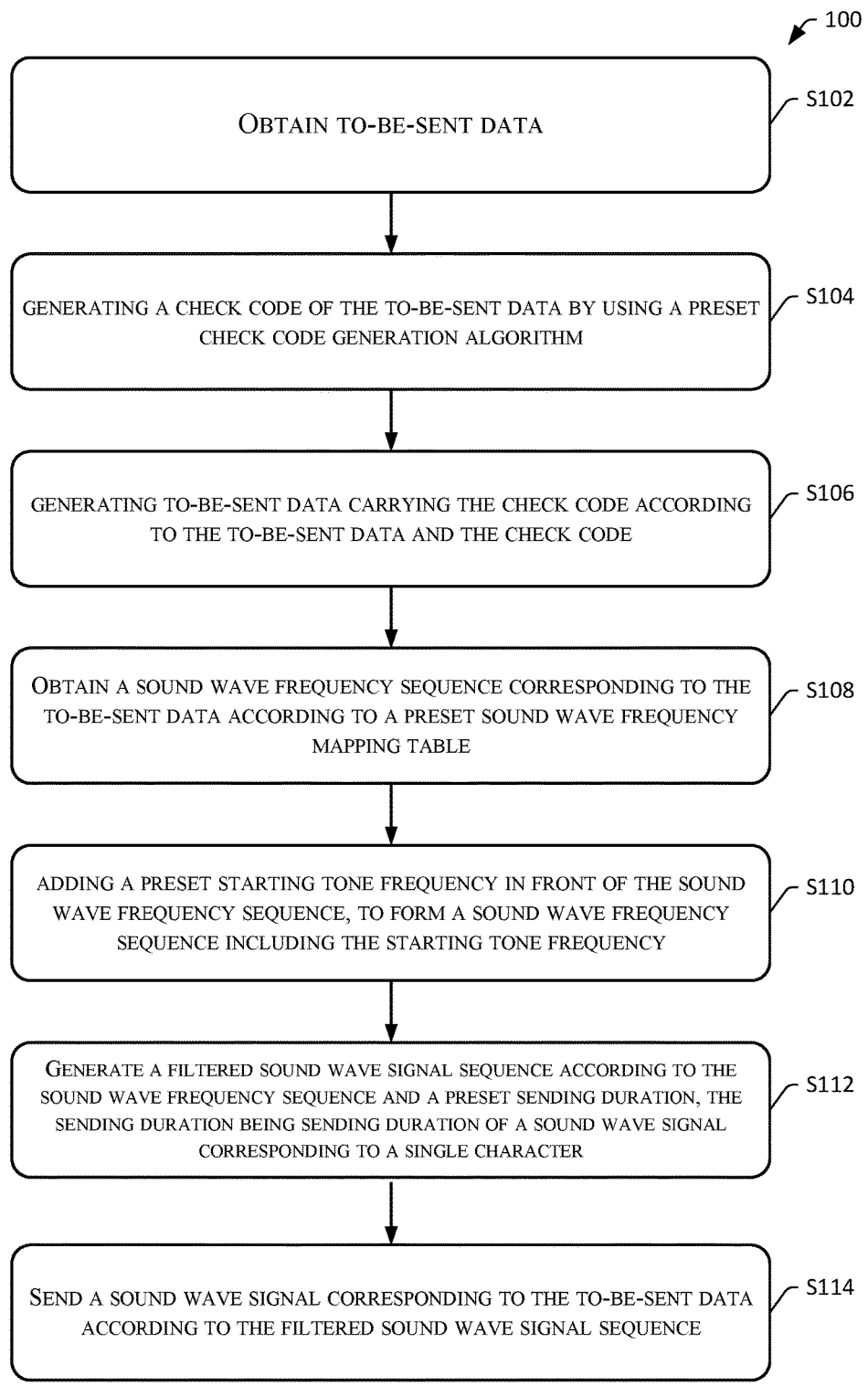
FIG. 1 is a flowchart of an example embodiment of a sound wave-based data sending method according to the present application.

Referring to FIG. 1, FIG. 1 is a flowchart of an example embodiment of a sound wave-based data sending method 100 according to the present application. The method 100 includes the following steps:

Step S102 obtaining to-be-sent data.

The sound wave-based data sending method 100 provided in the present application may be applied to a mobile terminal, a personal computer, and other embedded devices installed with a sound generator (such as a loudspeaker).

The to-be-sent data refers to data that needs to be sent out over sound waves. For example, the to-be-sent data is a transaction identification code in a mobile phone on-site payment scenario; the to-be-sent data is conference sign-in information in a conference sign-in scenario; the to-be-sent data is data such as a control instruction in a smart home control scenario.

To enable a receiving end to carry out bit error control, after step S102, the method 100 may further include the following steps: 1) step 104: generating a check code of the to-be-sent data by using a preset check code generation algorithm; and 2) step 106: generating to-be-sent data carrying the check code according to the to-be-sent data and the check code.

During specific implementation, an error detecting code, an error correcting code, an erasure code, or the like may be selected as the check code according to different functions of the bit error control. Wherein, the error detecting code only has an error bit identification function, but cannot correct an error bit. For example, a Cyclic Redundancy Check (CRC), a Block Check Character (BCC), a Parity Check bit, and the like are all error detecting codes. The error correcting code not only has an error bit identification function, but also can correct an error bit, e.g., error correcting codes such as RS codes (also known as Reed-Solomon codes). The erasure code not only can identify and correct an error bit, but also can delete information that cannot be corrected when the error bit exceeds a correction range. After a coding mode of the check code is selected, the check code of the to-be-sent data can be generated by using a corresponding check code generation algorithm.

As an example solution, the check code of the to-be-sent data may be generated using RS codes. In the RS coding mode, coding may be performed correspondingly according to different data lengths, and check codes of different lengths may be added. In a specific implementation, other check code generation algorithms may also be used, e.g., a CRC check algorithm, and the like. Whether to use the check code generation algorithm and which check code generation algorithm is used may be adjusted correspondingly according to a requirement of a specific implementation. These do not affect the core of the present application, and the present application makes no specific limitation.

In this example embodiment, the check code of the to-be-sent data is generated using RS codes. If a "domain" parameter of the RS codes is set to 5 bits, a word length of the RS codes is limited to $(2^5-1)=31$ characters, the length is 30 characters after a character representing a data length is removed, and each character has a length of 5 bits. If each character in the to-be-sent data is represented by using a 6-bit binary number, i.e., each character has a length of 6 bits, a maximum character length of the to-be-sent data is 30*5/6=25 characters. If the "domain" parameter of the RS codes is set to 6 bits, a word length of the RS codes is limited to $(2^6-1)=63$ characters, the length is 62 characters after a character representing a data length is removed, and each character has a length of 6 bits. If each character in the to-be-sent data is still represented by using a 6-bit binary number, the maximum character length of the to-be-sent data is 62 characters; if each character in the to-be-sent data is represented by using a 7-bit binary number, i.e., each character has a length of 7 bits, the maximum character length of the to-be-sent data is 62*6/7=53 characters.

In conclusion, the maximum character length of the to-be-sent data is correlated with the "domain" parameter of the RS codes and the number of characters which can be used in the to-be-sent data. Specifically, the maximum character length of the to-be-sent data is directly proportional to the "domain" parameter of the RS codes, and is inversely proportional to the number of characters which can be used in the to-be-sent data.

It should be noted that, a greater maximum character length of the to-be-sent data is not always better. A greater character length means a longer transmission time of the to-be-sent data in a channel, and correspondingly, the to-be-sent data is more probably interfered by an environment, thus affecting a transmission communication distance and identification accuracy.

As an example solution, after the obtaining to-be-sent data, the method 100 provided in the present application further includes the following step: determining whether a character length of the to-be-sent data is greater than a preset maximum character length threshold; if yes, proceeding to the next step S108 and if no, ending the method 100.

As a simplified implementation, a plaintext-form sound wave signal corresponding to the to-be-sent data may be directly broadcasted, that is, the data is not encrypted. Although this implementation is simple, it has a relatively obvious defect. For example, user account information transmitted in a mobile phone payment scenario is a part of user personal information, and from the perspective of user privacy protection, exposure to others should be avoided as much as possible. When the data is transmitted as a plaintext-form sound wave signal, a malicious attacker may obtain the information by means of eavesdropping and the like, and may illegally spread or use the intercepted information, thus bringing security threats to the user and the network. To avoid such a situation, before a sound wave frequency sequence corresponding to the to-be-sent data is obtained, encryption processing should be performed first, and then the frequency of the encrypted data is transformed.

In this example embodiment, the to-be-sent data is encrypted using an AES encryption algorithm, and in other implementations, other encryption algorithms may also be used, for example, a 3DES encryption algorithm, and the like. Whether to use an encryption algorithm and which encryption algorithm is used may be correspondingly adjusted according to a requirement of a specific implementation. These do not affect the core of the present application, and the present application makes no specific limitation.

After the to-be-sent data is obtained, the next step may be performed to obtain a sound wave frequency sequence corresponding to the to-be-sent data.

Step S108: obtaining a sound wave frequency sequence corresponding to the to-be-sent data according to a preset sound wave frequency mapping table.

The preset sound wave frequency mapping table includes a corresponding relationship between characters and sound wave frequencies. For example, a sound wave frequency corresponding to a character "0" is "17100 Hz", a sound wave frequency corresponding to a character "1" is "17200 Hz", a sound wave frequency corresponding to a character "2" is "17300 Hz", a sound wave frequency corresponding to characters "31" is "19900 Hz", and so on.

The sound wave frequency may be a low sound wave frequency (such as 30 Hz), a medium sound wave frequency (such as 12000 Hz) or an ultrasonic frequency (such as a band from 16 KHz to 22 KHz). Due to the limitation of a common sampling frequency 44100 Hz of a receiving end device, the sound wave frequency generally would not exceed a band corresponding to ultrasonic waves; otherwise, the receiving end would not be able to restore original sound wave information completely.

As an example solution, as sounds in an ultrasonic frequency range cannot be heard by human ears, the ultrasonic frequency may be used as the sound wave frequency corresponding to the to-be-sent data. However, the number of available frequency points in the ultrasonic frequency range is limited, and in actual application, in order to increase the number of available frequency points, sound wave frequencies in a low band or medium band may also be used.

It should be noted that, when the sound wave frequencies in the low band or medium band are used, since these sounds can be heard by human ears, a corresponding technology is needed to ensure that the sound wave signal corresponding to the to-be-sent data can be extracted from the environment.

In addition, to avoid mutual interference between sound wave signals corresponding to different characters, generally, it is necessary to set a particular frequency interval between adjacent sound wave frequencies in the sound wave frequency mapping table. By taking an ultrasonic band as an example, usually, 32 frequency points may be set in the band, and if more frequency points are set, it is relatively difficult for the receiving end to differentiate sound wave signals corresponding to adjacent frequencies.

When 32 frequency points are set in the ultrasonic band, if characters in the to-be-sent data have a one-to-one mapping relationship with sound wave frequencies, the characters in the to-be-sent data can include only 32 types of characters. Apparently, this processing method extremely limits the character expression method of the to-be-sent data.

As a relatively abundant character expression method of the to-be-sent data, characters in the to-be-sent data may include Arabic numerals, 26 English characters in upper case and lower case, and several common special characters; and there are a total of 64 source code characters. During specific implementation, a source code character range may be defined according to a business requirement.

In the following, 64 original characters being mapped to 32 sound wave frequencies is taken as an example to illustrate a mapping process between characters in the to-be-sent data and the sound wave frequencies. To facilitate the illustration of the mapping process, characters in the to-be-sent data are referred to as original characters, and characters in the sound wave frequency mapping table are referred to as target characters.

In order to map the 64 original characters to the 32 sound wave frequencies, this example embodiment employs the preset character mapping table to first map the original characters into target characters, and then map the target characters into the sound wave frequencies.

The character mapping table includes a corresponding relationship between the original characters and the target characters. The target character may be expressed by using a binary number (which may also be a hexadecimal number or the like), and each character in the 64 original characters may be expressed by using a target character which is in the form of a 6-bit binary number. For example, a target character corresponding to the original character "0" is "000000", "1" corresponds to "000001", and so on.

By taking the to-be-sent data being "123456ABc@" as an example, a target character sequence corresponding to the data is "000001, 000010, 000011, 000100, 000101, 000110, 001010, 001011, 010000, 111110"; in order to map the target character sequence to sound wave frequencies, first, it is necessary to segment a character string formed by these 6-bit binary numbers, and a result after the segmentation is "00001, 00100, 01100, 00000, 10001, 00010, 00110, 10100, 01100, 00001, 00100, 11111". As each 5-bit binary number corresponds to one sound wave frequency, 64 characters can be mapped to 32 sound wave frequencies.

As an example solution, after the obtaining a sound wave frequency sequence corresponding to the to-be-sent data, the method 100 provided in the present application further includes the following step 110: adding a preset starting tone frequency in front of the sound wave frequency sequence, to form a sound wave frequency sequence including the starting tone frequency.

The starting tone refers to an identification tone indicating that the to-be-sent data is going to start. The starting tone corresponds to a piece of particular frequency information. Upon detection of the piece of particular information, it indicates that a sound wave signal collected by the receiving end includes to-be-received data, and the receiving end may continue subsequent data identification. When the receiving end cannot detect the starting tone, it may directly result in failure of the data identification.

By using the sound wave-based data sending method 100 provided in the present application, the sound wave signal corresponding to the to-be-sent data may be sent only once after the starting tone. This processing method enables the receiving end to quickly obtain the sound wave signal corresponding to the to-be-sent data after detecting the starting tone. Therefore, by employing the starting tone, the speed at which the receiving end identifies the to-be-received data can be effectively improved.

It should be noted that, to increase the probability of the starting tone being detected, at least two starting tones may be set. Theoretically, the more bits of the starting tone, the better. However, duration of a waveform corresponding to each character is limited, and as the number of bits of the starting tone increases, the transmission efficiency decreases. According to test results, it is preferred to set two starting tones.

Step S112: generating a filtered sound wave signal sequence according to the sound wave frequency sequence and a preset sending duration.

The preset sending duration refers to sending duration of a sound wave signal corresponding to each character in the to-be-sent data. For example, the sending duration may be set to a millisecond-level time length or the like.

The filtered sound wave signal means that a rising edge and a falling edge of a sound wave signal corresponding to a frequency are both smooth curves without steps (straight or steep rising), while an in-band waveform signal is very flat and has high amplitude.

The method 100 provided in the present application, by using a filtered sound wave signal, can deliver at least the following advantages: 1) when the loudspeaker broadcasts the sound, the sound is not detectable by human ears; otherwise, pattering noise may occur; 2) energy of the sound is centralized in the band, that is, there is a relatively large flat portion, which means that there are a lot of points with maximum amplitude in this portion, and during transmission, despite the influence of attenuation, the sound can be transmitted farther due to sufficient points having maximum amplitude; and 3) intersymbol interference can be restrained.

Figure 2:
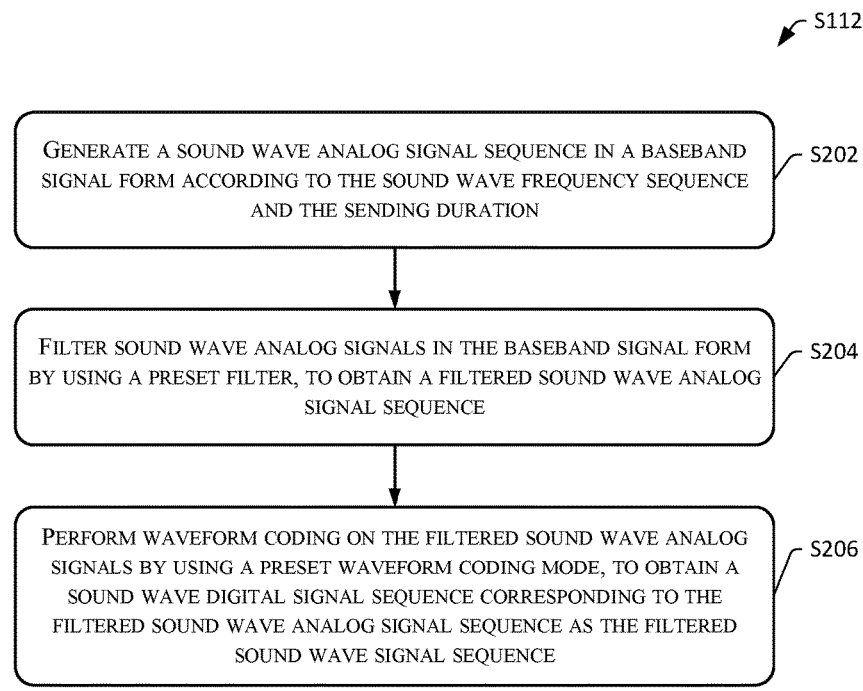
FIG. 2 is a detailed flowchart of step S112 in an example embodiment of a sound wave-based data sending method according to the present application.

This step may be implemented in various specific methods, as long as the function of generating a filtered sound wave signal sequence according to the sound wave frequency sequence and the sending duration can be realized. Referring to FIG. 2, FIG. 2 is a detailed flowchart of step S112 of an example embodiment of a sound wave-based data sending method according to the present application. In this example embodiment, step S112 may include the following steps:

Step S202: generating a sound wave analog signal sequence in a baseband signal form according to the sound wave frequency sequence and the sending duration.

The baseband signal refers to an original electric signal without modulation (frequency spectrum shift and transform). The baseband signal has features of a relatively low frequency, a signal spectrum that begins near the zero frequency, and a low pass form.

The sound wave analog signal sequence in a baseband signal form can be generated according to the sound wave frequency sequence and the sending duration. One sound wave frequency corresponds to one segment of sound wave analog signal in the baseband signal form, and a time duration of each segment of sound wave analog signal in the baseband signal form is the sending duration. Finally, various segments of sound wave analog signal in the baseband signal form are used to form the sound wave analog signal sequence in the baseband signal form.

After the sound wave analog signal sequence in the baseband signal form is generated, the next step may be performed to generate a filtered sound wave analog signal sequence.

Step S204: filtering sound wave analog signals in the baseband signal form by using a preset filter, to obtain a filtered sound wave analog signal sequence.

In a digital communications system, before entering a modulator, a baseband signal has a rectangular pulse waveform, and a mutated rising edge and falling edge include relatively abundant high frequency components. The bandwidth of the spectrum of the signal is relatively wide, and when the signal passes through a band-limited channel, a pulse of a single character may extend into a code element of an adjacent symbol, generating intersymbol interference, which increases an error probability when the receiving end receives a code element. Therefore, under a condition of a limited channel bandwidth, if the bit error rate needs to be reduced and channel frequency utilization needs to be improved, it is necessary to filter a signal before the signal is transmitted, to improve the spectral characteristic thereof and generate a waveform suitable for channel transmission.

The method provided in the present application filters each sound wave analog signal in the baseband signal form by using the preset filter, so that the rising edge and the falling edge with pulse mutations become smooth, and out-of-band frequency attenuation is accelerated. After the sound wave analog signals in the baseband signal form are filtered by the filter, filtered sound wave analog signals corresponding to the sound wave analog signals in the baseband signal form respectively can be obtained, thereby forming the filtered sound wave analog signal sequence.

Types of the preset filter include, but are not limited to, a finite impulse response filter (FIR) or an infinite impulse response filter (IIR), and the preset filter may also be a filter of another type, as long as the rising edge and the falling edge with pulse mutations can become smooth, and out-of-band frequency attenuation can be accelerated. The IIR digital filter is convenient and simple, but it has a non-linear phase, which requires phase correction using an all-pass network, and it is difficult to guarantee stability. The FIR filter has a desirable linear phase feature, and a unit sampling response of the FIR filter is finite in length; therefore, the performance of the filter is stable. During specific implementation, a filter of any of the foregoing types can be selected according to an actual situation.

As the IIR digital filter is convenient and simple, the IIR digital filter is selected in this example embodiment to filter the sound wave analog signal in the baseband signal form. The filtered sound wave analog signal generated in this example embodiment is high in bandpass flatness, and is close to a direct current signal; then, the signal is slowly attenuated to a cut-off frequency point. The signal is very smooth during the attenuation.

Step S206: performing waveform coding on the filtered sound wave analog signals by using a preset waveform coding mode, to obtain a sound wave digital signal sequence corresponding to the filtered sound wave analog signal sequence as the filtered sound wave signal sequence.

The waveform coding refers to a process of directly converting a time-domain signal into a digital code. Through the waveform coding, it is attempted to make a reconstructed audio waveform maintain a waveform shape of an original audio signal. A basic principle of the waveform coding is sampling analog audio in a timeline according to a particular rate, then hierarchically quantizing amplitude samples, and using codes to represent the amplitude samples. Decoding is a reverse process thereof, in which a received digital sequence is decoded and filtered to restore an analog signal.

The preset waveform coding mode refers to a coding mode of converting an analog signal into a digital signal, for example, a Pulse Code Modulation (PCM) coding mode, a Differential Pulse Code Modulation (DPCM)) coding mode, and the like.

In this example embodiment, the filtered sound wave analog signal is coded using the PCM coding mode; meanwhile, in combination with a compression algorithm, data volume and transmission volume are reduced. The PCM is the commonest and simplest waveform coding. It is a direct and simple method for coding uniformly quantized data that is obtained by performing sampling and A/D conversion on audio, and is the foundation of other coding algorithms. Specifically, the compression algorithm may be an a-law or u-law compression algorithm. The u-law is generally employed in China and Europe for coding.

Step S114: sending a sound wave signal corresponding to the to-be-sent data according to the filtered sound signal sequence.

After the filtered sound wave signal sequence corresponding to the to-be-sent data is generated through the foregoing step, in this step, a sound generator is controlled to send a sound wave signal corresponding to the to-be-sent data according to the filtered sound wave signal sequence.

The method provided in the present application, without any network, can use a sound generator such as a loudspeaker on an existing mobile terminal, a PC, or any other embedded platforms to send an audio signal corresponding to to-be-sent data.

By employing the method provided in the present application, sound wave data can be sent to a relatively far distance in near field communication. It is proved through experiments that while a relatively high identification rate is ensured, the verified farthest and relatively reliable communication identification distance of the method provided in the present application reaches approximately 15 m at present, which is far beyond sound wave communication solutions of the same type.

In the foregoing example embodiment, a sound wave-based data sending method 100 is provided. Correspondingly, the present application further provides a sound wave-based data sending apparatus. The apparatus corresponds to the example embodiment of the foregoing method 100.

Figure 3:
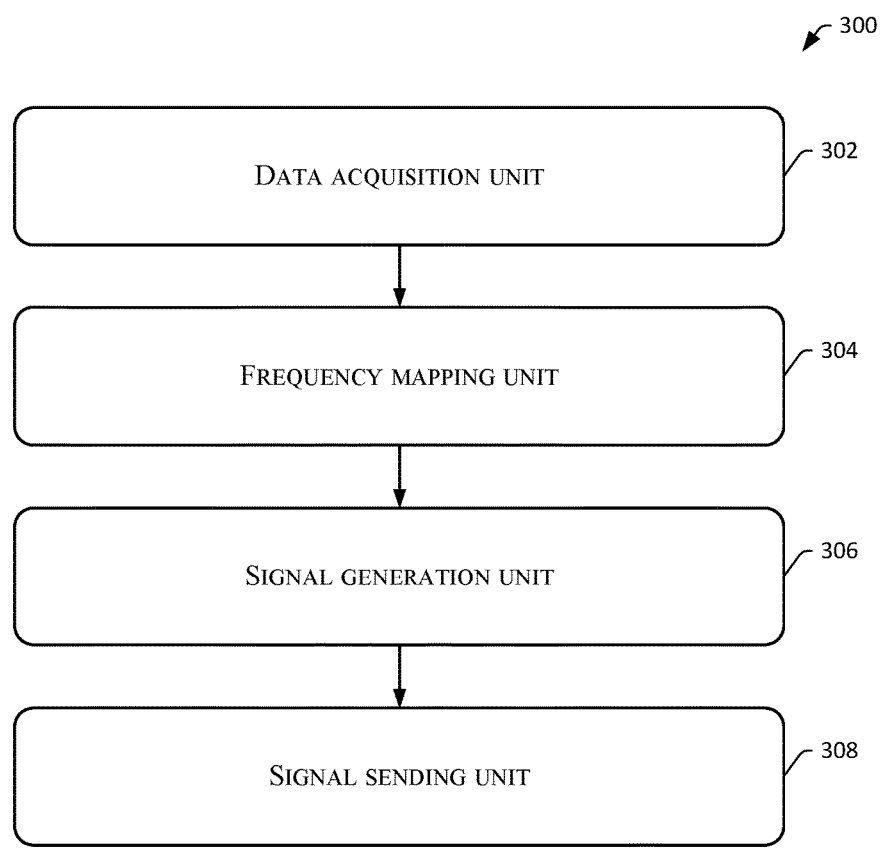
FIG. 3 is a schematic diagram of an example embodiment of a sound wave-based data sending apparatus according to the present application.

Referring to FIG. 3, FIG. 3 is a schematic diagram of an example embodiment of a sound wave-based data sending apparatus 300 according to the present application. As the apparatus example embodiment is basically similar to the method example embodiment, the description is relatively simple. For related portions, reference may be made to partial description of the method example embodiment. The apparatus example embodiment described below is merely for illustrative purposes.

A sound wave-based data sending apparatus of this example embodiment includes:

a data acquisition unit 302 configured to obtain to-be-sent data;

a frequency mapping unit 304 configured to obtain a sound wave frequency sequence corresponding to the to-be-sent data according to a preset sound wave frequency mapping table;

a signal generation unit 306 configured to generate a filtered sound wave signal sequence according to the sound wave frequency sequence and a preset sending duration, the sending duration being sending duration of a sound wave signal corresponding to a single character; and a signal sending unit 306 configured to send a sound wave signal corresponding to the to-be-sent data according to the filtered sound wave signal sequence.

Figure 4:
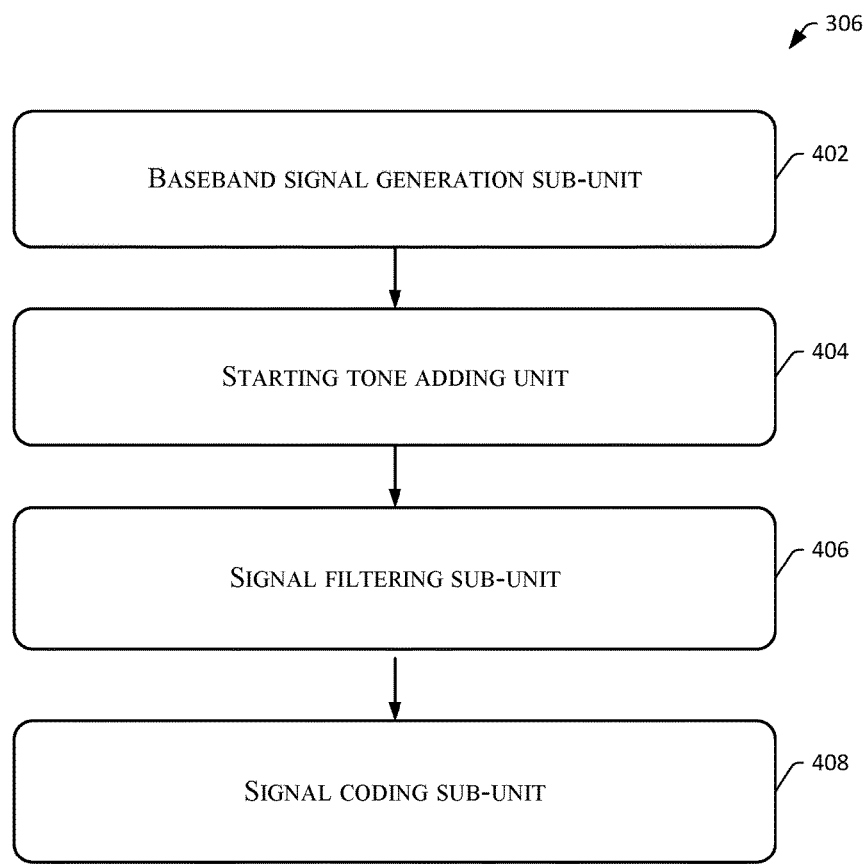
FIG. 4 is a detailed schematic diagram of a signal generation unit 306 in an example embodiment of a sound wave-based data sending apparatus according to the present application.

Referring to FIG. 4, FIG. 4 is a detailed schematic diagram of an example embodiment of the signal generation unit 306 in the sound wave-based data sending apparatus according to the present application. Optionally, the signal generation unit 3306 includes:

a baseband signal generation sub-unit 402 configured to generate a sound wave analog signal sequence in a baseband signal form according to the sound wave frequency sequence and the sending duration;

a signal filtering sub-unit 406 configured to filter sound wave analog signals in the baseband signal form by using a preset filter, to obtain a filtered sound wave analog signal sequence; and a signal coding sub-unit 408 configured to perform waveform coding on the filtered sound wave analog signals by using a preset waveform coding mode, to obtain a sound wave digital signal sequence corresponding to the filtered sound wave analog signal sequence as the filtered sound wave signal sequence.

Optionally, the apparatus further includes:

a starting tone adding unit 404 configured to add a preset starting tone frequency in front of the sound wave frequency sequence, to form a sound wave frequency sequence including the starting tone frequency.

Figure 5:
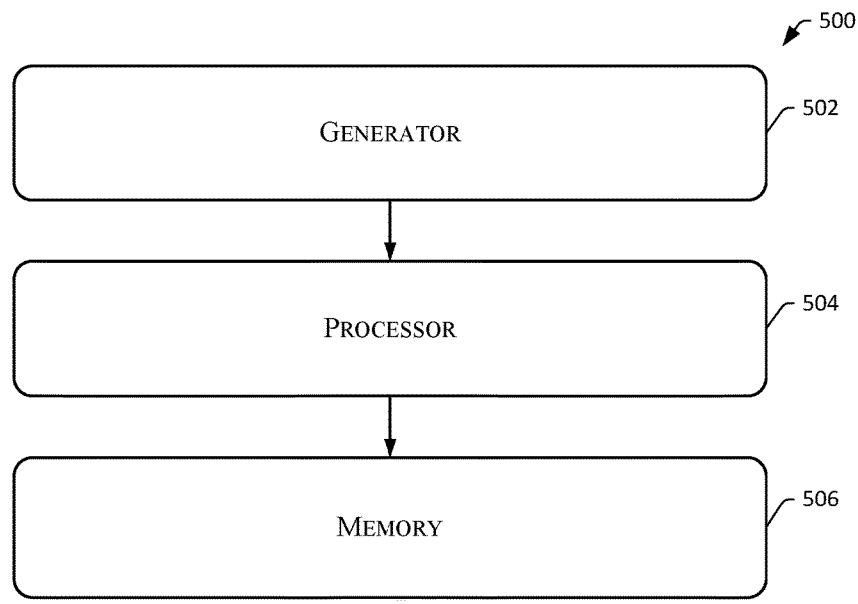
FIG. 5 is a schematic diagram of an example embodiment of an electronic device according to the present application.

Referring to FIG. 5, FIG. 5 is a schematic diagram of an example embodiment of an electronic device 500 according to the present application. As the device example embodiment is basically similar to the method example embodiment, the description is relatively simple. For related portions, reference may be made to partial description of the method example embodiment. The device example embodiment described below is merely for illustrative purposes.

An electronic device 500 of this example embodiment includes: a sound generator 502; a processor 504; and a memory 506 configured to store a program for implementing a sound wave-based data sending method. After being powered on and running the program of the sound wave-based data sending method through the processor 504, the device performs the following steps: obtaining to-be-sent data; obtaining a sound wave frequency sequence corresponding to the to-be-sent data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the to-be-sent data according to the filtered sound wave signal sequence.

Figure 6:
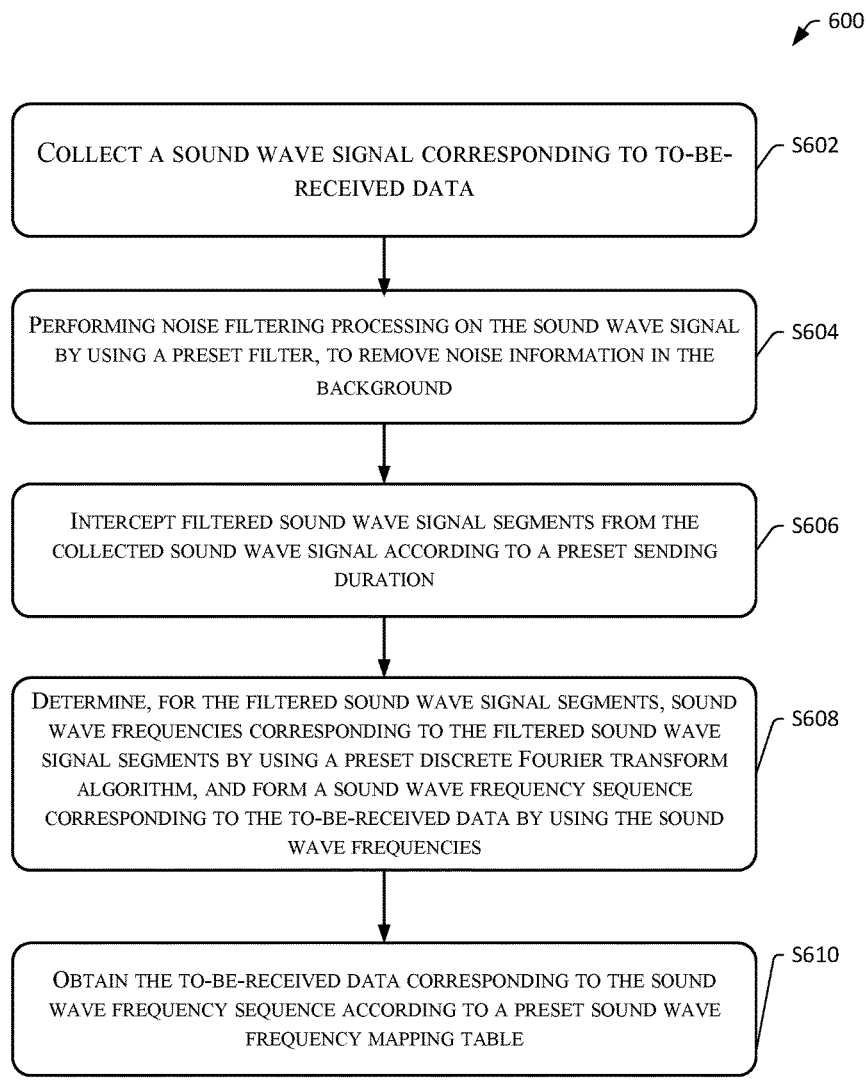
FIG. 6 is a flowchart of an example embodiment of a sound wave-based data receiving method according to the present application.

Corresponding to the foregoing sound wave-based data sending method 100, the present application further provides a sound wave-based data receiving method. 600 Referring to FIG. 6, FIG. 6 is a flowchart of an example embodiment of a sound wave-based data receiving method 600 according to the present application. Identical portions between this example embodiment and the first example embodiment are not described again. Please refer to the corresponding portions of the first example embodiment. A sound wave-based data receiving method 600 provided in the present application includes the following steps:

Step S602: collecting a sound wave signal corresponding to to-be-received data.

The sound wave-based data receiving method 600 provided in the present application may be applied to a mobile terminal, a personal computer, and other embedded devices installed with a listener (such as a microphone).

In a digital communications system, the sound wave signal, which is transmitted in a channel, corresponding to the to-be-received data is an analog signal. A receiving end may collect the sound wave signal corresponding to the to-be-received data through a listener such as a microphone, and perform analog/digital conversion in the signal collection process, to obtain a sound wave signal in the form of a digital signal.

According to the Nyquist sampling theorem, a sampling signal can completely reserve information of an original signal when a sampling frequency of a receiving end is higher than twice the maximum frequency in collected sound data, and the signal is completely restored. This sampling frequency is 44.1 KHz or higher. Due to limitations of an existing device, the sampling frequency is generally 44.1 KHz.

The sound wave signal generally would be affected by the environment during transmission. Therefore, after the collecting a sound wave signal corresponding to to-be-received data, the method 600 further includes step 604: performing noise filtering processing on the sound wave signal by using a preset filter, to remove noise information in the background. During specific implementation, means such as a direct current filter may be employed to remove noise information in the background.

Step S606: intercepting filtered sound wave signal segments from the collected sound wave signal according to a preset sending duration.

The preset sending duration is a concept the same as the sending duration in the first example embodiment above, and is not described again here.

In this step, signal interception is performed on the collected sound wave signal according to the preset sending duration of the sound wave signal corresponding to a single character, to obtain filtered sound wave signal segments included in the collected sound wave signal. The filtered sound wave signal is a concept the same as the filtered sound wave signal in the first example embodiment above, and is not described again here.

In a practical application, the receiving end may start collecting sound wave signals before a sending end sends sound wave signals, or may start collecting sound wave signals during sending of sound wave signals by the sending end. When a signal collection time is ahead of schedule or delayed, a sound wave signal collected by the receiving end may not exactly correspond to the sound wave signal of the to-be-sent data sent by the sending end. In this case, if signal interception is still performed on the collected sound wave signal according to the preset sending duration of the sound wave signal corresponding to a single character, the intercepted sound wave signal segment generally includes multiple frequencies, thus greatly reducing the identification accuracy.

In order to solve this problem and to identify data in the sound wave signal which is collected by the receiving end and does not exactly correspond to the sound wave signal sent by the sending end, a sound wave signal may be sent in a method of adding, at the sending end, a starting tone in front of the sound wave signal corresponding to the to-be-sent data.

The starting tone corresponds to a piece of particular frequency information. when the receiving end detects the piece of particular frequency information, it indicates that the collected sound wave signal includes to-be-received data, and subsequent data identification can be performed. When the starting tone cannot be detected due to the delay of the signal collection time, excessively large ambient noise disturbance, an overlong distance, or other causes, the identification may fail directly; after the sending end sends the sound wave signal once again, the receiving end may collect the signal again and carry out identification. It can be seen that, by using a starting tone for data identification, it can be quickly determined whether to continue a subsequent data identification operation, thereby achieving an effect of improving the speed at which the receiving end identifies the to-be-received data.

Figure 7:
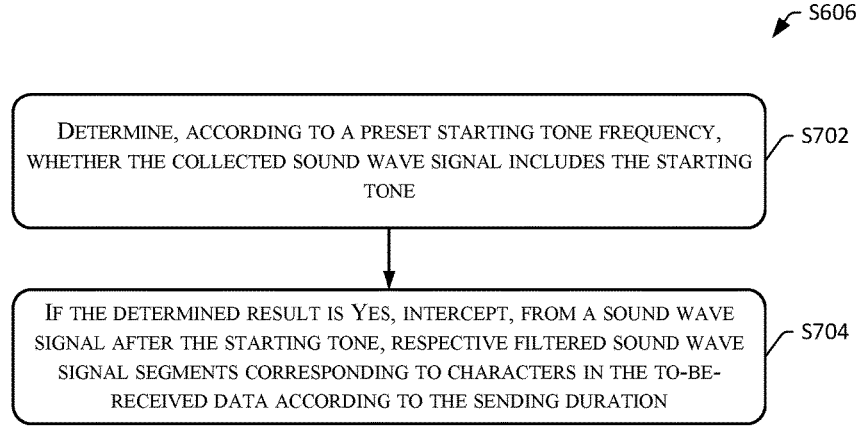
FIG. 7 is a detailed flowchart of step S606 in an example embodiment of a sound wave-based data receiving method according to the present application.

Referring to FIG. 7, FIG. 7 is a detailed flowchart of step S606 in an example embodiment of a sound wave-based data receiving method according to the present application. In this example embodiment, the collected sound wave signal includes a sound wave signal corresponding to the starting tone, and step S606 may include the following specific steps:

Step S702: determining, according to a preset starting tone frequency, whether the collected sound wave signal includes the starting tone.

Figure 8:
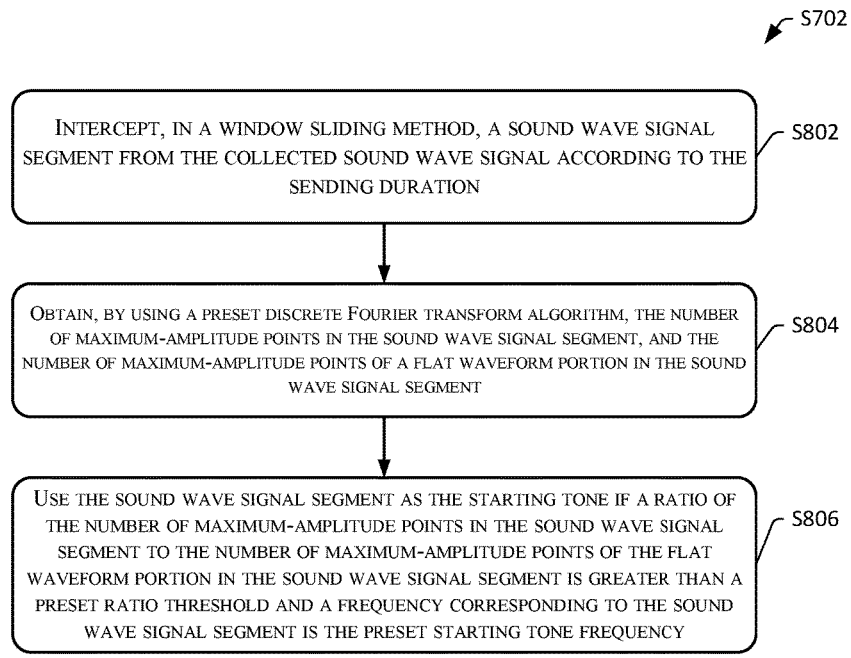
FIG. 8 is a detailed flowchart of starting tone detection in an example embodiment of a sound wave-based data receiving method according to the present application.

Referring to FIG. 8, FIG. 8 is a detailed flowchart of starting tone detection 702 in an example embodiment of a sound wave-based data receiving method according to the present application. In this example embodiment, the step of determining whether the collected sound wave signal includes the starting tone may include the following specific steps:

Step S802: intercepting, in a window sliding method, a sound wave signal segment from the collected sound wave signal according to the sending duration.

For the detection of the starting tone, this example embodiment employs a sliding window to perform sliding detection on the starting tone. When the number of maximum-amplitude points detected by the window is more than a preset ratio threshold (e.g., 50%) of the number of points in an in-band flat portion in one time-domain waveform, it is determined that the starting tone is detected, and this starting point is recorded.

Step S804: obtaining, by using a preset discrete Fourier transform algorithm, the number of maximum-amplitude points in the sound wave signal segment and the number of maximum-amplitude points of a flat waveform portion in the sound wave signal segment.

The sound wave signal segment is transformed from a time domain to a frequency domain by means of Fourier transform. The length of a time-domain signal processed in each Fourier transform is t*fs, wherein t is the preset sending duration, and fs is a sampling frequency (such as 44.1 KHz). In other words, each Fourier transform processes discrete time-domain sound wave information of a fixed number of points.

Through the preset discrete Fourier transform algorithm, spectrum information corresponding to the sound wave signal segment can be obtained; the number of maximum-amplitude points in the sound wave signal segment and the number of maximum-amplitude points of the flat waveform portion in the sound wave signal segment can be obtained from the spectrum information.

The discrete Fourier transform algorithm may be a fast Fourier transform (FFT) algorithm or a discrete Fourier transform (DFT) algorithm. The FFT algorithm can transform the sound wave signal from the time domain to the frequency domain through calculation, to obtain a frequency-domain amplitude response thereof. Compared with the DFT, in which $N^2$ times of complex multiplication and $N*(N-1)$ times of complex addition are carried out, the FFT reduces the calculation amount from $N^2$ to $N/2*\log N$, which greatly improves the calculation speed. The so-called amplitude response means that amplitude information of a sound changes as the frequency of the sound changes.

Step S806: using the sound wave signal segment as the starting tone if a ratio of the number of maximum-amplitude points in the sound wave signal segment to the number of maximum-amplitude points of the flat waveform portion in the sound wave signal segment is greater than a preset ratio threshold and a frequency corresponding to the sound wave signal segment is the preset starting tone frequency.

When the number of maximum-amplitude points detected by the window is more than the preset ratio threshold of the number of points in the in-band flat portion in one time-domain waveform and the frequency corresponding to the sound wave signal segment is the preset starting tone frequency, it can be determined that the starting tone is detected, and this starting point is recorded. Wherein, the preset ratio threshold may be set to a threshold value such as 1/2 according to experience.

During specific implementation, the frequency corresponding to the sound wave signal segment may be determined according to the following method: recording, by using a maximum peak detection algorithm, frequency and amplitude information corresponding to several maximum-amplitude points in the window during sliding of the window, and then carrying out detection determination, i.e., carrying out joint frequency determination on the recorded frequency and amplitude information; when frequency determination results of two aspects are consistent, the frequency corresponding to the sound wave signal segment can be determined.

Step S704: If the determined result is Yes, intercepting, from a sound wave signal after the starting tone, respective filtered sound wave signal segments corresponding to characters in the to-be-received data according to the sending duration.

If the starting tone is detected through step S702, starting from the detected starting point, the window is slid by a distance of a fixed length (the preset sending duration) each time to detect other audio information (audio information corresponding to each character in the to-be-received data), where the length is a length of a time-domain waveform corresponding to one piece of frequency information.

Step S608: determining, for the filtered sound wave signal segments, sound wave frequencies corresponding to the filtered sound wave signal segments by using a preset discrete Fourier transform algorithm, and forming a sound wave frequency sequence corresponding to the to-be-received data by using the sound wave frequencies.

This step transforms the sound wave signal segment from the time domain to the frequency domain by using the preset discrete Fourier transform algorithm, to obtain frequency-domain amplitude responses of the filtered sound wave signal segments. The amplitude response means that amplitude information of a sound changes as the frequency of the sound changes. After the frequency-domain amplitude responses of the filtered sound wave signal segments are obtained, the sound wave frequencies corresponding to the filtered sound wave signal segments can be determined according to amplitudes corresponding to different frequencies.

During specific implementation, the method of determining sound wave frequencies corresponding to the filtered sound wave signal segments may be a frequency detection method similar to that for the starting tone described above, in which statistics is conducted on frequency information and amplitude information corresponding to several maximum-amplitude points in the sound wave signal segment, to obtain respective sound wave frequencies corresponding to the filtered sound wave signal segments according to a determination method the same as that for the starting tone, thereby obtaining a sound wave frequency sequence corresponding to the to-be-received data.

In this example embodiment, the step of determining sound wave frequencies corresponding to the filtered sound wave signal segments may include the following detailed steps: 1) obtaining spectrum information corresponding to the filtered sound wave signal segments by using the preset discrete Fourier transform algorithm; 2) extracting, from the spectrum information by using a maximum peak detection algorithm, a preset number of frequency points that are greater than a preset amplitude threshold; and 3) determining, according to the preset number of frequency points and amplitudes corresponding to the frequency points, sound wave frequencies corresponding to the filtered sound wave signal segments.

Step S610: obtaining the to-be-received data corresponding to the sound wave frequency sequence according to a preset sound wave frequency mapping table.

This step corresponds to step S108 in FIG. 1 in the first example embodiment above. In step S108 in the first example embodiment above, characters in the to-be-received data are mapped into sound wave frequencies, and in this step, sound wave frequencies are mapped into characters in the to-be-received data, thereby obtaining the to-be-received data.

During specific implementation, if the to-be-received data includes a check code, corresponding decoding check processing further needs to be performed on the detected to-be-received data. If the check fails, the identification is ended; if the check succeeds, the to-be-received data, which carries the check code, corresponding to the sound wave frequency sequence is obtained, thus obtaining the to-be-received data.

If the sending end performs the processing of mapping original characters into target characters according to a preset character mapping table, i.e., the to-be-received data is data in a target character form, reverse mapping processing needs to be performed on the characters, to restore the target characters to the original characters, thereby obtaining original to-be-sent data information.

During specific implementation, the reverse mapping processing on the characters may include the following detailed steps: 1) extracting, from data in the target character form, a binary number corresponding to an original character according to a preset binary number bit length corresponding to the original character; and 2) obtaining to-be-received data in an original character form according to a preset character mapping table.

For example, data in a target character form corresponding to the collected sound wave signal is "00001, 00100, 01100, 00000, 10001, 00010, 00110, 10100, 01100, 00001, 00100, 11111", that is, a bit length of a target character corresponding to each sound wave frequency is 5 bits. If a binary number bit length corresponding to an original character is 6 bits, an original character sequence corresponding to the foregoing data is "000001, 000010, 000011, 000100, 000101, 000110, 001010, 001011, 010000, 111110", and after conversion according to the character mapping table, the obtained to-be-received data in the original character form is "123456ABc@".

In the foregoing example embodiment, a sound wave-based data receiving method is provided. Correspondingly, the present application further provides a sound wave-based data receiving apparatus. The apparatus corresponds to the foregoing method example embodiment.

Figure 9:
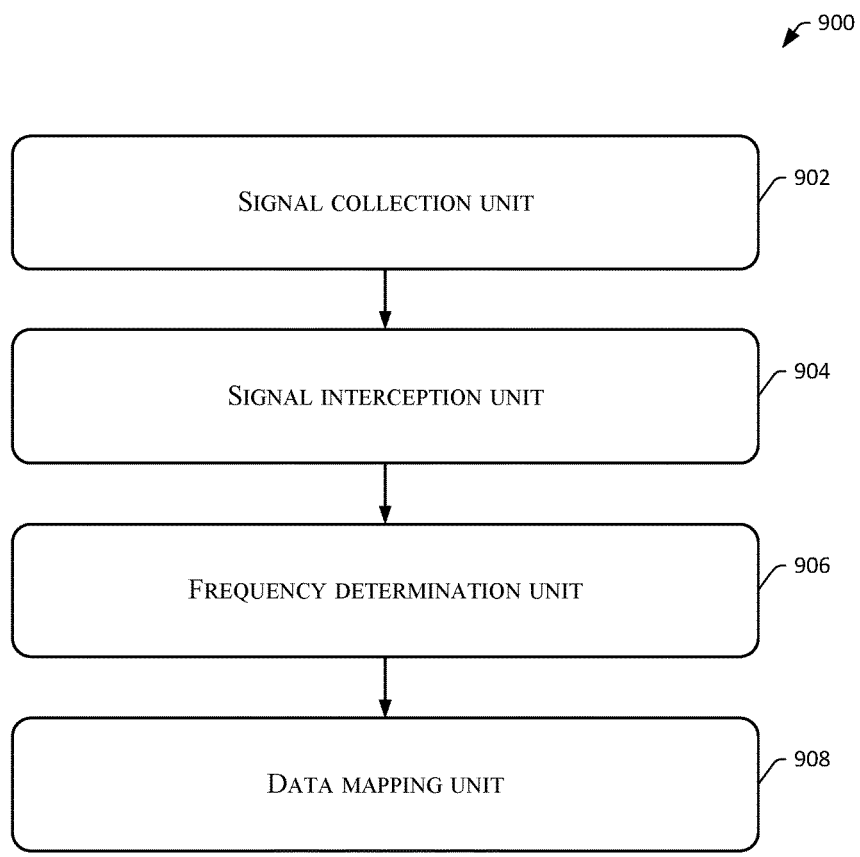
FIG. 9 is a schematic diagram of an example embodiment of a sound wave-based data receiving apparatus according to the present application.

Referring to FIG. 9, FIG. 9 is a schematic diagram of an example embodiment of a sound wave-based data receiving apparatus 900 according to the present application. As the apparatus example embodiment is basically similar to the method example embodiment, the description is relatively simple. For related portions, reference may be made to partial description of the method example embodiment. The apparatus example embodiment described below is merely for illustrative purposes.

A sound wave-based data receiving apparatus 900 of this example embodiment includes:

a signal collection unit 902 configured to collect a sound wave signal corresponding to to-be-received data;

a signal interception unit 904 configured to intercept filtered sound wave signal segments from the collected sound wave signal according to a preset sending duration, the sending duration being sending duration of a sound wave signal corresponding to a single character;

a frequency determination unit 906 configured to determine, for the filtered sound wave signal segments, sound wave frequencies corresponding to the filtered sound wave signal segments by using a preset discrete Fourier transform algorithm, and form a sound wave frequency sequence corresponding to the to-be-received data by using the sound wave frequencies; and a data mapping unit 908 configured to obtain the to-be-received data corresponding to the sound wave frequency sequence according to a preset sound wave frequency mapping table.

Figure 10:
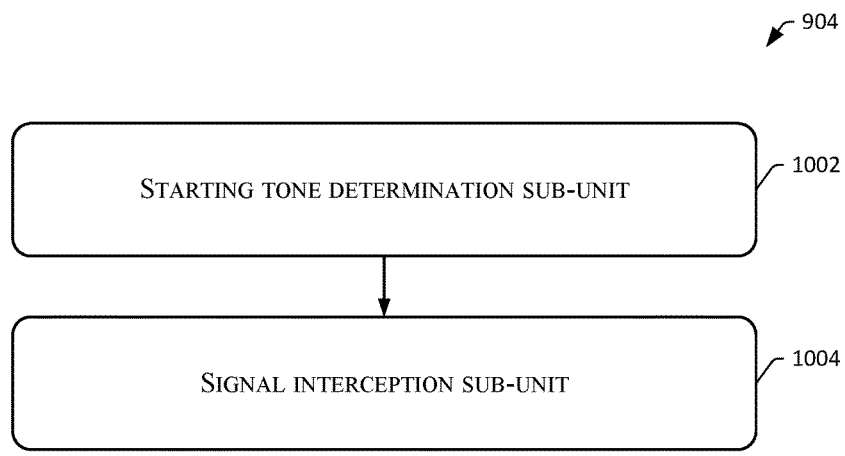
FIG. 10 is a detailed schematic diagram of a signal interception unit 904 in an example embodiment of a sound wave-based data receiving apparatus according to the present application.

Referring to FIG. 10, FIG. 10 is a detailed schematic diagram of a signal interception unit 904 in an example embodiment of a sound wave-based data receiving apparatus according to the present application. Optionally, the collected sound wave signal includes a sound wave signal corresponding to a starting tone and a sound wave signal corresponding to the to-be-received data; the signal interception unit 904 includes:

a starting tone determination sub-unit 1002 configured to determine, according to a preset starting tone frequency, whether the collected sound wave signal includes the starting tone; and a signal interception sub-unit 1004 configured to: if the determined result is Yes, intercept, from a sound wave signal after the starting tone, filtered sound wave signal segments corresponding to characters in the to-be-received data according to the sending duration.

The starting tone determination sub-unit 1002 includes:

a starting tone signal interception sub-unit configured to intercept, in a window sliding method, a sound wave signal segment from the collected sound wave signal according to the sending duration;

a Fourier transform sub-unit configured to obtain, by using a preset discrete Fourier transform algorithm, the number of maximum-amplitude points in the sound wave signal segment, and the number of maximum-amplitude points of a flat waveform portion in the sound wave signal segment; and a starting tone determination sub-unit configured to use the sound wave signal segment as the starting tone if a ratio of the number of maximum-amplitude points in the sound wave signal segment to the number of maximum-amplitude points of the flat waveform portion in the sound wave signal segment is greater than a preset ratio threshold and a frequency corresponding to the sound wave signal segment is the preset starting tone frequency.

Figure 11:
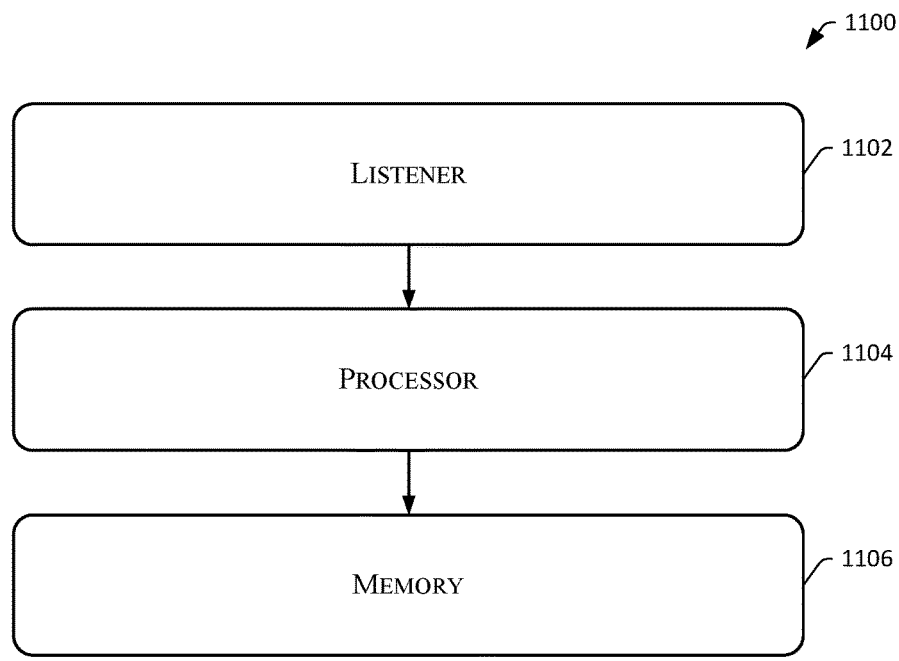
FIG. 11 is a schematic diagram of an example embodiment of an electronic device according to the present application.

Referring to FIG. 11, FIG. 11 is a schematic diagram of an example embodiment of an electronic device 1100 according to the present application. As the device 1100 example embodiment is basically similar to the method 600 example embodiment, the description is relatively simple. For related portions, reference may be made to partial description of the method example embodiment. The device example embodiment described below is merely for illustrative purposes.

An electronic device 1100 of this example embodiment includes: a listener 1102; a processor 1104; and a memory 1106 configured to store a program for implementing a sound wave-based data receiving method. After being powered on and running the program of the sound wave-based data receiving method through the processor 1104, the device performs the following steps: collecting a sound wave signal corresponding to to-be-received data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the to-be-received data by using the sound wave frequencies; and obtaining the to-be-received data corresponding to the sound wave frequency sequence according to a preset sound wave frequency mapping table.

Figure 12:
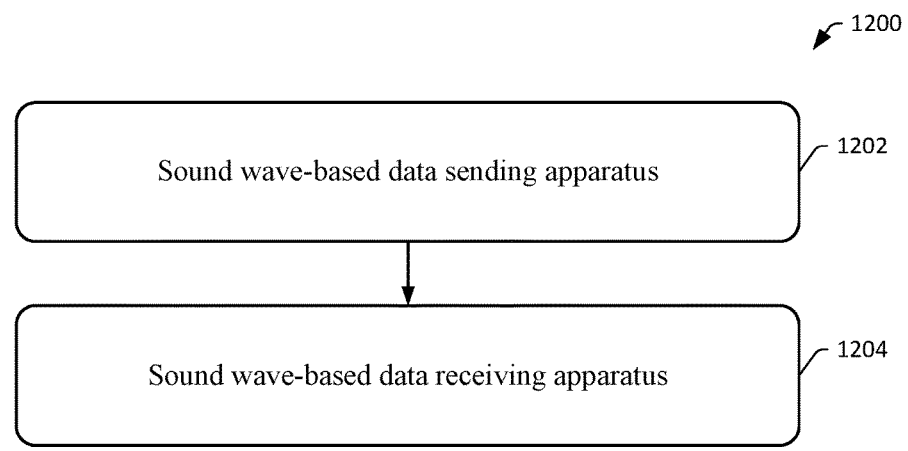
FIG. 12 is a schematic diagram of an example embodiment of a sound wave-based data transmission system according to the present application.

An example embodiment of the present application further provides a sound wave-based data transmission system 1200. As shown in FIG. 12, the system 1200 includes the sound wave-based data sending apparatus 1202 and the sound wave-based data receiving apparatus 1204 described in the foregoing example embodiments. The sound wave-based data sending apparatus 1202 is generally deployed on a terminal device connected with a sound generator (such as a loudspeaker), for example, a mobile communications device, a personal computer, a PAD, an iPad, and the like. The sound wave-based data receiving apparatus 1202 is generally deployed on a terminal device connected with a listener (such as a microphone), for example, a mobile communications device, a personal computer, a PAD, an iPad, and the like. For example, the sound wave-based data sending apparatus 1202 is deployed on a smart phone, and can obtain a sound wave frequency sequence corresponding to to-be-sent data according to a preset sound wave frequency mapping table, generate a filtered sound wave signal sequence according to the sound wave frequency sequence and a preset sending duration of a sound wave signal corresponding to a single character, and then send a sound wave signal corresponding to the to-be-sent data by using a sound generator according to the filtered sound wave signal sequence. The sound wave-based data receiving apparatus 1204 is deployed on a personal computer, collects a sound wave signal corresponding to to-be-received data by using a listener, intercepts filtered sound wave signal segments from the collected sound wave signal according to a preset sending duration of a sound wave signal corresponding to a single character, then determines, for the filtered sound wave signal segments, sound wave frequencies corresponding to the filtered sound wave signal segments by using a preset discrete Fourier transform algorithm, forms a sound wave frequency sequence corresponding to the to-be-received data by using the sound wave frequencies, and then obtains the to-be-received data corresponding to the sound wave frequency sequence according to a preset sound wave frequency mapping table.

Figure 13:
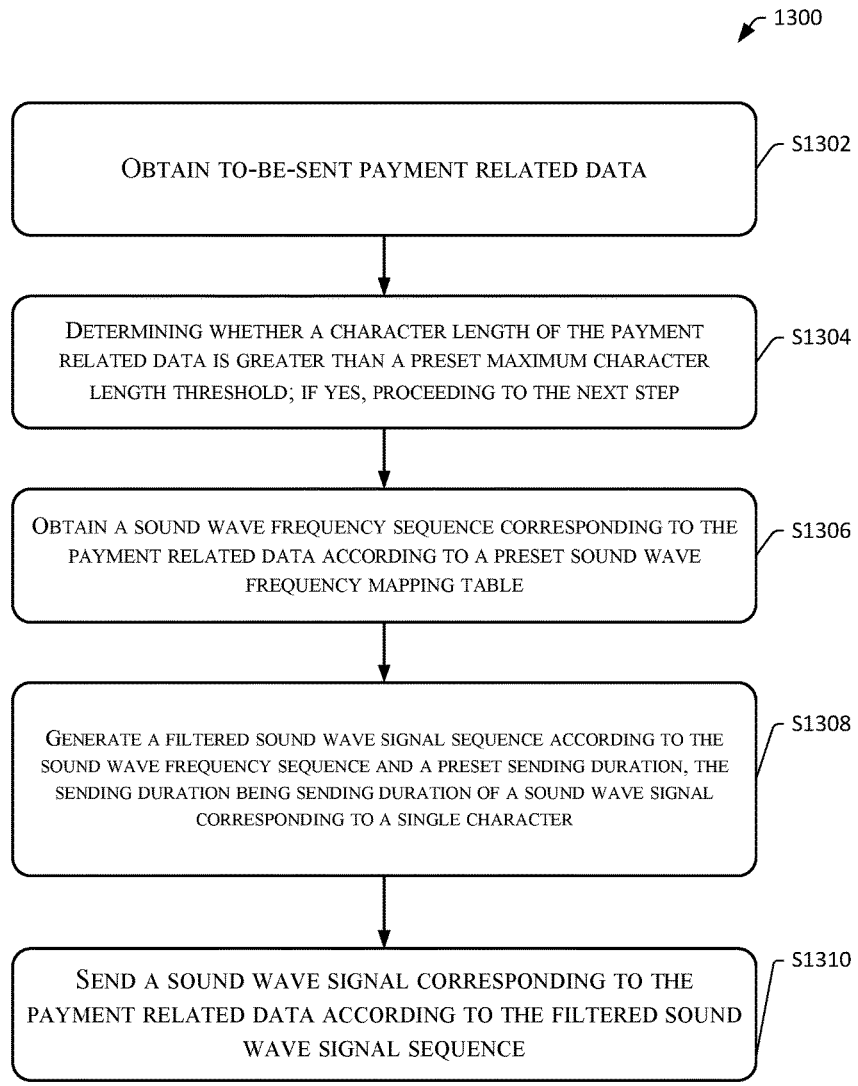
FIG. 13 is a flowchart of an example embodiment of a data sending method according to the present application.

Corresponding to the foregoing sound wave-based data sending method, the present application further provides a data sending method. The method 1300 may be used for sending payment related data in a payment scenario. Referring to FIG. 13, FIG. 13 is a flowchart of an example embodiment of a data sending method according to the present application. Identical portions between this example embodiment and the first example embodiment are not described again. Please refer to the corresponding portions in the first example embodiment. A data sending method 1300 provided in the present application includes the following steps:

Step S1302: obtaining to-be-sent payment related data.

The payment related data refers to service data that needs to be transmitted in a payment scenario, for example, transaction data, a transaction identification code, a third-party payment account, or any other data.

It should be noted that, a greater maximum character length of the payment related data is not always better. A greater character length means a longer transmission time of the data in a channel, and correspondingly, the data is more probably interfered by an environment, thus affecting a transmission communication distance and identification accuracy During specific implementation, after the obtaining to-be-sent payment related data, the method provided in the present application further includes the following step S1304: determining whether a character length of the payment related data is greater than a preset maximum character length threshold; if yes, proceeding to the next step S1304; and if no, ending the method.

Step S1306: obtaining a sound wave frequency sequence corresponding to the payment related data according to a preset sound wave frequency mapping table.

Step S1308: generating a filtered sound wave signal sequence according to the sound wave frequency sequence and a preset sending duration, the sending duration being sending duration of a sound wave signal corresponding to a single character.

Step S1310: sending a sound wave signal corresponding to the payment related data according to the filtered sound wave signal sequence.

In the foregoing example embodiment, a data sending method 1300 is provided. Correspondingly, the present application further provides a data sending apparatus 1400. The apparatus 1400 corresponds to the foregoing method 1300 example embodiment.

Figure 14:
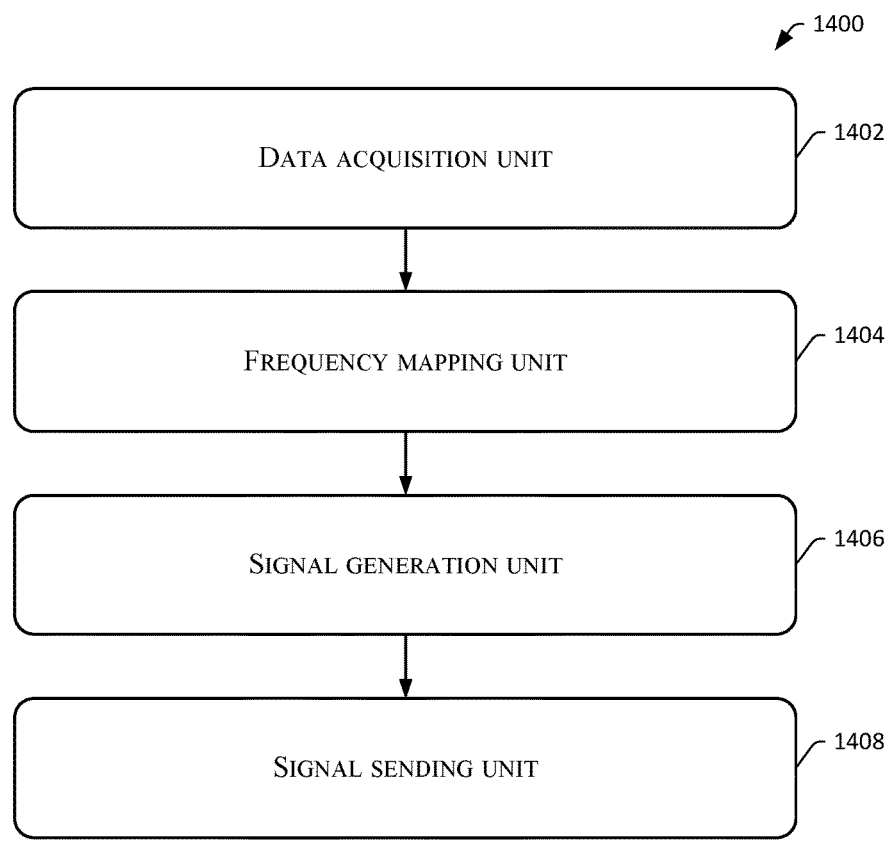
FIG. 14 is a flowchart of an example embodiment of a data sending apparatus according to the present application.

Referring to FIG. 14, FIG. 14 is a schematic diagram of an example embodiment of a data sending apparatus 1400 according to the present application. As the apparatus example embodiment is basically similar to the method example embodiment, the description is relatively simple. For related portions, reference may be made to partial description of the method example embodiment. The apparatus 1400 example embodiment described below is merely for illustrative purposes.

A data sending apparatus of this example embodiment includes:

a data acquisition unit 1402 configured to obtain to-be-sent payment related data;

a frequency mapping unit 1404 configured to obtain a sound wave frequency sequence corresponding to the payment related data according to a preset sound wave frequency mapping table;

a signal generation unit 1406 configured to generate a filtered sound wave signal sequence according to the sound wave frequency sequence and a preset sending duration, the sending duration being sending duration of a sound wave signal corresponding to a single character; and a signal sending unit 1408 configured to send a sound wave signal corresponding to the payment related data according to the filtered sound wave signal sequence.

Figure 15:
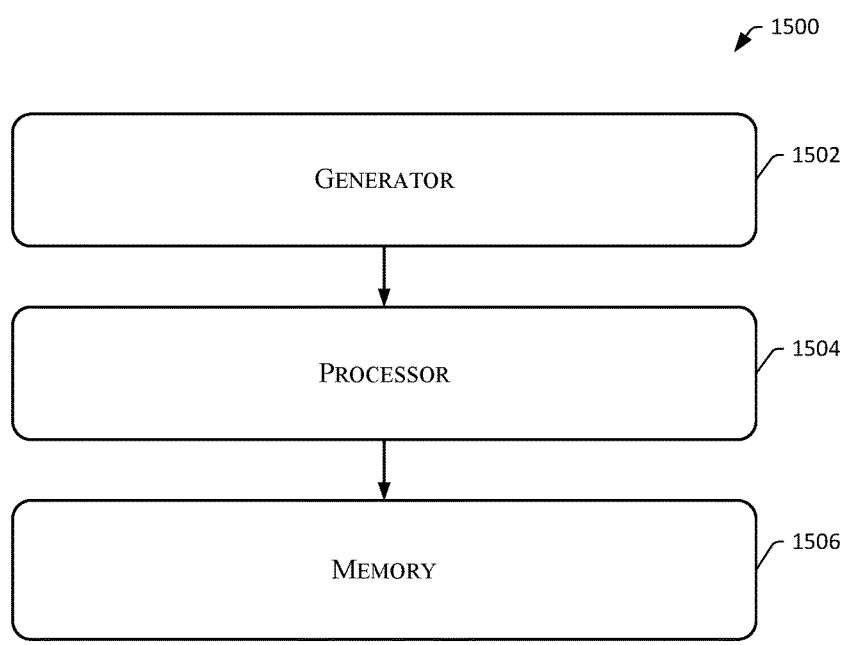
FIG. 15 is a schematic diagram of an example embodiment of an electronic device according to the present application.

Referring to FIG. 15, FIG. 15 is a schematic diagram of an example embodiment of an electronic device 1500 according to the present application. As the device example embodiment is basically similar to the method example embodiment, the description is relatively simple. For related portions, reference may be made to partial description of the method example embodiment. The device example embodiment described below is merely for illustrative purposes.

An electronic device 1500 of this example embodiment includes: a sound generator 11502; a processor 1504; and a memory 1506 configured to store a program for implementing a data sending method. After being powered on and running the program of the data sending method through the processor 1504, the device performs the following steps: obtaining to-be-sent payment related data; obtaining a sound wave frequency sequence corresponding to the payment related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the payment related data according to the filtered sound wave signal sequence.

Figure 16:
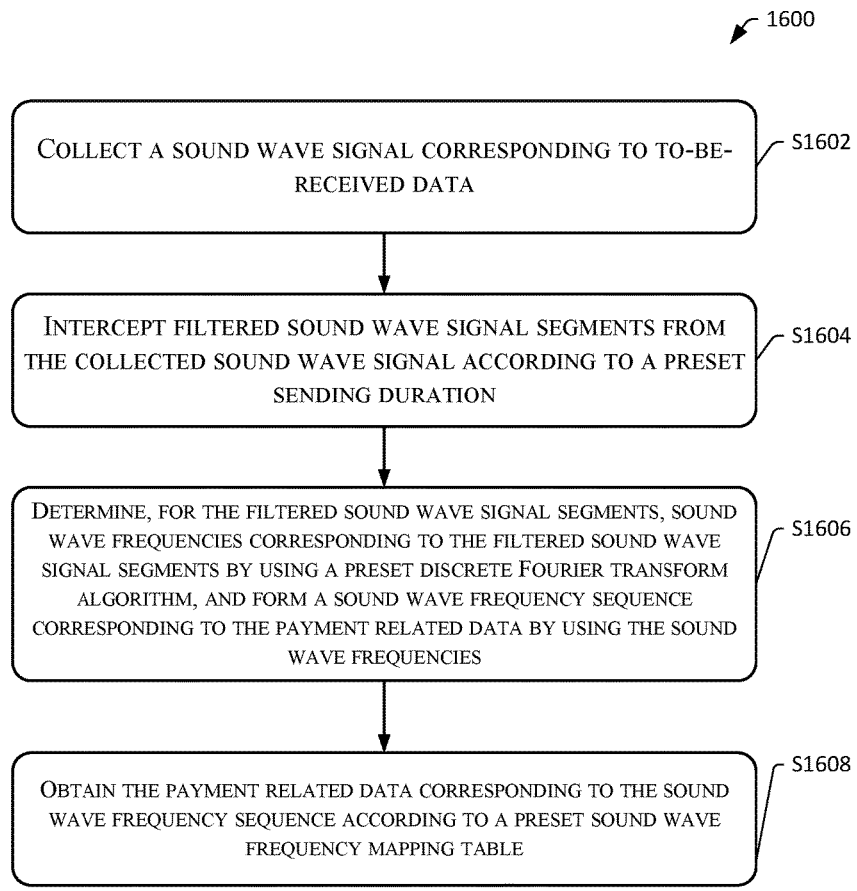
FIG. 16 is a flowchart of an example embodiment of a data receiving method according to the present application.

Corresponding to the foregoing data sending method, the present application further provides a data receiving method. Referring to FIG. 16, FIG. 16 is a flowchart of an example embodiment of a data receiving method 1600 according to the present application. This example embodiment also corresponds to the foregoing sound wave-based data receiving method. Identical portions between this example embodiment and the example embodiment of the sound wave-based data receiving method above are not described again. Please refer to corresponding portions in the method example embodiment. A data receiving method 1600 provided in the present application includes the following steps:

Step S1602: collecting a sound wave signal corresponding to to-be-received payment related data.

Step S1604: intercepting, filtered sound wave signal segments from the collected sound wave signal according to a preset sending duration, the sending duration being sending duration of a sound wave signal corresponding to a single character.

Step S1606: determining, for the filtered sound wave signal segments, sound wave frequencies corresponding to the filtered sound wave signal segments by using a preset discrete Fourier transform algorithm, and forming a sound wave frequency sequence corresponding to the payment related data by using the sound wave frequencies.

Step S1608: obtaining the payment related data corresponding to the sound wave frequency sequence according to a preset sound wave frequency mapping table.

In the foregoing example embodiment, a data receiving method 1600 is provided. Correspondingly, the present application further provides a data receiving apparatus. The apparatus corresponds to the foregoing method example embodiment.

Figure 17:
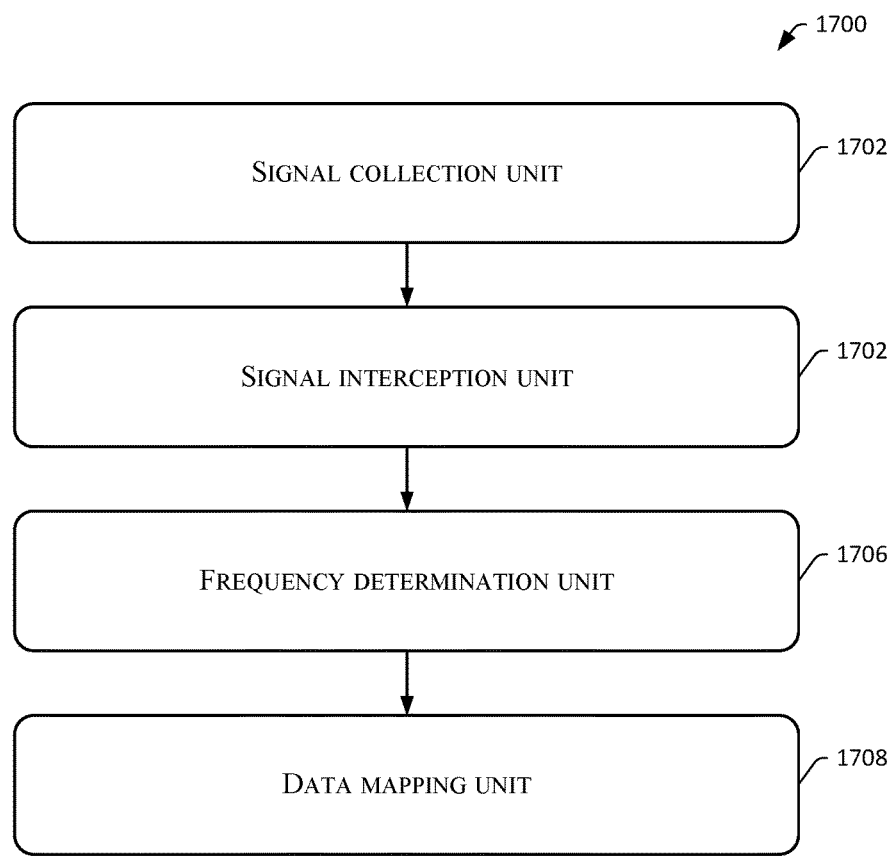
FIG. 17 is a flowchart of an example embodiment of a data receiving apparatus according to the present application.

Referring to FIG. 17, FIG. 17 is a schematic diagram of an example embodiment of a data receiving apparatus 1700 according to the present application. As the apparatus example embodiment is basically similar to the method 1600 example embodiment, the description is relatively simple. For related portions, reference may be made to partial description of the method example embodiment. The apparatus 1700 example embodiment described below is merely for illustrative purposes.

A data receiving apparatus of this example embodiment includes:

a signal collection unit 1702 configured to collect a sound wave signal corresponding to to-be-received payment related data;

a signal interception unit 1704 configured to intercept filtered sound wave signal segments from the collected sound wave signal according to a preset sending duration, the sending duration being sending duration of a sound wave signal corresponding to a single character;

a frequency determination unit 1706 configured to determine, for the filtered sound wave signal segments, sound wave frequencies corresponding to the filtered sound wave signal segments by using a preset discrete Fourier transform algorithm, and form a sound wave frequency sequence corresponding to the payment related data by using the sound wave frequencies; and a data mapping unit 1708 configured to obtain the payment related data corresponding to the sound wave frequency sequence according to a preset sound wave frequency mapping table.

Figure 18:
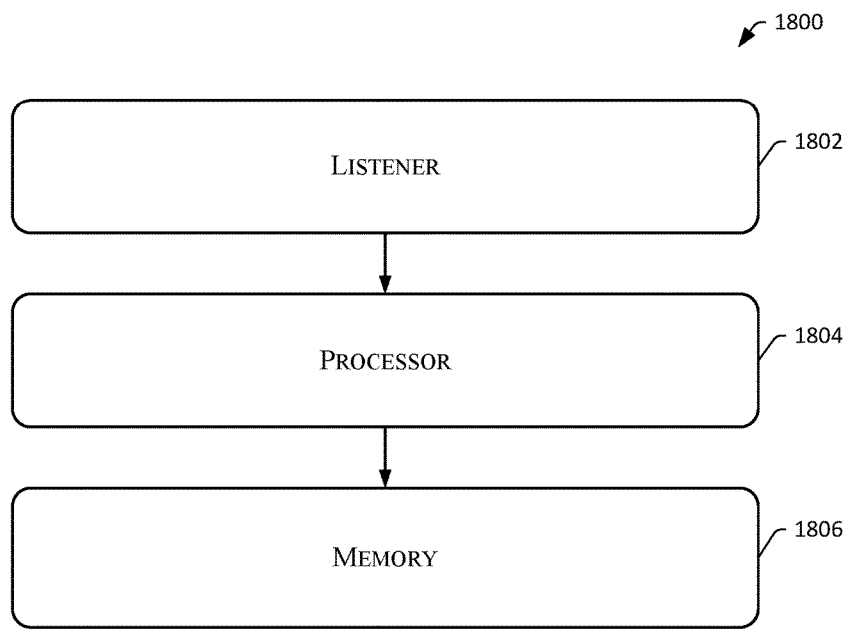
FIG. 18 is a schematic diagram of an example embodiment of an electronic device according to the present application.

Referring to FIG. 18, FIG. 18 is a schematic diagram of an example embodiment of an electronic device 1800 according to the present application. As the device example embodiment is basically similar to the method example embodiment, the description is relatively simple. For related portions, reference may be made to partial description of the method example embodiment. The device 1800 example embodiment described below is merely for illustrative purposes.

An electronic device of this example embodiment includes: a listener 1802; a processor 1804; and a memory 1806 configured to store a program for implementing a data receiving method. After being powered on and running the program of the data receiving method through the processor 1804, the device performs the following steps: collecting a sound wave signal corresponding to to-be-received payment related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the payment related data by using the sound wave frequencies; and obtaining the payment related data corresponding to the sound wave frequency sequence according to a preset sound wave frequency mapping table.

Figure 19:
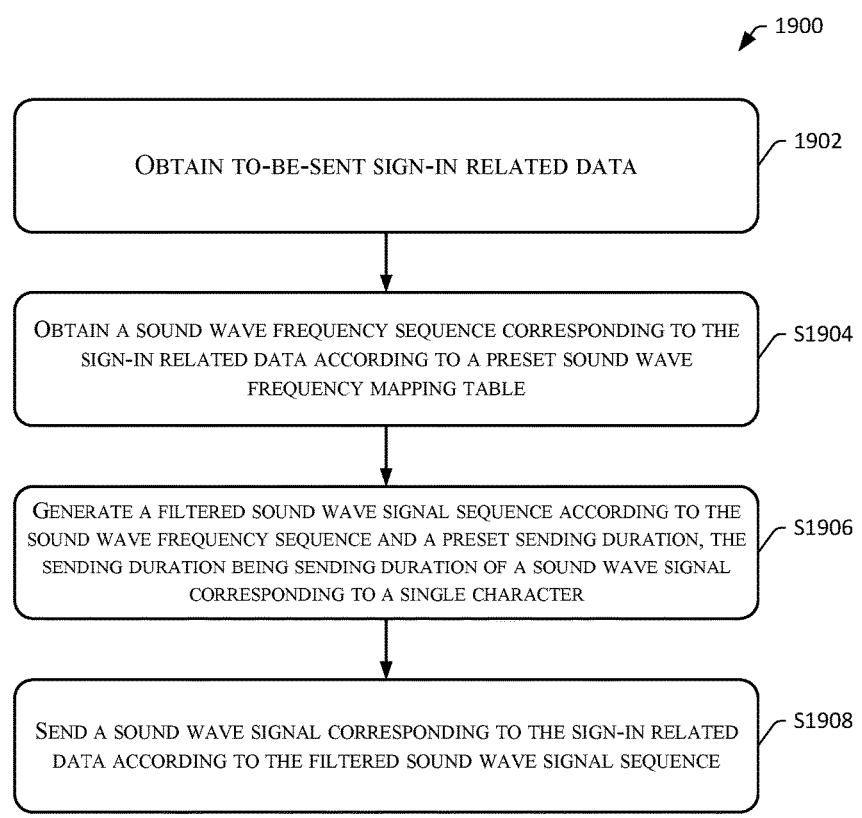
FIG. 19 is a flowchart of another example embodiment of a data sending method according to the present application.

Corresponding to the foregoing sound wave-based data sending method, the present application further provides another data sending method. The method may be used for sending sign-in related data in a sign-in scenario. Referring to FIG. 19, FIG. 19 is a flowchart of another example embodiment of a data sending method 1900 according to the present application. Identical portions between this example embodiment and the first example embodiment are not described again. Please refer to corresponding portions in the first example embodiment. Another data sending method 1900 provided in the present application includes the following steps:

Step S1902: obtaining to-be-sent sign-in related data.

The sign-in related data refers to data that needs to be transmitted in a sign-in scenario such as work, conference, recruitment, or class, for example, a conference identifier, a sign-in person identifier, a sign-in time, and other data.

Step S1904: obtaining a sound wave frequency sequence corresponding to the sign-in related data according to a preset sound wave frequency mapping table.

Step S1906: generating a filtered sound wave signal sequence according to the sound wave frequency sequence and a preset sending duration, the sending duration being sending duration of a sound wave signal corresponding to a single character.

Step S1908: sending a sound wave signal corresponding to the sign-in related data according to the filtered sound wave signal sequence.

In the foregoing example embodiment, another data sending method is provided. Correspondingly, the present application further provides another data sending apparatus. The apparatus corresponds to the foregoing method example embodiment.

Figure 20:
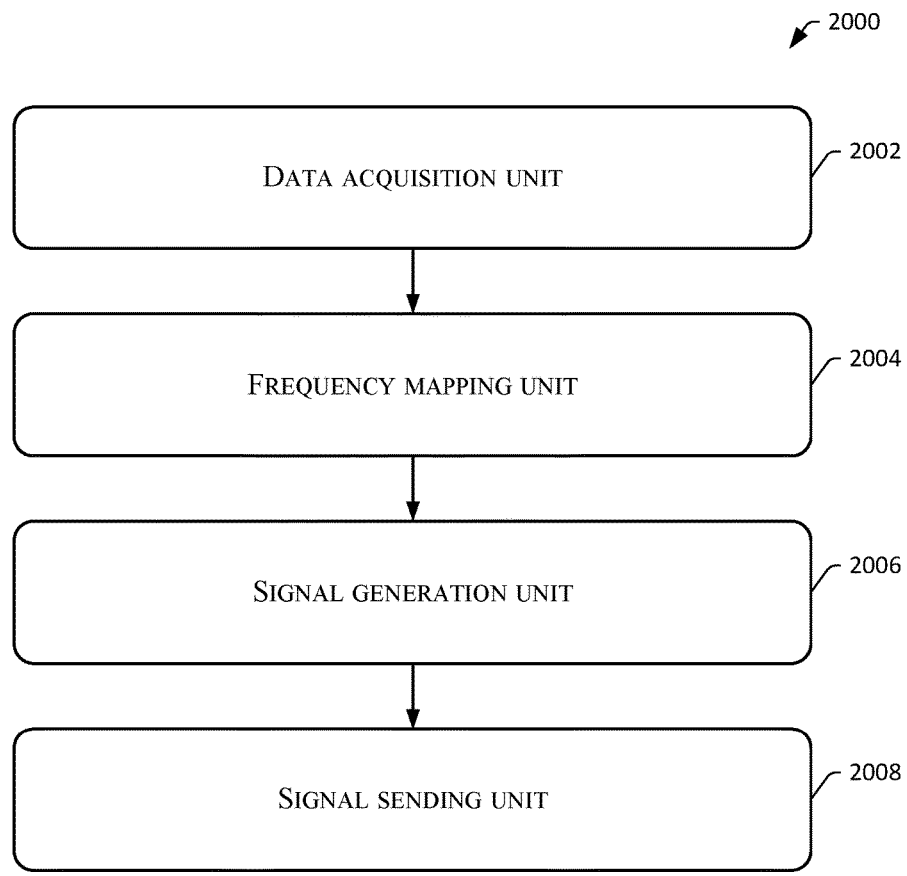
FIG. 20 is a flowchart of another example embodiment of a data sending apparatus according to the present application.

Referring to FIG. 20, FIG. 20 is a schematic diagram of another example embodiment of a data sending apparatus 2000 according to the present application. As the apparatus example embodiment is basically similar to the method example embodiment, the description is relatively simple. For related portions, reference may be made to partial description of the method example embodiment. The apparatus 2000 example embodiment described below is merely for illustrative purposes.

Another data sending apparatus of this example embodiment includes:

a data acquisition unit 2002 configured to obtain to-be-sent sign-in related data;

a frequency mapping unit 2004 configured to obtain a sound wave frequency sequence corresponding to the sign-in related data according to a preset sound wave frequency mapping table;

a signal generation unit 2006 configured to generate a filtered sound wave signal sequence according to the sound wave frequency sequence and a preset sending duration, the sending duration being sending duration of a sound wave signal corresponding to a single character; and a signal sending unit 2008 configured to send a sound wave signal corresponding to the sign-in related data according to the filtered sound wave signal sequence.

Figure 21:
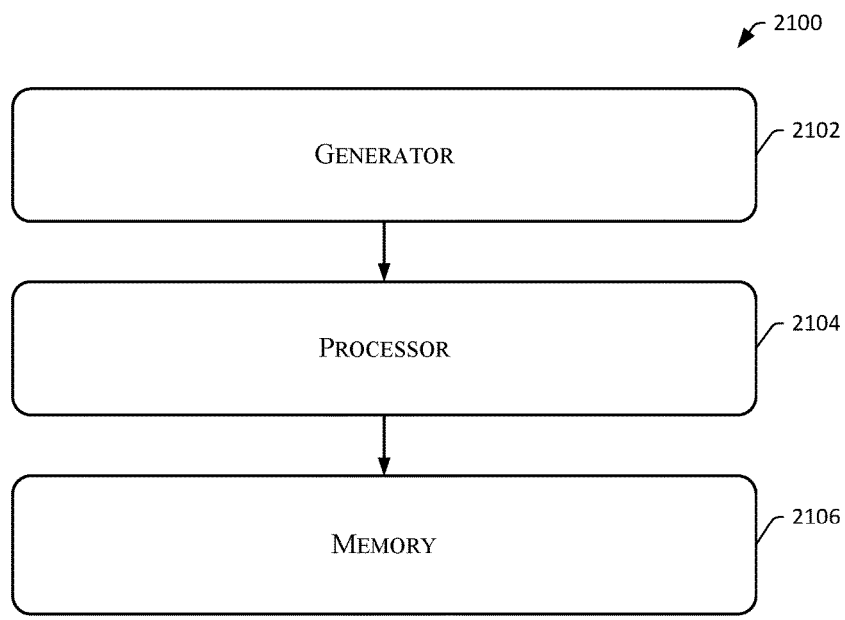
FIG. 21 is a schematic diagram of an example embodiment of an electronic device according to the present application.

Referring to FIG. 21, FIG. 21 is a schematic diagram of an example embodiment of an electronic device 2100 according to the present application. As the device example embodiment is basically similar to the method example embodiment, the description is relatively simple. For related portions, reference may be made to partial description of the method example embodiment. The device 2100 example embodiment described below is merely for illustrative purposes.

An electronic device of this example embodiment includes: a sound generator 2102; a processor 2104; and a memory 2106 configured to store a program for implementing a data sending method. After being powered on and running the program of the data sending method through the processor 2104, the device performs the following steps: obtaining to-be-sent sign-in related data; obtaining a sound wave frequency sequence corresponding to the sign-in related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the sign-in related data according to the filtered sound wave signal sequence.

Figure 22:
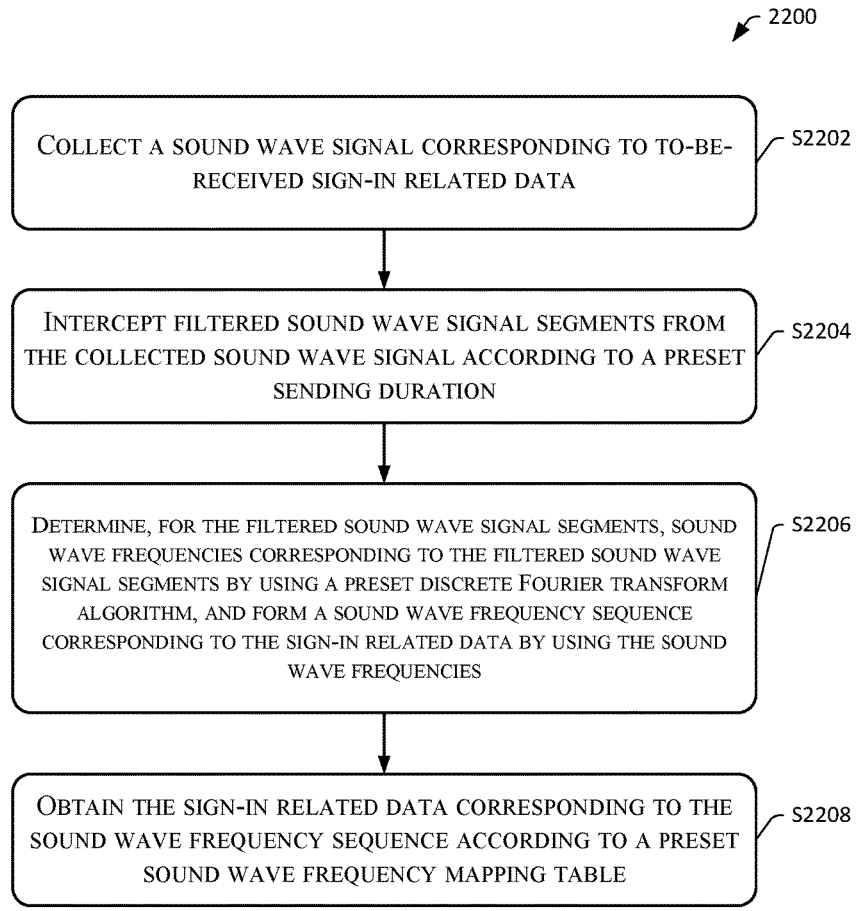
FIG. 22 is a flowchart of another example embodiment of a data receiving method according to the present application.

Corresponding to the foregoing another data sending method, the present application further provides another data receiving method. Referring to FIG. 22, FIG. 22 is a flowchart of another example embodiment of a data receiving method 2200 according to the present application. This example embodiment also corresponds to the foregoing sound wave-based data receiving method. Identical portions between this example embodiment and the example embodiment of the sound wave-based data receiving method above are not described again. Please refer to corresponding portions in the method example embodiment. Another data receiving method 2200 provided in the present application includes the following steps:

Step S2202: collecting a sound wave signal corresponding to to-be-received sign-in related data.

Step S2204: intercepting, filtered sound wave signal segments from the collected sound wave signal according to a preset sending duration, the sending duration being sending duration of a sound wave signal corresponding to a single character.

Step S2206: determining, for the filtered sound wave signal segments, sound wave frequencies corresponding to the filtered sound wave signal segments by using a preset discrete Fourier transform algorithm, and forming a sound wave frequency sequence corresponding to the sign-in related data by using the sound wave frequencies.

Step S2208: obtaining the sign-in related data corresponding to the sound wave frequency sequence according to a preset sound wave frequency mapping table.

In the foregoing example embodiment, another data receiving method is provided. Correspondingly, the present application further provides another data receiving apparatus. The apparatus corresponds to the foregoing method example embodiment.

Figure 23:
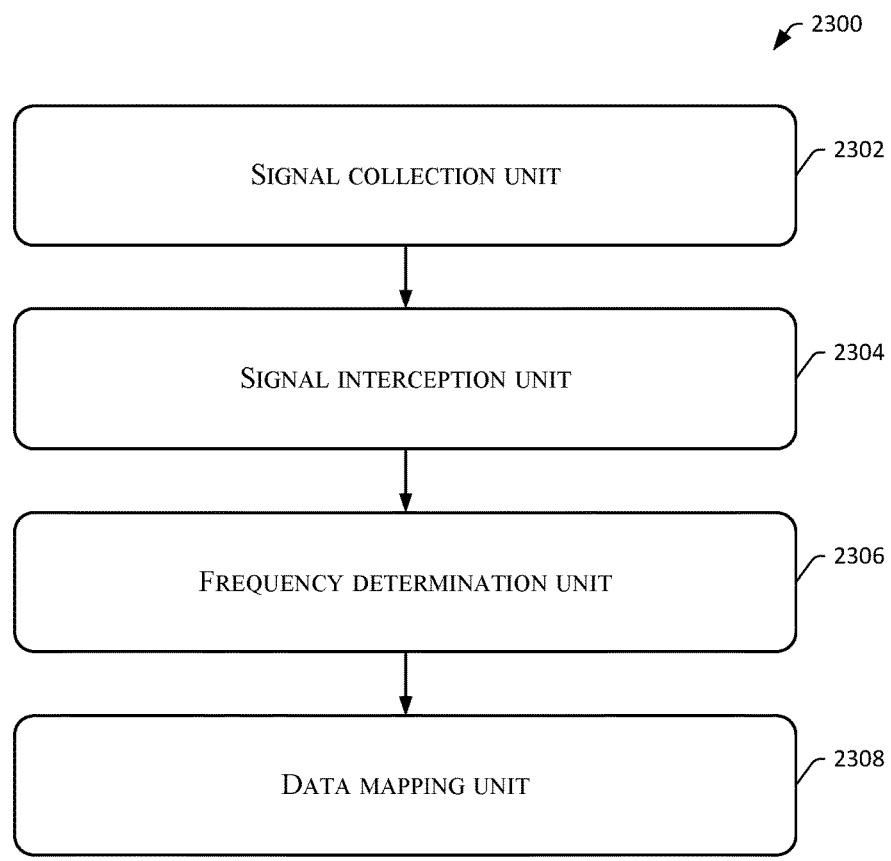
FIG. 23 is a flowchart of another example embodiment of a data receiving apparatus according to the present application.

Referring to FIG. 23, FIG. 23 is a schematic diagram of another example embodiment of a data receiving apparatus 2300 according to the present application. As the apparatus example embodiment is basically similar to the method example embodiment, the description is relatively simple. For related portions, reference may be made to partial description of the method example embodiment. The apparatus 2300 example embodiment described below is merely for illustrative purposes.

Another data receiving apparatus of this example embodiment includes:

a signal collection unit 2302 configured to collect a sound wave signal corresponding to to-be-received sign-in related data;

a signal interception unit 2304 configured to intercept filtered sound wave signal segments from the collected sound wave signal according to a preset sending duration, the sending duration being sending duration of a sound wave signal corresponding to a single character;

a frequency determination unit 2306 configured to determine, for the filtered sound wave signal segments, sound wave frequencies corresponding to the filtered sound wave signal segments by using a preset discrete Fourier transform algorithm, and form a sound wave frequency sequence corresponding to the sign-in related data by using the sound wave frequencies; and a data mapping unit 2308 configured to obtain the sign-in related data corresponding to the sound wave frequency sequence according to a preset sound wave frequency mapping table.

Figure 24:
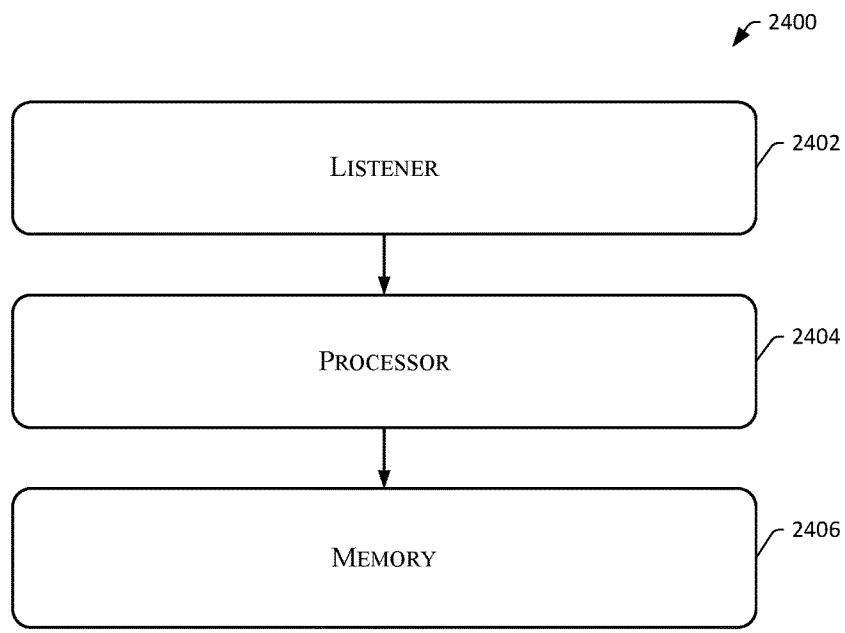
FIG. 24 is a schematic diagram of an example embodiment of an electronic device according to the present application.

Referring to FIG. 24, FIG. 24 is a schematic diagram of an example embodiment of an electronic device 2400 according to the present application. As the device example embodiment is basically similar to the method example embodiment, the description is relatively simple. For related portions, reference may be made to partial description of the method example embodiment. The device 2400 example embodiment described below is merely for illustrative purposes.

An electronic device of this example embodiment includes: a listener 2402; a processor 2404; and a memory 2406 configured to store a program for implementing a data receiving method. After being powered on and running the program of the data receiving method through the processor 2404, the device performs the following steps: collecting a sound wave signal corresponding to to-be-received sign-in related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the sign-in related data by using the sound wave frequencies; and obtaining the sign-in related data corresponding to the sound wave frequency sequence according to a preset sound wave frequency mapping table.

Figure 25:
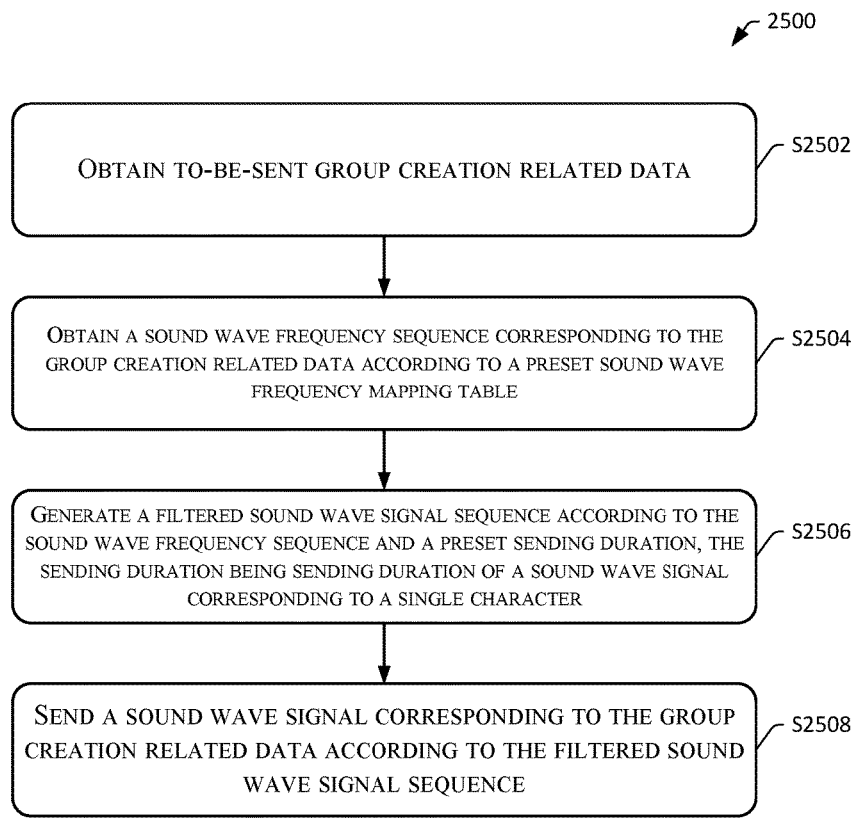
FIG. 25 is a flowchart of an example embodiment of a data sending method for creating a chat group according to the present application.

Corresponding to the foregoing sound wave-based data sending method, the present application further provides a data sending method for creating a chat group. The method may be used for sending group creation related data in a chat group creation scenario. Referring to FIG. 25, FIG. 25 is a flowchart of an example embodiment of a data sending method 2500 for creating a chat group according to the present application. Identical portions between this example embodiment and the first example embodiment are not described again. Please refer to corresponding portions in the first example embodiment. A data sending method 2500 for creating a chat group provided in the present application includes the following steps:

Step S2502: obtaining to-be-sent group creation related data.

The group creation related data refers to data that needs to be transmitted in a chat group creation scenario, for example, a group identifier, a friend identifier, and other data.

Step S2504: obtaining a sound wave frequency sequence corresponding to the group creation related data according to a preset sound wave frequency mapping table.

Step S2506: generating a filtered sound wave signal sequence according to the sound wave frequency sequence and a preset sending duration, the sending duration being sending duration of a sound wave signal corresponding to a single character.

Step S2508: sending a sound wave signal corresponding to the group creation related data according to the filtered sound wave signal sequence.

In the foregoing example embodiment, a data sending method for creating a chat group is provided. Correspondingly, the present application further provides a data sending apparatus for creating a chat group. The apparatus corresponds to the foregoing method example embodiment.

Figure 26:
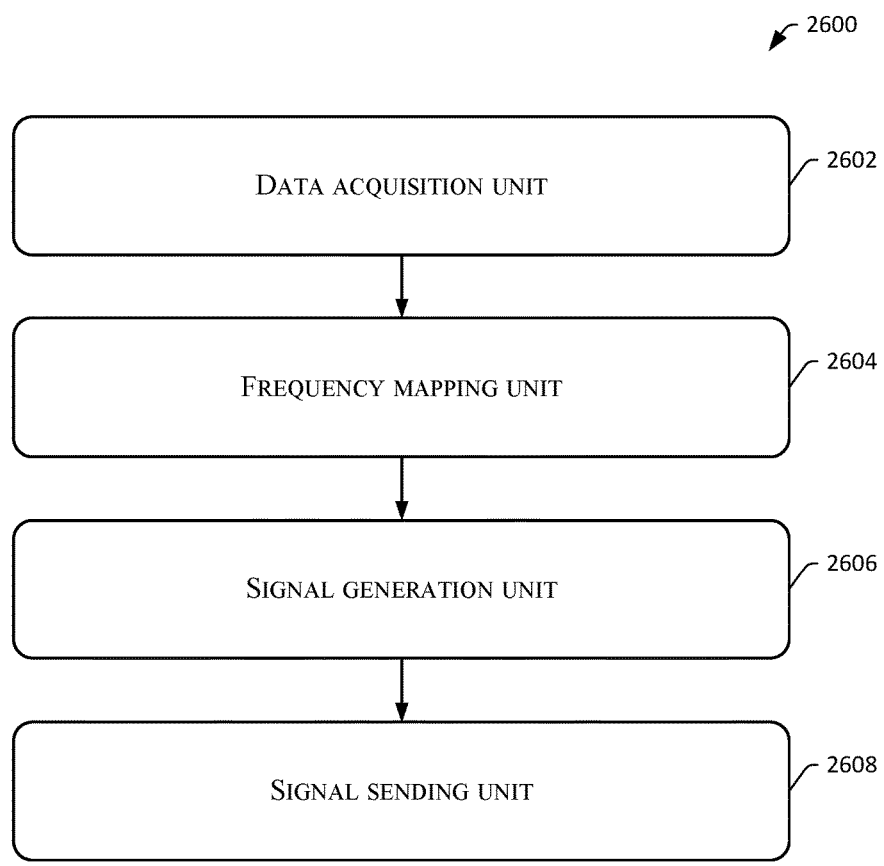
FIG. 26 is a flowchart of an example embodiment of a data sending apparatus for creating a chat group according to the present application.

Referring to FIG. 26, FIG. 26 is a schematic diagram of an example embodiment of a data sending apparatus 2600 for creating a chat group according to the present application. As the apparatus example embodiment is basically similar to the method example embodiment, the description is relatively simple. For related portions, reference may be made to partial description of the method example embodiment. The apparatus 2600 example embodiment described below is merely for illustrative purposes.

A data sending apparatus for creating a chat group of this example embodiment includes:

a data acquisition unit 2602 configured to obtain to-be-sent group creation related data;

a frequency mapping unit 2604 configured to obtain a sound wave frequency sequence corresponding to the group creation related data according to a preset sound wave frequency mapping table;

a signal generation unit 2606 configured to generate a filtered sound wave signal sequence according to the sound wave frequency sequence and a preset sending duration, the sending duration being sending duration of a sound wave signal corresponding to a single character; and a signal sending unit 2608 configured to send a sound wave signal corresponding to the group creation related data according to the filtered sound wave signal sequence.

Figure 27:
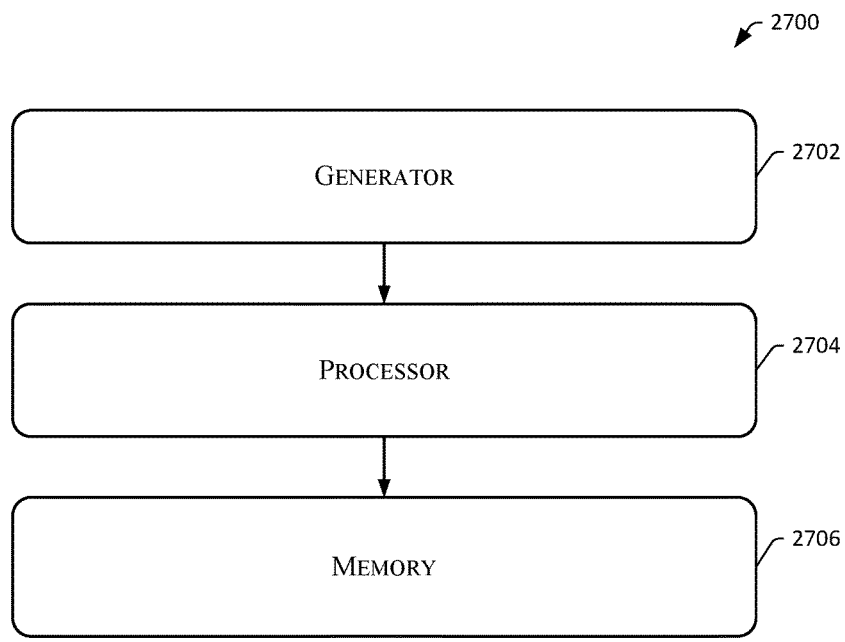
FIG. 27 is a schematic diagram of an example embodiment of an electronic device according to the present application.

Referring to FIG. 27, FIG. 27 is a schematic diagram of an example embodiment of an electronic device 2700 according to the present application. As the device example embodiment is basically similar to the method example embodiment, the description is relatively simple. For related portions, reference may be made to partial description of the method example embodiment. The device 2700 example embodiment described below is merely for illustrative purposes.

An electronic device of this example embodiment includes: a sound generator 2702; a processor 2704; and a memory 2706 configured to store a program for implementing a data sending method for creating a chat group. After being powered on and running the program of the data sending method for creating a chat group through the processor 2704, the device performs the following steps: obtaining to-be-sent group creation related data; obtaining a sound wave frequency sequence corresponding to the group creation related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the group creation related data according to the filtered sound wave signal sequence.

Figure 28:
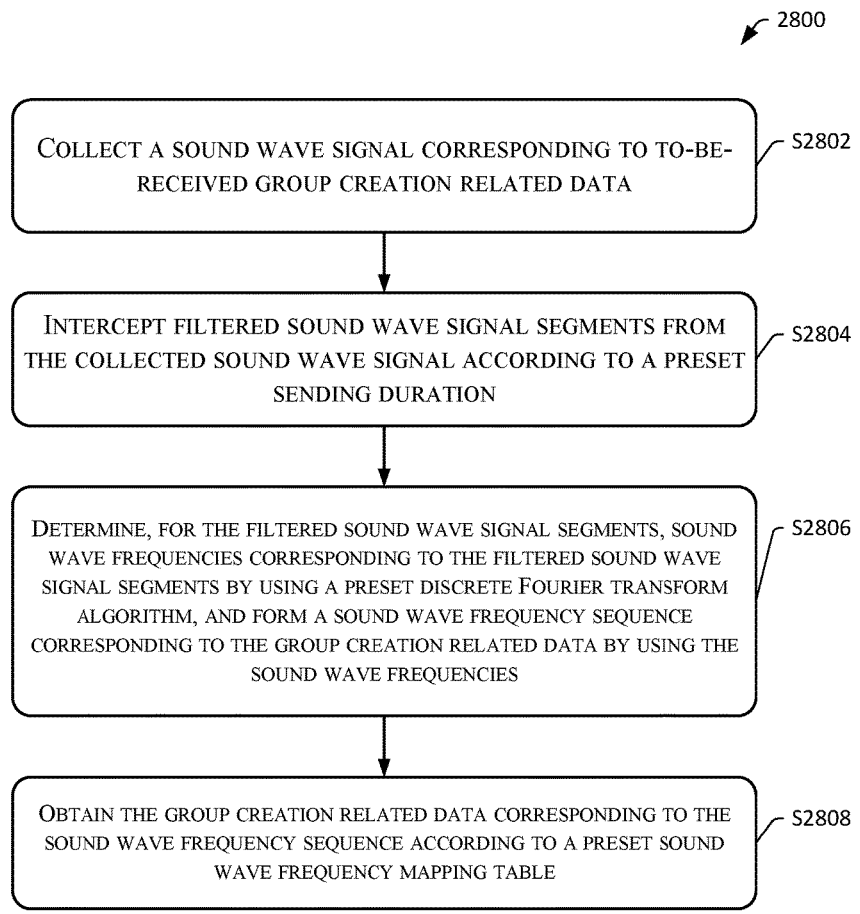
FIG. 28 is a flowchart of an example embodiment of a data receiving method for creating a chat group according to the present application.

Corresponding to the foregoing data sending method for creating a chat group, the present application further provides a data receiving method for creating a chat group. Referring to FIG. 28, FIG. 28 is a flowchart of an example embodiment of a data receiving method 2800 for creating a chat group according to the present application. This example embodiment also corresponds to the foregoing sound wave-based data receiving method. Identical portions between this example embodiment and the example embodiment of the sound wave-based data receiving method above are not described again. Please refer to corresponding portions in the example embodiment. A data receiving method 2800 for creating a chat group provided in the present application includes the following steps:

Step S2802: collecting a sound wave signal corresponding to to-be-received group creation related data.

Step S2804: intercepting filtered sound wave signal segments from the collected sound wave signal according to a preset sending duration, the sending duration being sending duration of a sound wave signal corresponding to a single character.

Step S2806: determining, for the filtered sound wave signal segments, sound wave frequencies corresponding to the filtered sound wave signal segments by using a preset discrete Fourier transform algorithm, and forming a sound wave frequency sequence corresponding to the group creation related data by using the sound wave frequencies.

Step S2808: obtaining the group creation related data corresponding to the sound wave frequency sequence according to a preset sound wave frequency mapping table.

In the foregoing example embodiment, a data receiving method for creating a chat group is provided. Correspondingly, the present application further provides a data receiving apparatus for creating a chat group. The apparatus corresponds to the foregoing method example embodiment.

Figure 29:
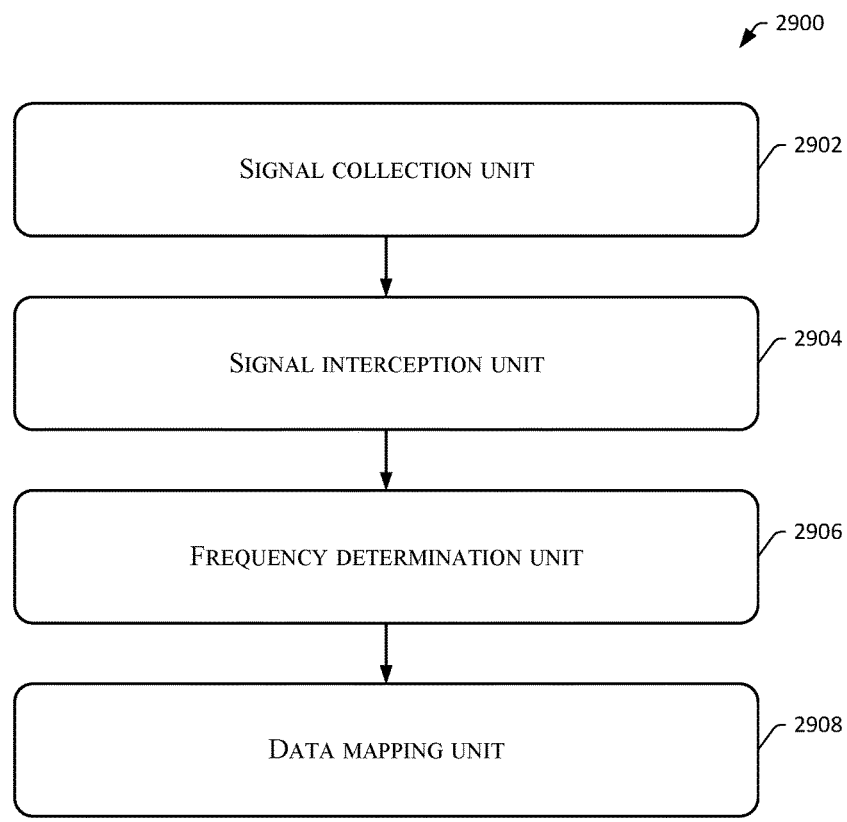
FIG. 29 is a flowchart of an example embodiment of a data receiving apparatus for creating a chat group according to the present application.

Referring to FIG. 29, FIG. 29 is a schematic diagram of an example embodiment of a data receiving apparatus 2900 for creating a chat group according to the present application. As the apparatus example embodiment is basically similar to the method example embodiment, the description is relatively simple. For related portions, reference may be made to partial description of the method example embodiment. The apparatus 2900 example embodiment described below is merely for illustrative purposes.

A data receiving apparatus for creating a chat group of this example embodiment includes:

a signal collection unit 2902 configured to collect a sound wave signal corresponding to to-be-received group creation related data;

a signal interception unit 2904 configured to intercept filtered sound wave signal segments from the collected sound wave signal according to a preset sending duration, the sending duration being sending duration of a sound wave signal corresponding to a single character;

a frequency determination unit 2906 configured to determine, for the filtered sound wave signal segments, sound wave frequencies corresponding to the filtered sound wave signal segments by using a preset discrete Fourier transform algorithm, and form a sound wave frequency sequence corresponding to the group creation related data by using the sound wave frequencies; and a data mapping unit 2908 configured to obtain the group creation related data corresponding to the sound wave frequency sequence according to a preset sound wave frequency mapping table.

Figure 30:
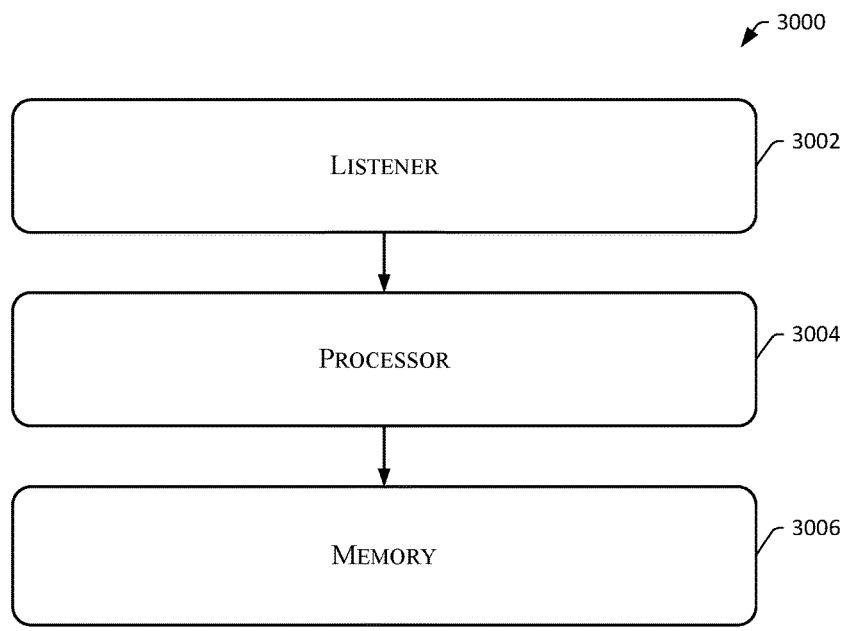
FIG. 30 is a schematic diagram of an example embodiment of an electronic device according to the present application.

Referring to FIG. 30, FIG. 30 is a schematic diagram of an example embodiment of an electronic device 3000 according to the present application. As the device example embodiment is basically similar to the method example embodiment, the description is relatively simple. For related portions, reference may be made to partial description of the method example embodiment. The device 3000 example embodiment described below is merely for illustrative purposes.

An electronic device of this example embodiment includes: a listener 3002; a processor 3004; and a memory 3006 configured to store a program for implementing a data receiving method for creating a chat group. After being powered on and running the program of the data receiving method for creating a chat group through the processor 3004, the device performs the following steps: collecting a sound wave signal corresponding to to-be-received group creation related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the group creation related data by using the sound wave frequencies; and obtaining the group creation related data corresponding to the sound wave frequency sequence according to a preset sound wave frequency mapping table.

Figure 31:
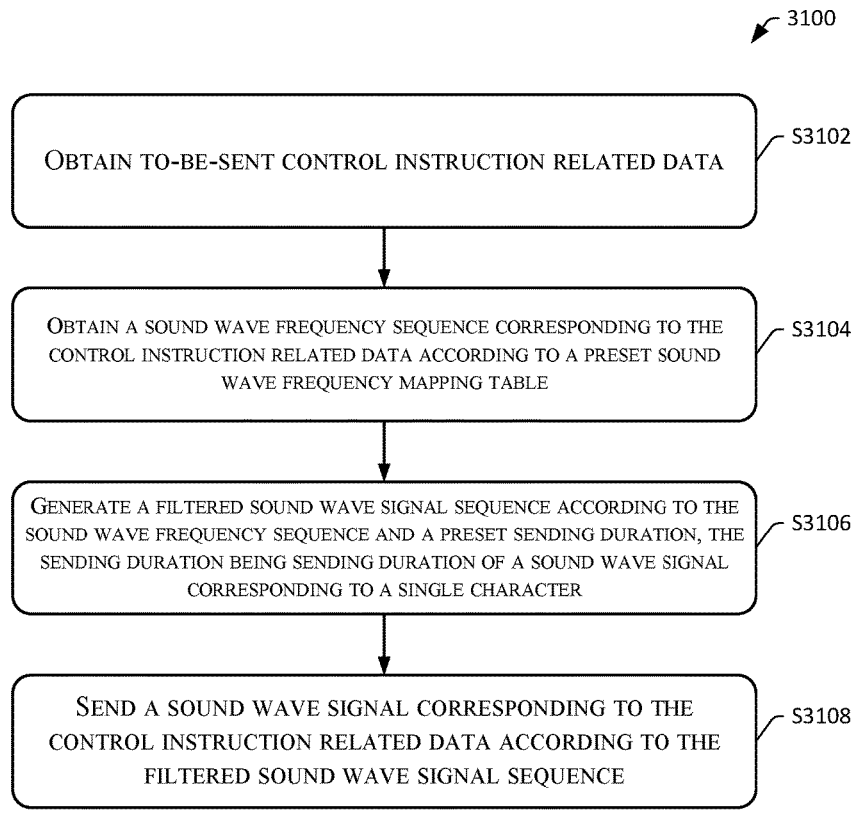
FIG. 31 is a flowchart of an example embodiment of a data sending method for smart home control according to the present application.

Corresponding to the foregoing sound wave-based data sending method, the present application further provides a data sending method for smart home control. The method may be used for sending control instruction related data in a smart home control scenario. Referring to FIG. 31, FIG. 31 is a flowchart of an example embodiment of a data sending method 3100 for smart home control according to the present application. Identical portions between this example embodiment and the first example embodiment are not described again. Please refer to corresponding portions in the first example embodiment. A data sending method 3100 for smart home control provided in the present application includes the following steps:

Step S3102: obtaining to-be-sent control instruction related data.

The control instruction related data refers to data that needs to be transmitted in a smart home control scenario, for example, control instruction related data such as turning on, turning off, and timing is sent to smart household appliances such as a light, a television, a microwave oven, and a clock.

Step S3104: obtaining a sound wave frequency sequence corresponding to the control instruction related data according to a preset sound wave frequency mapping table.

Step S3106: generating a filtered sound wave signal sequence according to the sound wave frequency sequence and a preset sending duration, the sending duration being sending duration of a sound wave signal corresponding to a single character.

Step S3108: sending a sound wave signal corresponding to the control instruction related data according to the filtered sound wave signal sequence.

In the foregoing example embodiment, a data sending method for smart home control is provided. Correspondingly, the present application further provides a data sending apparatus for smart home control. The apparatus corresponds to the foregoing method example embodiment.

Figure 32:
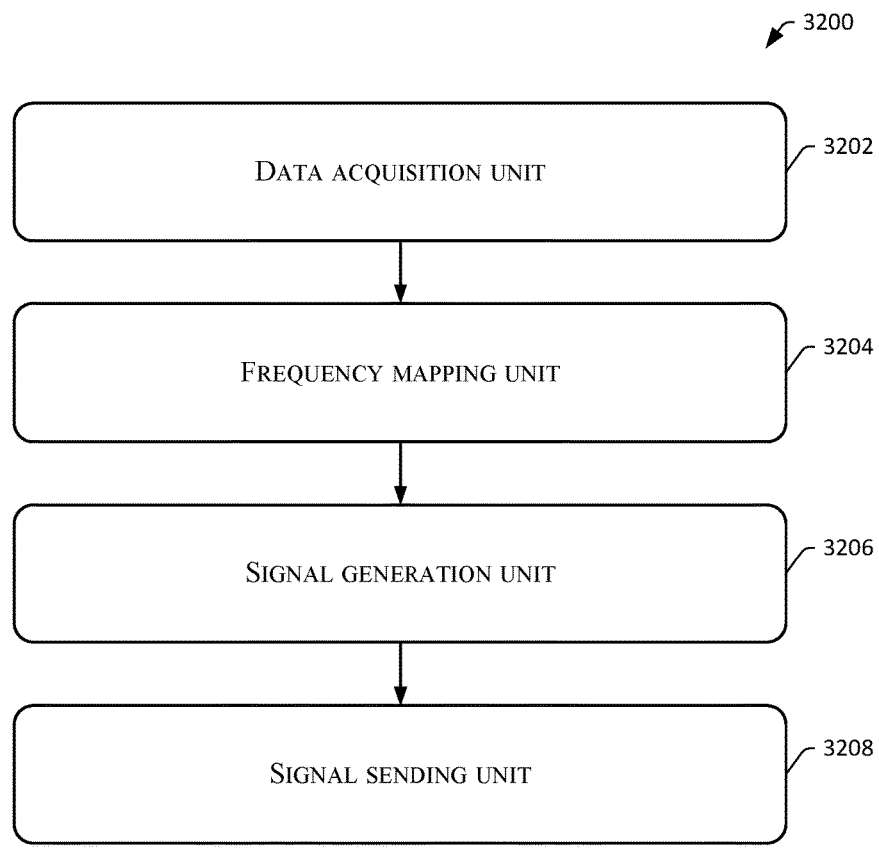
FIG. 32 is a flowchart of an example embodiment of a data sending apparatus for smart home control according to the present application.

Referring to FIG. 32, FIG. 32 is a schematic diagram of an example embodiment of a data sending apparatus 3200 for smart home control according to the present application. As the apparatus example embodiment is basically similar to the method example embodiment, the description is relatively simple. For related portions, reference may be made to partial description of the method example embodiment. The apparatus 3200 example embodiment described below is merely for illustrative purposes.

A data sending apparatus for smart home control of this example embodiment includes:

a data acquisition unit 3202 configured to obtain to-be-sent control instruction related data;

a frequency mapping unit 3204 configured to obtain a sound wave frequency sequence corresponding to the control instruction related data according to a preset sound wave frequency mapping table;

a signal generation unit 3206 configured to generate a filtered sound wave signal sequence according to the sound wave frequency sequence and a preset sending duration, the sending duration being sending duration of a sound wave signal corresponding to a single character; and a signal sending unit 3208 configured to send a sound wave signal corresponding to the control instruction related data according to the filtered sound wave signal sequence.

Figure 33:
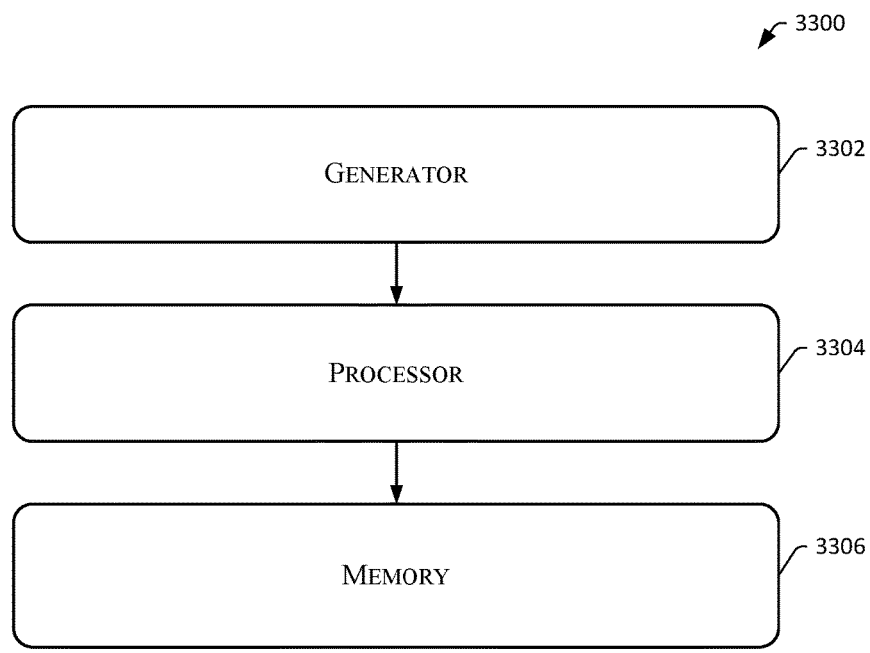
FIG. 33 is a schematic diagram of an example embodiment of an electronic device according to the present application.

Referring to FIG. 33, FIG. 33 is a schematic diagram of an example embodiment of an electronic device 3300 according to the present application. As the device example embodiment is basically similar to the method example embodiment, the description is relatively simple. For related portions, reference may be made to partial description of the method example embodiment. The device 3300 example embodiment described below is merely for illustrative purposes.

An electronic device of this example embodiment includes: a sound generator 3302; a processor 3304; and a memory 3306 configured to store a program for implementing a data sending method for smart home control. After being powered on and running the program of the data sending method for smart home control through the processor 3304, the device performs the following steps: obtaining to-be-sent control instruction related data; obtaining a sound wave frequency sequence corresponding to the control instruction related data according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the control instruction related data according to the filtered sound wave signal sequence.

Figure 34:
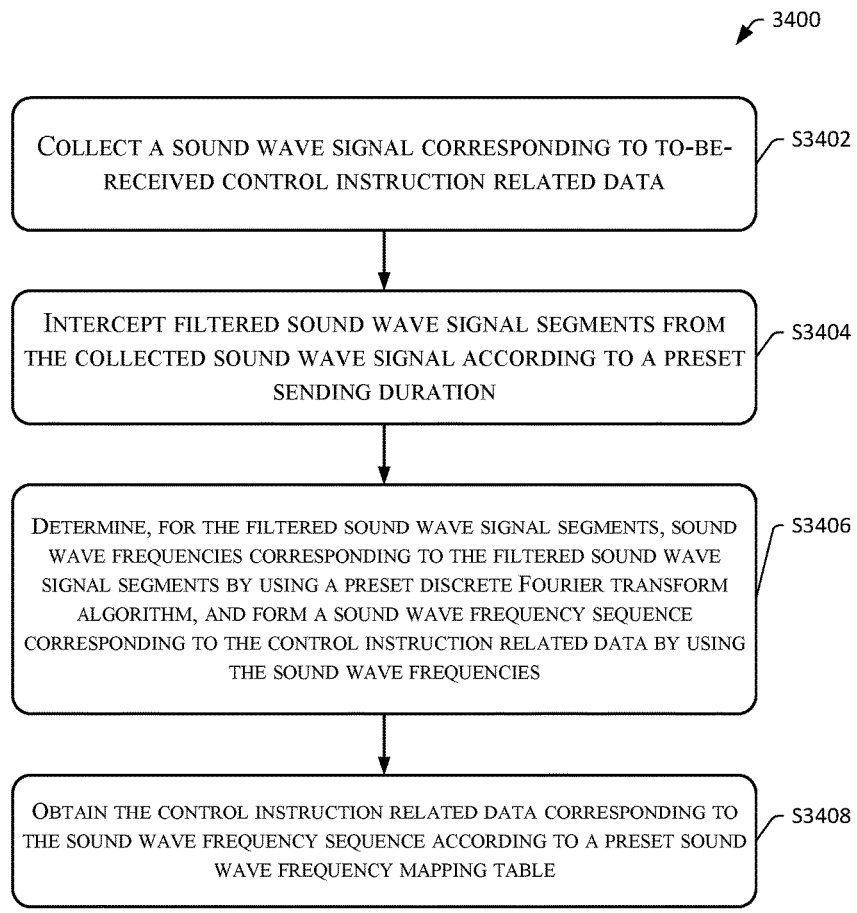
FIG. 34 is a flowchart of an example embodiment of a data receiving method for smart home control according to the present application.

Corresponding to the foregoing data sending method for smart home control, the present application further provides a data receiving method for smart home control. Referring to FIG. 34, FIG. 34 is a flowchart of an example embodiment of a data receiving method 3400 for smart home control according to the present application. This example embodiment also corresponds to the foregoing sound wave-based data receiving method. Identical portions between this example embodiment and the example embodiment of the sound wave-based data receiving method above are not described again. Please refer to corresponding portions in the example embodiment. A data receiving method 3400 for smart home control provided in the present application includes the following steps:

Step S3402: collecting a sound wave signal corresponding to to-be-received control instruction related data.

Step S3404: intercepting filtered sound wave signal segments from the collected sound wave signal according to a preset sending duration, the sending duration being sending duration of a sound wave signal corresponding to a single character.

Step S3406: determining, for the filtered sound wave signal segments, sound wave frequencies corresponding to the filtered sound wave signal segments by using a preset discrete Fourier transform algorithm, and forming a sound wave frequency sequence corresponding to the control instruction related data by using the sound wave frequencies.

Step S3408: obtaining the control instruction related data corresponding to the sound wave frequency sequence according to a preset sound wave frequency mapping table.

In the foregoing example embodiment, a data receiving method for smart home control is provided. Correspondingly, the present application further provides a data receiving apparatus for smart home control. The apparatus corresponds to the foregoing method example embodiment.

Figure 35:
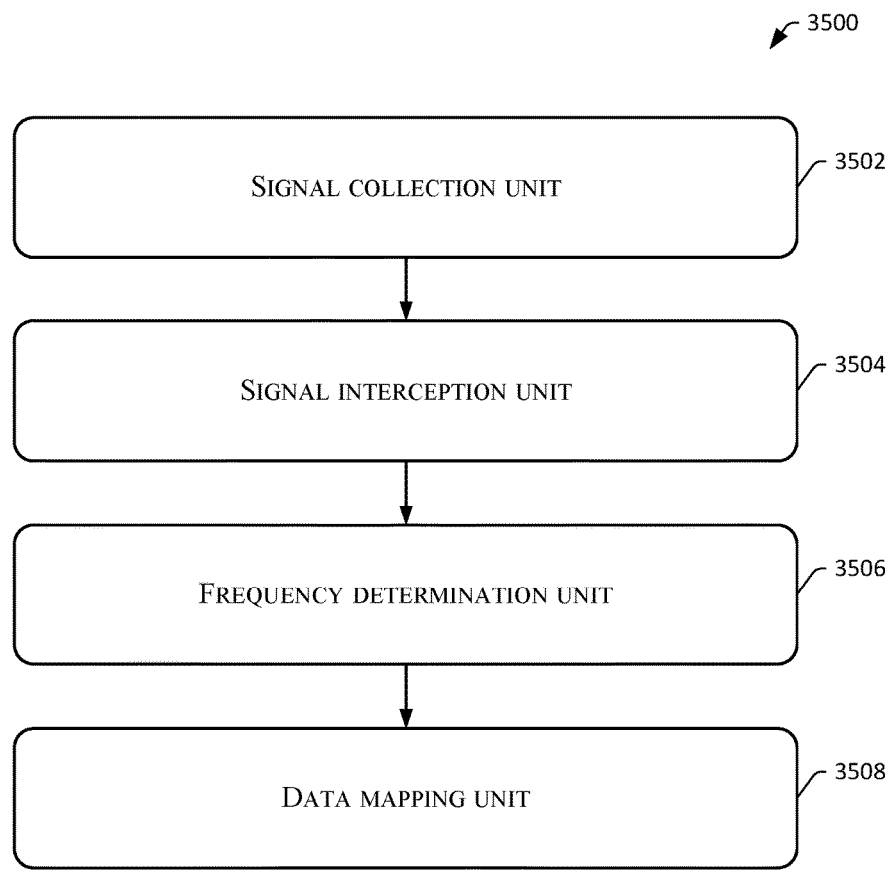
FIG. 35 is a flowchart of an example embodiment of a data receiving apparatus for smart home control according to the present application.

Referring to FIG. 35, FIG. 35 is a schematic diagram of an example embodiment of a data receiving apparatus 3500 for smart home control according to the present application. As the apparatus example embodiment is basically similar to the method example embodiment, the description is relatively simple. For related portions, reference may be made to partial description of the method example embodiment. The apparatus 3500 example embodiment described below is merely for illustrative purposes.

A data receiving apparatus for smart home control of this example embodiment includes:

a signal collection unit 3502 configured to collect a sound wave signal corresponding to to-be-received control instruction related data;

a signal interception unit 3504 configured to intercept filtered sound wave signal segments from the collected sound wave signal according to a preset sending duration, the sending duration being sending duration of a sound wave signal corresponding to a single character;

a frequency determination unit 3506 configured to determine, for the filtered sound wave signal segments, sound wave frequencies corresponding to the filtered sound wave signal segments by using a preset discrete Fourier transform algorithm, and form a sound wave frequency sequence corresponding to the control instruction related data by using the sound wave frequencies; and a data mapping unit 3508 configured to obtain the control instruction related data corresponding to the sound wave frequency sequence according to a preset sound wave frequency mapping table.

Figure 36:
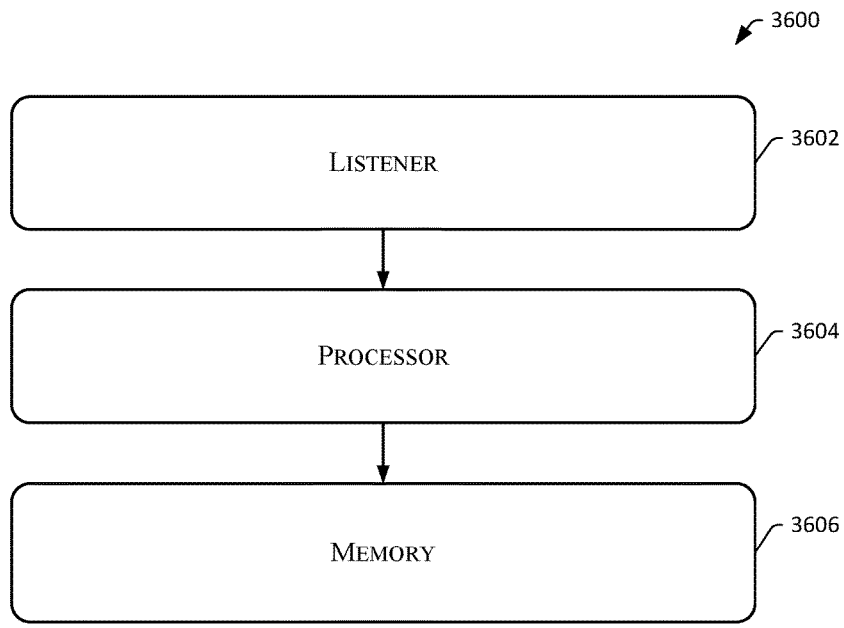
FIG. 36 is a schematic diagram of an example embodiment of an electronic device according to the present application.

Referring to FIG. 36, FIG. 36 is a schematic diagram of an example embodiment of an electronic device 3600 according to the present application. As the device example embodiment is basically similar to the method example embodiment, the description is relatively simple. For related portions, reference may be made to partial description of the method example embodiment. The device 3600 example embodiment described below is merely for illustrative purposes.

An electronic device of this example embodiment includes: a listener 3602; a processor 3604; and a memory 3606 configured to store a program for implementing a data receiving method for smart home control. After being powered on and running the program of the data receiving method for smart home control through the processor 3604, the device performs the following steps: collecting a sound wave signal corresponding to to-be-received control instruction related data; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the control instruction related data by using the sound wave frequencies; and obtaining the control instruction related data corresponding to the sound wave frequency sequence according to a preset sound wave frequency mapping table.

Figure 37:
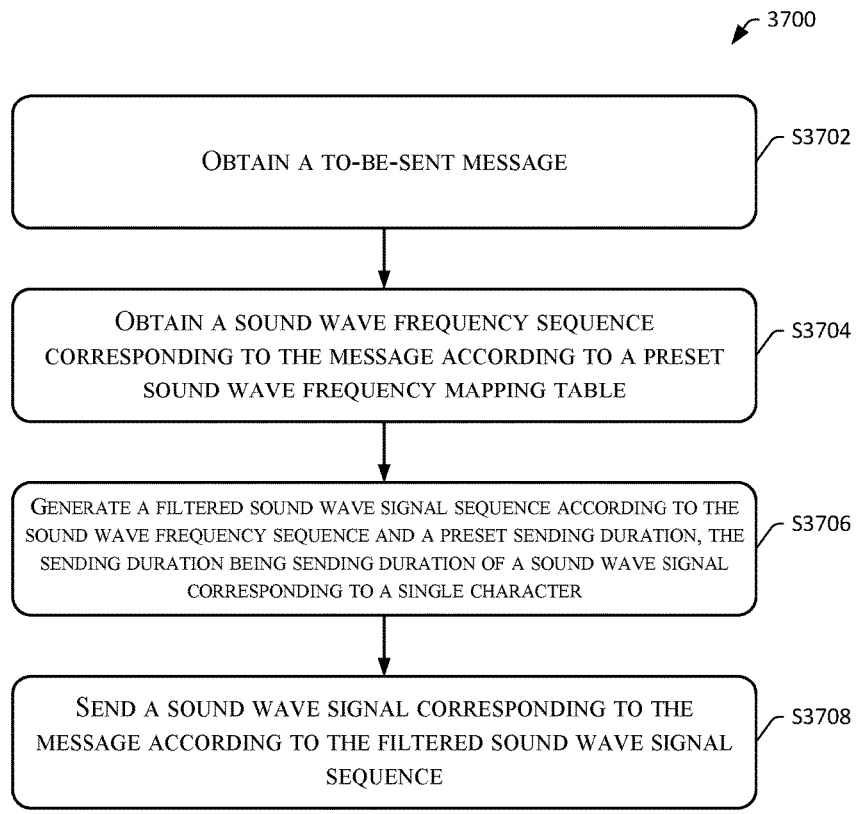
FIG. 37 is a flowchart of an example embodiment of a data sending method for message pushing according to the present application.

Corresponding to the foregoing sound wave-based data sending method, the present application further provides a data sending method for message pushing. The method may be used for sending a to-be-pushed message in a message pushing scenario. Referring to FIG. 37, FIG. 37 is a flowchart of an example embodiment of a data sending method 3700 for message pushing according to the present application. Identical portions between this example embodiment and the first example embodiment are not described again. Please refer to corresponding portions in the first example embodiment. A data sending method 3700 for message pushing provided in the present application includes the following steps:

Step S3702: obtaining a to-be-sent message.

The to-be-sent message refers to a message that needs to be sent out in a message pushing scenario, for example, various prompt messages sent by a merchant to a customer.

Step S3704: obtaining a sound wave frequency sequence corresponding to the message according to a preset sound wave frequency mapping table.

Step S3706: generating a filtered sound wave signal sequence according to the sound wave frequency sequence and a preset sending duration, the sending duration being sending duration of a sound wave signal corresponding to a single character.

Step S3708: sending a sound wave signal corresponding to the message according to the filtered sound wave signal sequence.

In the foregoing example embodiment, a data sending method for message pushing is provided. Correspondingly, the present application further provides a data sending apparatus for message pushing. The apparatus corresponds to the foregoing method example embodiment.

Figure 38:
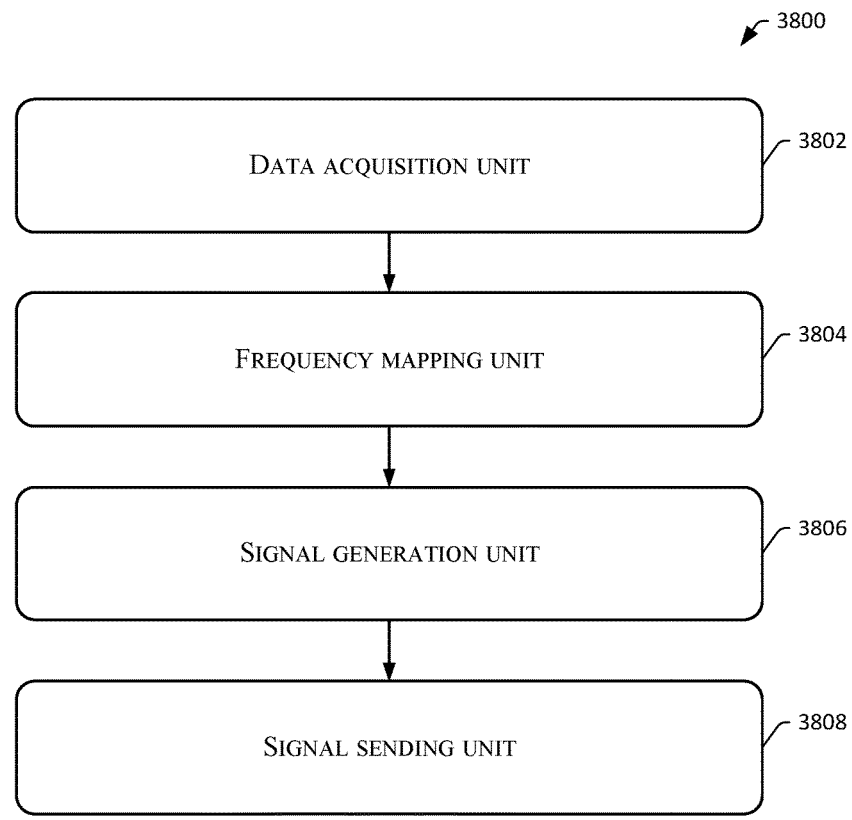
FIG. 38 is a flowchart of an example embodiment of a data sending apparatus for message pushing according to the present application.

Referring to FIG. 38, FIG. 38 is a schematic diagram of an example embodiment of a data sending apparatus 3800 for message pushing according to the present application. As the apparatus example embodiment is basically similar to the method example embodiment, the description is relatively simple. For related portions, reference may be made to partial description of the method example embodiment. The apparatus 3800 example embodiment described below is merely for illustrative purposes.

A data sending apparatus for message pushing of this example embodiment includes:

a data acquisition unit 3802 configured to obtain a to-be-sent message;

a frequency mapping unit 3804 configured to obtain a sound wave frequency sequence corresponding to the message according to a preset sound wave frequency mapping table;

a signal generation unit 386 configured to generate a filtered sound wave signal sequence according to the sound wave frequency sequence and a preset sending duration, the sending duration being sending duration of a sound wave signal corresponding to a single character; and a signal sending unit 3808 configured to send a sound wave signal corresponding to the message according to the filtered sound wave signal sequence.

Figure 39:
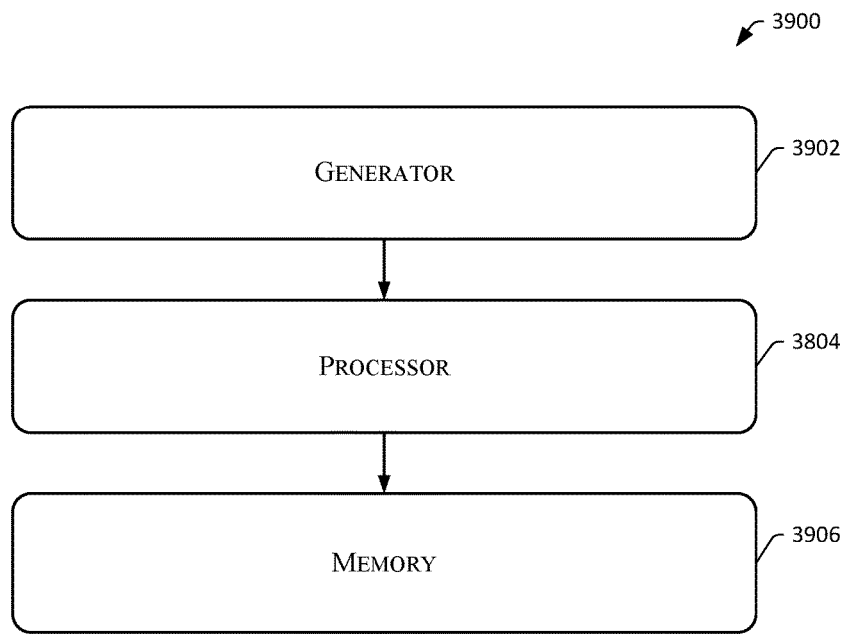
FIG. 39 is a schematic diagram of an example embodiment of an electronic device according to the present application.

Referring to FIG. 39, FIG. 39 is a schematic diagram of an example embodiment of an electronic device 3900 according to the present application. As the device example embodiment is basically similar to the method example embodiment, the description is relatively simple. For related portions, reference may be made to partial description of the method example embodiment. The device 3900 example embodiment described below is merely for illustrative purposes.

An electronic device of this example embodiment includes: a sound generator 3902; a processor 3904; and a memory 3906 configured to store a program for implementing a data sending method for message pushing. After being powered on and running the program of the data sending method for message pushing through the processor 3904, the device performs the following steps: obtaining a to-be-sent message; obtaining a sound wave frequency sequence corresponding to the message according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the message according to the filtered sound wave signal sequence.

Figure 40:
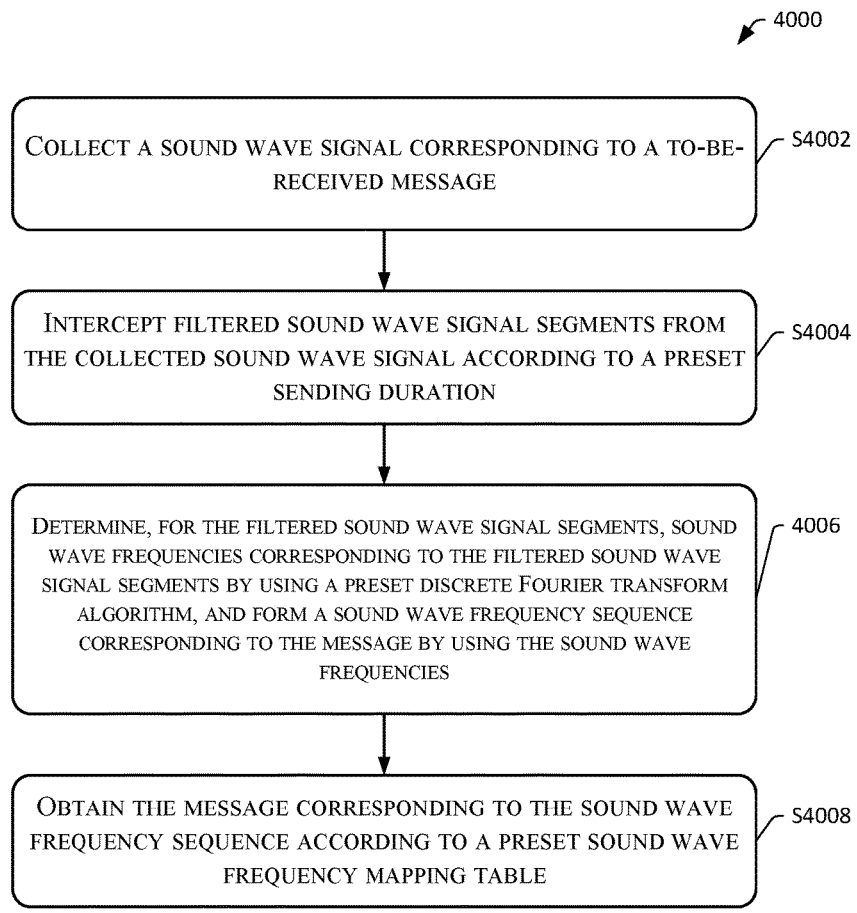
FIG. 40 is a flowchart of an example embodiment of a data receiving method for message pushing according to the present application.

Corresponding to the foregoing data sending method for message pushing, the present application further provides a data receiving method for message pushing. Referring to FIG. 40, FIG. 40 is a flowchart of an example embodiment of a data receiving method 4000 for message pushing according to the present application. This example embodiment also corresponds to the foregoing sound wave-based data receiving method. Identical portions between this example embodiment and the example embodiment of the sound wave-based data receiving method above are not described again. Please refer to corresponding portions in the example embodiment. A data receiving method 4000 for message pushing provided in the present application includes the following steps:

Step S4002: collecting a sound wave signal corresponding to a to-be-received message.

Step S4004: intercepting filtered sound wave signal segments from the collected sound wave signal according to a preset sending duration, the sending duration being sending duration of a sound wave signal corresponding to a single character.

Step S4006: determining, for the filtered sound wave signal segments, sound wave frequencies corresponding to the filtered sound wave signal segments by using a preset discrete Fourier transform algorithm, and forming a sound wave frequency sequence corresponding to the message by using the sound wave frequencies.

Step S4008: obtaining the message corresponding to the sound wave frequency sequence according to a preset sound wave frequency mapping table.

In the foregoing example embodiment, a data receiving method for message pushing is provided. Correspondingly, the present application further provides a data receiving apparatus for message pushing. The apparatus corresponds to the foregoing method example embodiment.

Figure 41:
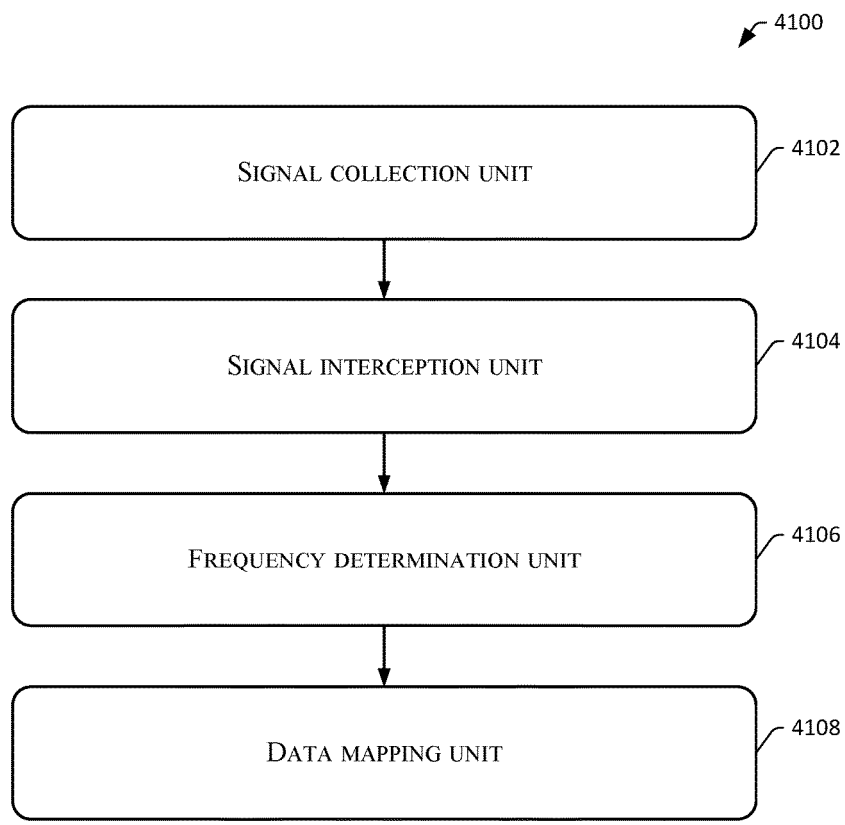
FIG. 41 is a flowchart of an example embodiment of a data receiving apparatus for message pushing according to the present application.

Referring to FIG. 41, FIG. 41 is a schematic diagram of an example embodiment of a data receiving apparatus 4100 for push notification according to the present application. As the apparatus example embodiment is basically similar to the method example embodiment, the description is relatively simple. For related portions, reference may be made to partial description of the method example embodiment. The apparatus 4100 example embodiment described below is merely for illustrative purposes.

A data receiving apparatus for message pushing of this example embodiment includes:

a signal collection unit 4102 configured to collect a sound wave signal corresponding to a to-be-received message;

a signal interception unit 4104 configured to intercept filtered sound wave signal segments from the collected sound wave signal according to a preset sending duration, the sending duration being sending duration of a sound wave signal corresponding to a single character;

a frequency determination unit 4106 configured to determine, for the filtered sound wave signal segments, sound wave frequencies corresponding to the filtered sound wave signal segments by using a preset discrete Fourier transform algorithm, and form a sound wave frequency sequence corresponding to the message by using the sound wave frequencies; and a data mapping unit 4108 configured to obtain the message corresponding to the sound wave frequency sequence according to a preset sound wave frequency mapping table.

Figure 42:
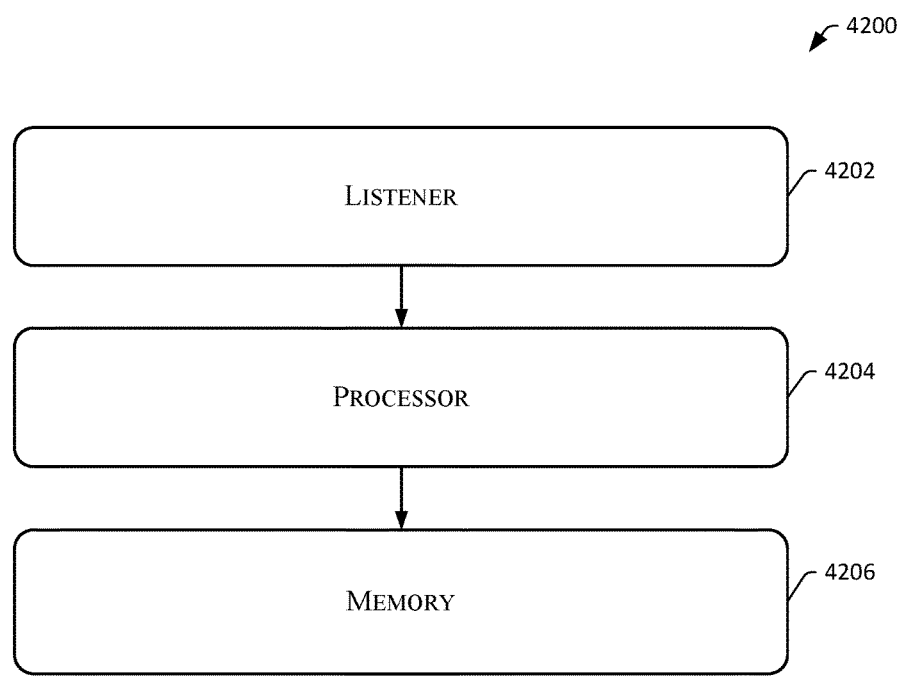
FIG. 42 is a schematic diagram of an example embodiment of an electronic device according to the present application.

Referring to FIG. 42, FIG. 42 is a schematic diagram of an example embodiment of an electronic device 4200 according to the present application. As the device example embodiment is basically similar to the method example embodiment, the description is relatively simple. For related portions, reference may be made to partial description of the method example embodiment. The device 4200 example embodiment described below is merely for illustrative purposes.

An electronic device of this example embodiment includes: a listener 4201; a processor 4202; and a memory 4203 configured to store a program for implementing a data receiving method for a message. After being powered on and running the program of the data receiving method for a message through the processor 4202, the device performs the following steps: collecting a sound wave signal corresponding to a to-be-received message; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the message by using the sound wave frequencies; and obtaining the message corresponding to the sound wave frequency sequence according to a preset sound wave frequency mapping table.

Figure 43:
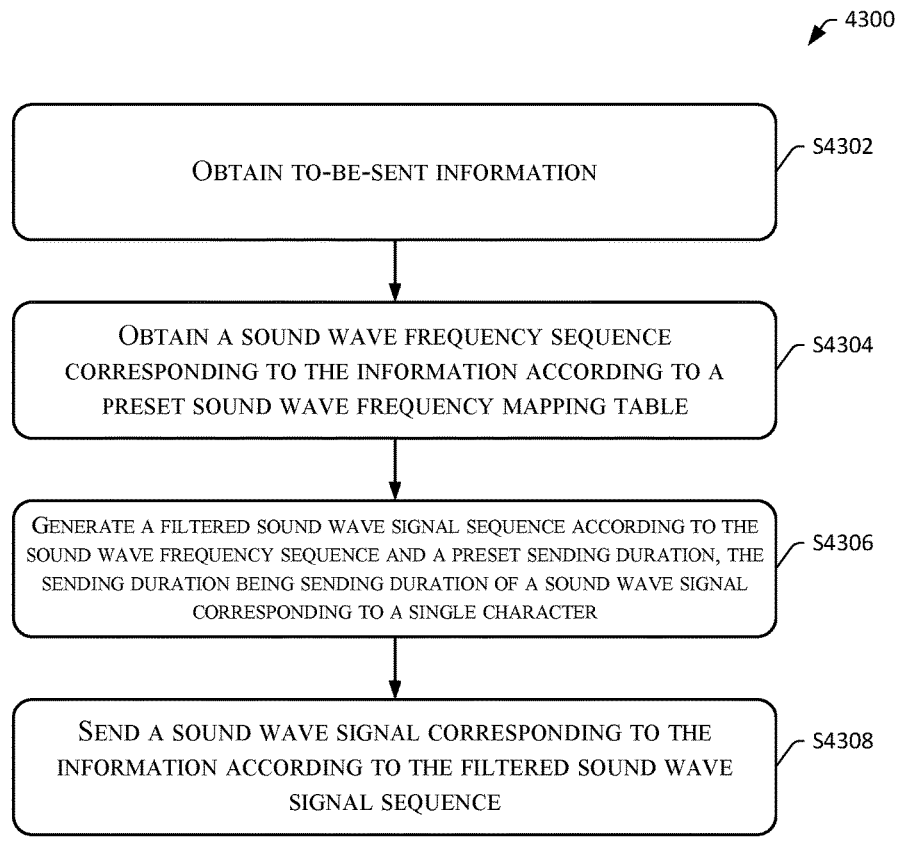
FIG. 43 is a flowchart of an example embodiment of a data sending method for information pushing according to the present application.

Corresponding to the foregoing sound wave-based data sending method, the present application further provides a data sending method for information pushing. The method may be used for sending to-be-pushed information in an information pushing scenario. Referring to FIG. 43, FIG. 43 is a flowchart of an example embodiment of a data sending method 4300 for information pushing according to the present application. Identical portions between this example embodiment and the first example embodiment are not described again. Please refer to corresponding portions in the first example embodiment. A data sending method 4300 for information pushing provided in the present application includes the following steps:

Step S4302: obtaining to-be-sent information.

The to-be-sent information refers to information that needs to be sent out in an information pushing scenario, for example, various promotion information sent by a merchant to a customer.

Step S4304: obtaining a sound wave frequency sequence corresponding to the information according to a preset sound wave frequency mapping table.

Step S4306: generating a filtered sound wave signal sequence according to the sound wave frequency sequence and a preset sending duration, the sending duration being sending duration of a sound wave signal corresponding to a single character.

Step S4308: sending a sound wave signal corresponding to the information according to the filtered sound wave signal sequence.

In the foregoing example embodiment, a data sending method for information pushing is provided. Correspondingly, the present application further provides a data sending apparatus for information pushing. The apparatus corresponds to the foregoing method example embodiment.

Figure 44:
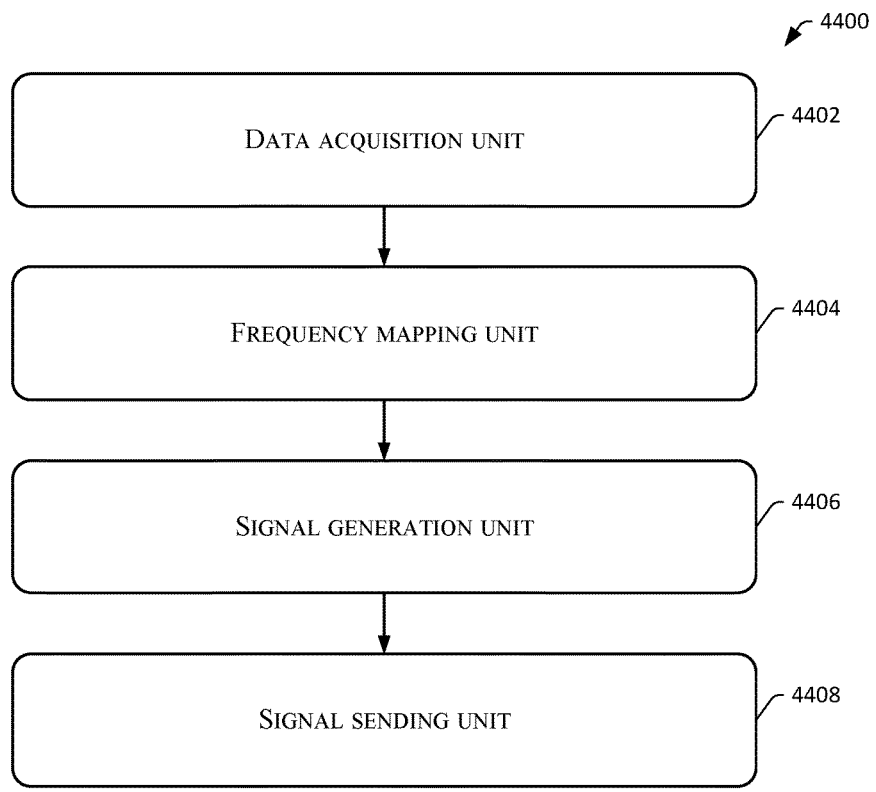
FIG. 44 is a flowchart of an example embodiment of a data sending apparatus for information pushing according to the present application.

Referring to FIG. 44, FIG. 44 is a schematic diagram of an example embodiment of a data sending apparatus 4400 for information pushing according to the present application. As the apparatus example embodiment is basically similar to the method example embodiment, the description is relatively simple. For related portions, reference may be made to partial description of the method example embodiment. The apparatus 4400 example embodiment described below is merely for illustrative purposes.

A data sending apparatus for information pushing of this example embodiment includes:

a data acquisition unit 4402 configured to obtain to-be-sent information;

a frequency mapping unit 4404 configured to obtain a sound wave frequency sequence corresponding to the information according to a preset sound wave frequency mapping table;

a signal generation unit 44106 configured to generate a filtered sound wave signal sequence according to the sound wave frequency sequence and a preset sending duration, the sending duration being sending duration of a sound wave signal corresponding to a single character; and a signal sending unit 4408 configured to send a sound wave signal corresponding to the information according to the filtered sound wave signal sequence.

Figure 45:
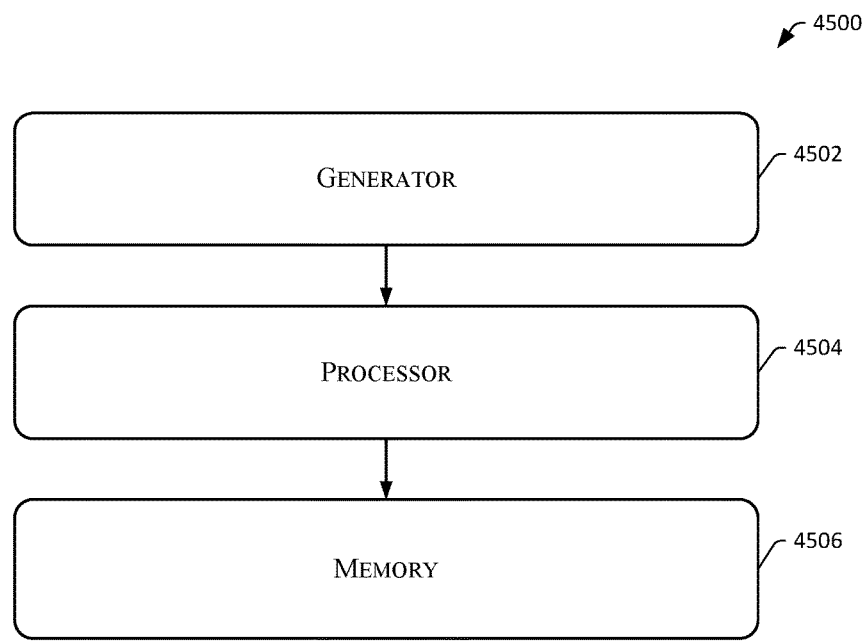
FIG. 45 is a schematic diagram of an example embodiment of an electronic device according to the present application.

Referring to FIG. 45, FIG. 45 is a schematic diagram of an example embodiment of an electronic device 4500 according to the present application. As the device example embodiment is basically similar to the method example embodiment, the description is relatively simple. For related portions, reference may be made to partial description of the method example embodiment. The device 4500 example embodiment described below is merely for illustrative purposes.

An electronic device of this example embodiment includes: a sound generator 4502; a processor 4504; and a memory 4506 configured to store a program for implementing a data sending method for information pushing. After being powered on and running the program of the data sending method for information pushing through the processor 4504, the device performs the following steps: obtaining to-be-sent information; obtaining a sound wave frequency sequence corresponding to the information according to a preset sound wave frequency mapping table; generating a filtered sound wave signal sequence according to the sound wave frequency sequence and a preset sending duration, the sending duration being sending duration of a sound wave signal corresponding to a single character; and sending a sound wave signal corresponding to the information according to the filtered sound wave signal sequence.

Figure 46:
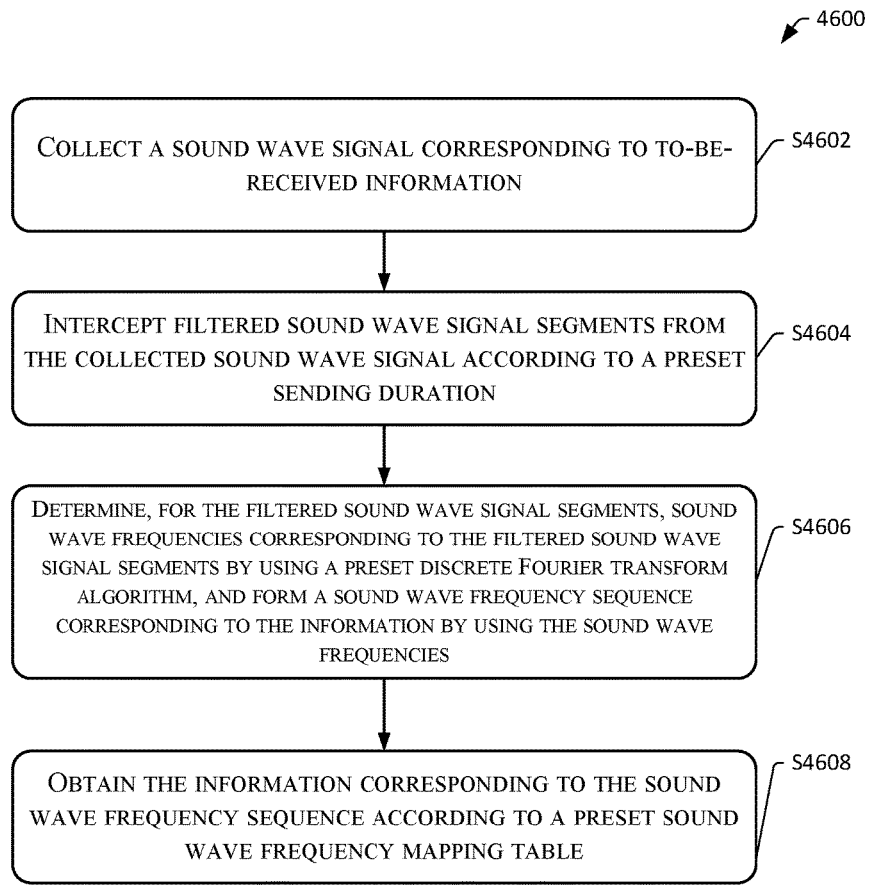
FIG. 46 is a flowchart of an example embodiment of a data receiving method for information pushing according to the present application.

Corresponding to the foregoing data sending method for information pushing, the present application further provides a data receiving method for information pushing. Referring to FIG. 46, FIG. 46 is a flowchart of an example embodiment of a data receiving method 4600 for information pushing according to the present application. This example embodiment also corresponds to the foregoing sound wave-based data receiving method. Identical portions between this example embodiment and the example embodiment of the sound wave-based data receiving method above are not described again. Please refer to corresponding portions in the example embodiment. A data receiving method 4600 for information pushing provided in the present application includes the following steps:

Step S4602: collecting a sound wave signal corresponding to to-be-received information.

Step S4604: intercepting filtered sound wave signal segments from the collected sound wave signal according to a preset sending duration, the sending duration being sending duration of a sound wave signal corresponding to a single character.

Step S4606: determining, for the filtered sound wave signal segments, sound wave frequencies corresponding to the filtered sound wave signal segments by using a preset discrete Fourier transform algorithm, and forming a sound wave frequency sequence corresponding to the information by using the sound wave frequencies.

Step S4608: obtaining the information corresponding to the sound wave frequency sequence according to a preset sound wave frequency mapping table.

In the foregoing example embodiment, a data receiving method for information pushing is provided. Correspondingly, the present application further provides a data receiving apparatus for information pushing. The apparatus corresponds to the foregoing method example embodiment.

Figure 47:
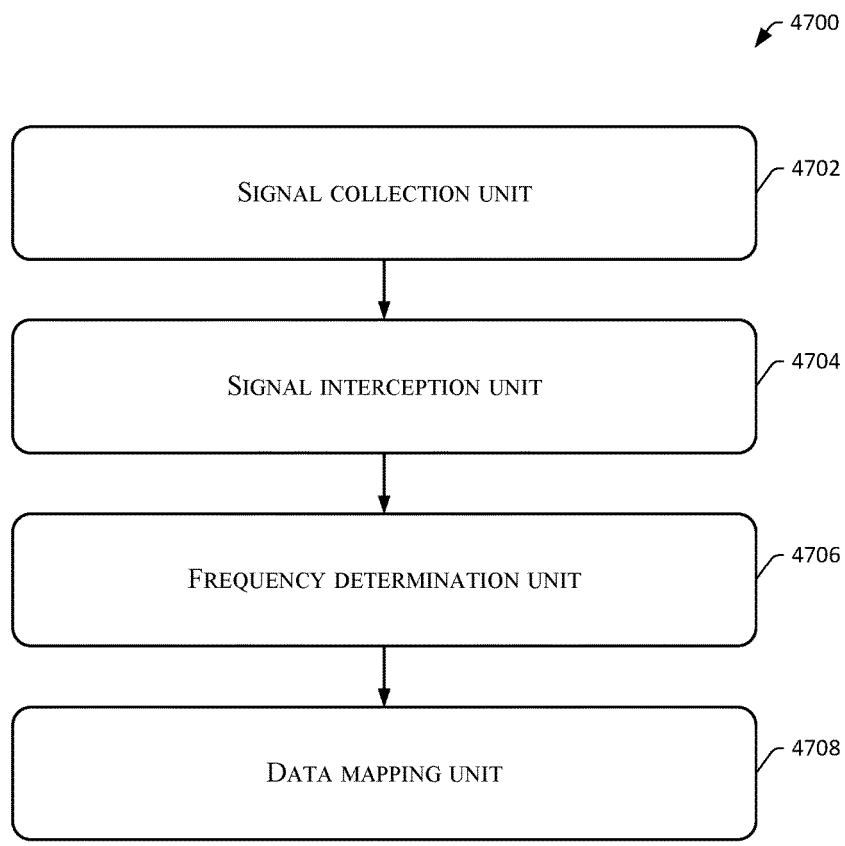
FIG. 47 is a flowchart of an example embodiment of a data receiving apparatus for information pushing according to the present application.

Referring to FIG. 47, FIG. 47 is a schematic diagram of an example embodiment of a data receiving apparatus 4700 for information pushing according to the present application. As the apparatus example embodiment is basically similar to the method example embodiment, the description is relatively simple. For related portions, reference may be made to partial description of the method example embodiment. The apparatus 4700 example embodiment described below is merely for illustrative purposes.

A data receiving apparatus for information pushing of this example embodiment includes:

a signal collection unit 4702 configured to collect a sound wave signal corresponding to to-be-received information;

a signal interception unit 4704 configured to intercept filtered sound wave signal segments from the collected sound wave signal according to a preset sending duration, the sending duration being sending duration of a sound wave signal corresponding to a single character;

a frequency determination unit 4706 configured to determine, for the filtered sound wave signal segments, sound wave frequencies corresponding to the filtered sound wave signal segments by using a preset discrete Fourier transform algorithm, and form a sound wave frequency sequence corresponding to the information by using the sound wave frequencies; and a data mapping unit 4708 configured to obtain the information corresponding to the sound wave frequency sequence according to a preset sound wave frequency mapping table.

Figure 48:
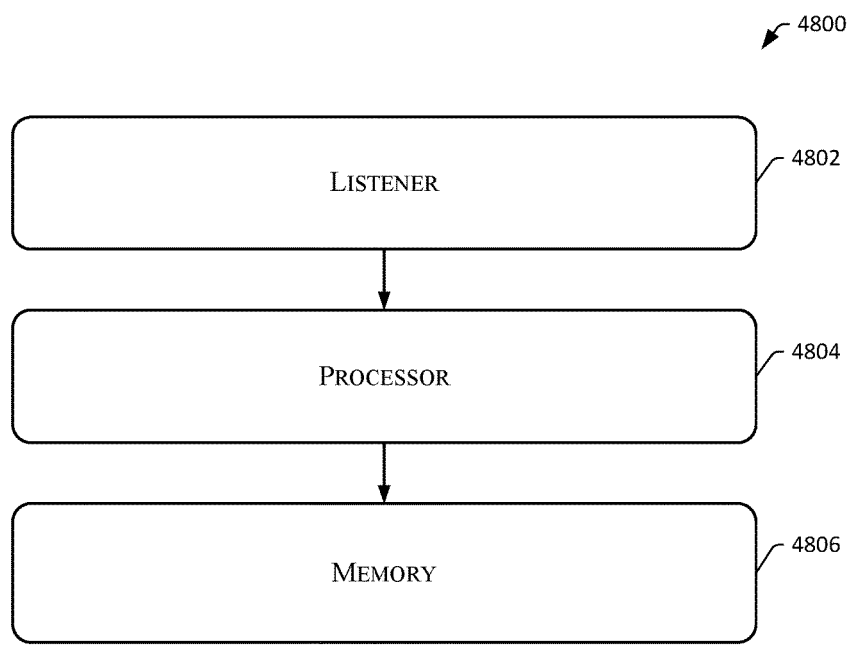
FIG. 48 is a schematic diagram of an example embodiment of an electronic device according to the present application.

Referring to FIG. 48, FIG. 48 is a schematic diagram of an example embodiment of an electronic device 4800 according to the present application. As the device example embodiment is basically similar to the method example embodiment, the description is relatively simple. For related portions, reference may be made to partial description of the method example embodiment. The device 4800 example embodiment described below is merely for illustrative purposes.

An electronic device of this example embodiment includes: a listener 4802; a processor 4804; and a memory 4806 configured to store a program for implementing a data receiving method for information. After being powered on and running the program of the data receiving method for information through the processor 4804, the device performs the following steps: collecting a sound wave signal corresponding to to-be-received information; intercepting filtered sound wave signal segments from the collected sound wave signal according to a preset sending duration, the sending duration being sending duration of a sound wave signal corresponding to a single character; determining, for the filtered sound wave signal segments, sound wave frequencies corresponding to the filtered sound wave signal segments by using a preset discrete Fourier transform algorithm, and forming a sound wave frequency sequence corresponding to the information by using the sound wave frequencies; and obtaining the information corresponding to the sound wave frequency sequence according to a preset sound wave frequency mapping table.

Although example embodiments of the present application are disclosed as above, the present application is not limited thereto. Any person skilled in the art may make possible changes and modifications without departing from the spirit and scope of the present application. Therefore, the protection scope of the present application should be subject to the scope defined by the claims of the present application.

Figure 49:
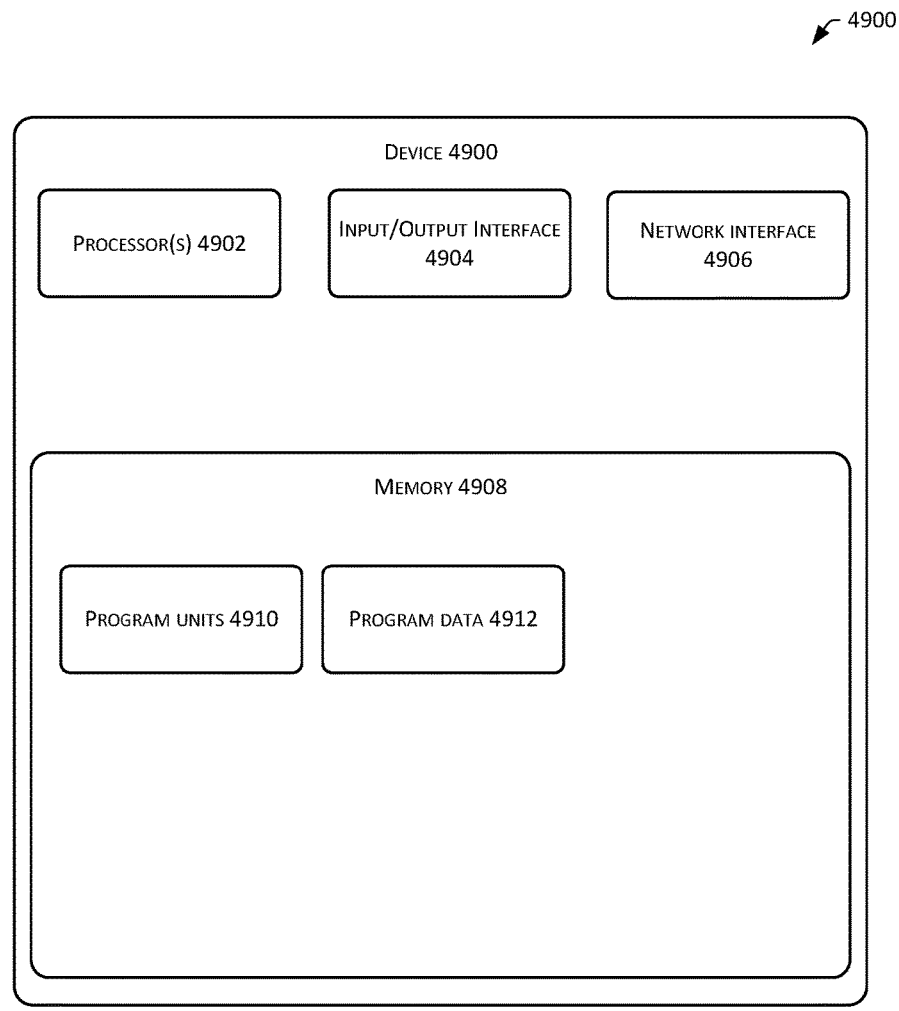
FIG. 49 is a schematic diagram of the example apparatus as described in other figures in more detail.

In a typical configuration, the computing device or apparatus? includes one or more processors (CPUs), an input/output interface, a network interface, and a memory. FIG. 49 shows an example apparatus 4900 such as the apparatuses in FIGS. 5 and 11 in further detail. The apparatus 4900 may include one or more processors 4902, an input/out interface 4904, a network interface 4906, and memory 4908.

In a typical configuration, the computing devices and apparatuses include one or more processors (CPUs), an input/output interface, a network interface, and a memory. The typical configuration is applicable to all devices and apparatuses described herein. FIG. 49 shows an example apparatus 4900 in further detail. The apparatus 4900 may include one or more processors 4902, an input/out interface 4904, a network interface 4906, and memory 4908.

The memory 4908 may include a volatile memory, a random access memory (RAM) and/or a non-volatile memory or the like in a computer readable medium, for example, a read-only memory (ROM) or a flash RAM. The memory 4908 is an example of the computer readable medium.

The computer readable medium includes non-volatile or volatile, and movable or non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage apparatus, or any other non-transmission medium, and can be used to store information accessible to the computing device. According to the definition in this text, the computer readable medium does not include transitory media, such as modulated data signals and carriers.

The memory 4908 may include program units 4910 and program data 4912. Depending on which apparatus (e.g., any one of the apparatuses as shown in FIGS. 5 and 11), the program units 4910 may include one or more of the foregoing units as described in the corresponding apparatus.

Persons skilled in the art should understand that, the example embodiments of the present application may be provided as a method, a system, or a computer program product. Therefore, the present application may be in the form of a complete hardware example embodiment, a complete software example embodiment, or an example embodiment combining software and hardware. Moreover, the present application may employ the form of a computer program product implemented on one or more computer usable storage media (including, but not limited to, a magnetic disk memory, a CD-ROM, an optical memory, and the like) including computer usable program code.

The invention claimed is:

1. A method for sending data over sound waves, comprising:
   obtaining to-be-sent data;
   obtaining a sound wave frequency sequence corresponding to the to-be-sent data according to a preset sound wave frequency mapping table;
   generating a filtered sound wave signal sequence according to the sound wave frequency sequence and a preset sending duration, the sending duration being sending duration of a sound wave signal corresponding to a single character, wherein generating the filtered sound wave signal sequence comprises gradually attenuating a rising edge and a falling edge of a waveform of the sound wave signal to zero with an in-band portion of the waveform being flat in a cycle corresponding to each frequency of the waveform to centralize energy of the sound wave signal in the in-band portion; and
   sending a sound wave signal corresponding to the to-be-sent data using a loudspeaker according to the filtered sound wave signal sequence.

2. The method of claim 1, after the obtaining to-be-sent data, further comprising:
   determining whether a character length of the to-be-sent data is greater than a preset maximum character length threshold;
   proceeding to the next step only if the character length of the to-be-sent data is greater than the preset maximum character length threshold.

3. The method of claim 1, further comprising:
   after obtaining the to-be-sent data,
   encrypting the to-be-sent data with a preset encryption algorithm; and
   obtaining a sound wave frequency sequence corresponding to the encrypted to-be-sent data.

4. The method of claim 1, further comprising:
   after obtaining the sound wave frequency sequence,
   adding a preset starting tone frequency in front of the sound wave frequency sequence.

5. The method of claim 4, wherein the starting tone frequency comprises at least two starting tone frequencies.

6. The method of claim 1, wherein the obtaining a sound wave frequency sequence comprises:
   obtaining respective sound wave frequencies corresponding to characters in the to-be-sent data according to the preset sound wave frequency mapping table; and
   forming the sound wave frequency sequence according to the respective sound wave frequencies corresponding to the characters.

7. The method of claim 1, wherein the obtaining a sound wave frequency sequence comprises:
   obtaining the to-be-sent data in a target character form according to a preset character mapping table;
   performing character segmentation on the to-be-sent data in the target character form according to a character bit length corresponding to a preset sound wave frequency;
   obtaining respective sound wave frequencies corresponding to segmented characters according to the preset sound wave frequency mapping table; and
   forming, based on a sequential order of the segmented characters in the to-be-sent data in the target character form, the sound wave frequency sequence according to the respective sound wave frequencies corresponding to the segmented characters.

8. The method of claim 1, wherein the sound wave frequency comprises a low sound wave frequency, a medium sound wave frequency, or an ultrasonic frequency.

9. The method of claim 1, further comprising:
   after obtaining the to-be-sent data,
   generating a check code of the to-be-sent data by using a preset check code generation algorithm;
   generating the to-be-sent data carrying the check code, according to the to-be-sent data and the check code;
   obtaining a sound wave frequency sequence corresponding to the to-be-sent data carrying the check code.

10. An apparatus for sending data over sound waves, comprising:
    a loudspeaker;
    one or more processors, and
    memory storing executable instruction that, when executed by the one or more processors, cause the one or more processors to perform acts comprising:
    obtaining to-be-sent data;
    obtaining a sound wave frequency sequence corresponding to the to-be-sent data according to a preset sound wave frequency mapping table;
    generating a filtered sound wave signal sequence according to the sound wave frequency sequence and a preset sending duration, the sending duration being sending duration of a sound wave signal corresponding to a single character, wherein generating the filtered sound wave signal sequence comprises gradually attenuating a rising edge and a falling edge of a waveform of a sound wave signal of the filtered sound wave signal sequence to zero with an in-band portion of the waveform being flat in a cycle corresponding to each frequency of the waveform to centralize energy of the sound wave signal in the in-band portion; and
    sending a sound wave signal corresponding to the to-be-sent data according to the filtered sound wave signal sequence.

11. The apparatus of claim 10, wherein the acts further comprise:
    generating a sound wave analog signal sequence in a baseband signal form according to the sound wave frequency sequence and the sending duration;
    obtaining a filtered sound wave analog signal sequence by filtering sound wave analog signals in the sound wave analog signal sequence in the baseband signal form with a preset filter; and
    performing waveform coding on the filtered sound wave analog signals by using a preset waveform coding mode, to obtain a sound wave digital signal sequence corresponding to the filtered sound wave analog signal sequence as the filtered sound wave signal sequence.

12. The apparatus of claim 10, wherein the acts further comprise:
    adding a preset starting tone frequency in front of the sound wave frequency sequence, to form a sound wave frequency sequence comprising the starting tone frequency.

13. A method for receiving data over sound waves, comprising:
    collecting a sound wave signal corresponding to to-be-received data, through a microphone a rising edge and a falling edge of a waveform of the sound wave signal being gradually attenuated to zero and an in-band portion of the waveform being flat in a cycle corresponding to each frequency of the waveform;

intercepting filtered sound wave signal segments from the collected sound wave signal according to a preset sending duration;

determining sound wave frequencies corresponding to the filtered sound wave signal segments;

forming a sound wave frequency sequence corresponding to the to-be-received data by using the sound wave frequencies; and obtaining the to-be-received data corresponding to the sound wave frequency sequence according to a preset sound wave frequency mapping table.

14. The method of claim 13, wherein the collected sound wave signal comprises a sound wave signal corresponding to a starting tone and the sound wave signal corresponding to the to-be-received data.

15. The method of claim 13, wherein the intercepting filtered sound wave signal segments comprises:

determining whether the collected sound wave signal comprises the starting tone; and if the determined result is affirmative, intercepting, from a sound wave signal after the starting tone, respective filtered sound wave signal segments corresponding to characters in the to-be-received data according to the sending duration.

16. The sound wave-based data receiving method of claim 13, wherein the determining sound wave frequencies corresponding to the filtered sound wave signal segments comprises:

obtaining spectrum information corresponding to the filtered sound wave signal segments;

extracting, from the spectrum information, a preset number of frequency points that are greater than a preset amplitude threshold; and determining sound wave frequencies corresponding to the filtered sound wave signal segments according to the preset number of frequency points and amplitudes corresponding to the frequency points.

17. The method of claim 13, further comprising:
after the collecting the sound wave signal,
performing noise filtering processing on the sound wave signal by using a preset filter.

18. The method of claim 13, further comprising:
after the collecting the sound wave signal,
performing waveform decoding on the sound wave signal by using a preset waveform decoding mode, to obtain a quantized signal of the sound wave signal.

* * * * *